(12) United States Patent
Kinoshita et al.

(10) Patent No.: US 6,496,300 B2
(45) Date of Patent: Dec. 17, 2002

(54) OPTICAL AMPLIFIER

(75) Inventors: Susumu Kinoshita, Kanagawa (JP); Miki Onaka, Kanagawa (JP); Yasushi Sugaya, Kanagawa (JP); Chihiro Ohshima, Kanagawa (JP); Terumi Chikama, Kanagawa (JP); Hiroyuki Itou, Hokkaido (JP); Tadashi Okiyama, Kanagawa (JP); Taiki Kobayashi, Kanagawa (JP)

(73) Assignee: Fujitsu Limited, Kawasaki (JP)

(*) Notice: Subject to any disclaimer, the term of this patent is extended or adjusted under 35 U.S.C. 154(b) by 0 days.

(21) Appl. No.: 09/093,410

(22) Filed: Jun. 9, 1998

(65) Prior Publication Data

US 2002/0027703 A1 Mar. 7, 2002

(30) Foreign Application Priority Data

Feb. 27, 1998 (JP) ............................................ 10-048454

(51) Int. Cl.[7] ............................ H04B 10/17; H04J 14/02
(52) U.S. Cl. ................ 359/331.44; 359/161; 359/337.1
(58) Field of Search ................................. 359/160, 161, 359/173, 179, 337.1, 341, 337.5, 331.44; 357/134, 127

(56) References Cited

U.S. PATENT DOCUMENTS

| 3,370,916 A | 2/1968 | Shafer |
| 3,376,157 A | 4/1968 | Guerici et al. |
| 3,407,364 A | 10/1968 | Turner |
| 3,411,840 A | 11/1968 | Robinson |
| 3,527,577 A | 9/1970 | Fan et al. |
| 3,558,214 A | 1/1971 | DeLang et al. |
| 3,700,307 A | 10/1972 | Glenn |
| 3,719,414 A | 3/1973 | Wentz |
| 4,059,759 A | 11/1977 | Harney et al. |
| 4,305,046 A | 12/1981 | Le Floch et al. |
| 4,387,953 A | 6/1983 | Shirasaki et al. |
| 4,548,478 A | 10/1985 | Shirasaki |
| 4,581,579 A | 4/1986 | Nagatsuma et al. |
| 4,609,257 A | 9/1986 | Shirasaki |
| 4,637,027 A | 1/1987 | Shirasaki et al. |
| 4,644,145 A | 2/1987 | Gundner |
| 4,650,289 A | 3/1987 | Kuwahara |
| 4,668,052 A | 5/1987 | Shirasaki |
| 4,678,287 A | 7/1987 | Buhrer |

(List continued on next page.)

FOREIGN PATENT DOCUMENTS

| EP | 0 590 633 A1 | 4/1994 |
| EP | 802 642 | 10/1997 |
| EP | 0 802 642 A2 | 10/1997 |

(List continued on next page.)

OTHER PUBLICATIONS

Delevaux et al, ECOC '94, 20th Europ. Conf. Opt. Commun., vol. 4, pp. 5–9, Sep. 29, 1994.*

(List continued on next page.)

*Primary Examiner*—Nelson Moskowitz
(74) *Attorney, Agent, or Firm*—Staas & Halsey LLP

(57) ABSTRACT

An optical amplifier of a wavelength-division multiplexing transmission system that includes a pre-stage optical amplifying unit and a post stage optical amplifying unit. The pre-stage optical amplifying unit has a rare-earth element doped optical fiber and a pump light source for inputting a pump light to the rare-earth element doped optical fiber. The post-stage optical amplifying unit has a second rare-earth element doped optical fiber and a pump light source for inputting a pump light to the second rare-earth element doped optical fiber. The pre-stage optical amplifying unit and the post-stage optical amplifying unit are optically connected by a detachable optical coupling device. In addition, a gain equalizing unit, positioned on an output side of the optical fibers, compensates for wavelength-dependency of a gain characteristic of the optical fibers.

6 Claims, 42 Drawing Sheets

U.S. PATENT DOCUMENTS

| | | |
|---|---|---|
| 4,818,881 A | 4/1989 | Tanton et al. |
| 4,856,878 A | 8/1989 | Wilson et al. |
| 4,933,629 A | 6/1990 | Kozuka et al. |
| 4,947,035 A | 8/1990 | Zook et al. |
| 4,952,014 A | 8/1990 | Lieberman et al. |
| 4,973,120 A | 11/1990 | Jopson et al. |
| 4,984,875 A | 1/1991 | Abe et al. |
| 4,988,170 A | 1/1991 | Buhrer |
| 5,029,953 A | 7/1991 | Dexter et al. |
| 5,033,830 A | 7/1991 | Jameson |
| 5,042,906 A | 8/1991 | Chesler et al. |
| 5,050,968 A | 9/1991 | Ohara |
| 5,052,786 A | 10/1991 | Schulz |
| 5,063,559 A | 11/1991 | Marcuse |
| 5,074,631 A | 12/1991 | Hamano et al. |
| 5,152,597 A | 10/1992 | Barnard |
| 5,170,274 A | 12/1992 | Kuwata et al. |
| 5,212,446 A | 5/1993 | Itoh et al. |
| 5,218,662 A | 6/1993 | Dugan |
| 5,224,183 A | 6/1993 | Dugan |
| 5,253,104 A | 10/1993 | Delavaux |
| 5,267,078 A | 11/1993 | Shiraishi et al. |
| 5,274,733 A | 12/1993 | Prigent et al. |
| 5,305,134 A | 4/1994 | Tsushima et al. |
| 5,327,516 A | 7/1994 | Chraplyvy et al. |
| 5,343,322 A | 8/1994 | Pirio et al. |
| 5,345,329 A | 9/1994 | Shirai et al. |
| 5,355,240 A | 10/1994 | Prigent et al. |
| 5,361,319 A | 11/1994 | Antos et al. |
| 5,373,382 A | 12/1994 | Pirio et al. |
| 5,386,314 A | 1/1995 | Jopson |
| 5,392,377 A | 2/1995 | Auracher |
| 5,410,624 A | 4/1995 | Morkel |
| 5,436,760 A | 7/1995 | Nakabayashi |
| 5,452,116 A | 9/1995 | Kirkby et al. |
| 5,463,487 A | 10/1995 | Epworth |
| 5,510,926 A | 4/1996 | Bayart et al. |
| 5,521,741 A | 5/1996 | Umezawa et al. |
| 5,528,415 A | 6/1996 | Gauthier et al. |
| 5,563,731 A | 10/1996 | Asahi |
| 5,587,830 A | 12/1996 | Chraplyvy et al. |
| 5,600,466 A | 2/1997 | Tsushima et al. |
| 5,602,666 A | 2/1997 | Ishikawa et al. |
| 5,606,445 A | 2/1997 | Kikuchi et al. |
| 5,612,807 A | 3/1997 | Ishikawa et al. |
| 5,612,808 A | 3/1997 | Audouin et al. |
| 5,617,234 A | 4/1997 | Koga et al. |
| 5,636,046 A | 6/1997 | Ishikawa et al. |
| 5,654,816 A | 8/1997 | Fishman |
| 5,664,131 A | 9/1997 | Sugiya |
| 5,696,614 A | 12/1997 | Ishikawa et al. |
| 5,696,615 A | 12/1997 | Alexander |
| 5,745,276 A | 4/1998 | Ho et al. |
| 5,801,858 A | 9/1998 | Roberts et al. |
| 5,831,754 A * | 11/1998 | Nokano ..................... 359/161 |

FOREIGN PATENT DOCUMENTS

| | | |
|---|---|---|
| GB | 2 244 595 A | 12/1991 |
| JP | 47-5490 A | 3/1972 |
| JP | 47-5490 | 3/1972 |
| JP | 56-94326 | 7/1981 |
| JP | 57-68818 | 4/1982 |
| JP | 57-94715 | 6/1982 |
| JP | 57-168221 | 10/1982 |
| JP | 57-188014 | 11/1982 |
| JP | 58-49916 | 3/1983 |
| JP | 59-121313 | 7/1984 |
| JP | 59-121314 | 7/1984 |
| JP | 59-197013 A | 11/1984 |
| JP | 59-197014 A | 11/1984 |
| JP | 60-131523 | 7/1985 |
| JP | 60-165933 | 8/1985 |
| JP | U-60-165933 | 8/1985 |
| JP | U-60-165934 | 8/1985 |
| JP | 60-165934 | 8/1985 |
| JP | 60-200225 | 10/1985 |
| JP | 60-203914 | 10/1985 |
| JP | 60-222815 | 11/1985 |
| JP | 60-222818 | 11/1985 |
| JP | 61-97629 | 5/1986 |
| JP | 01-204021 | 8/1989 |
| JP | 2-2508 | 1/1990 |
| JP | 02-83523 | 3/1990 |
| JP | 2-113019 | 4/1990 |
| JP | 3-206427 | 9/1991 |
| JP | 4-3029 | 1/1992 |
| JP | 4-182618 | 6/1992 |
| JP | 4-308811 | 10/1992 |
| JP | 5-63259 | 3/1993 |
| JP | 5-107573 | 4/1993 |
| JP | 5-241209 | 9/1993 |
| JP | 6-51255 | 2/1994 |
| JP | 6-229164 | 9/1994 |
| JP | 7-74699 | 3/1995 |
| JP | 07212315 A | 8/1995 |
| JP | 9-284218 | 10/1997 |
| RU | 766423 * | 4/1997 |
| WO | 9629627 * | 9/1996 |

OTHER PUBLICATIONS

Kiluchina, Hafi, Journal of Agriculture Technology, vol. 10, #10, pp. 1443–1448, Oct. 10, 1992.*

Shirasaki et al., "Magnetooptical 2x2 switch for single–mode fibers, "*Applied Optics,* vol. 23, No. 19, Oct. 1984, pp. 3271–3276.

Sugaya et al., "Novel configuration for low–noise and wide–dynamic–range Er–doped fiber amplifierfor WDM systems," *OAA '95,* Paper FC3, Jun. 16, 1995, (Davos, Switzerland), 4 pages.

Kinoshita et al., "Low–Noise and Wide–Dynamic–Range Erbium–Doped Fiber Amplifiers with Automatic Level Control for WDM Transmission Systems" OAA '96, 1996, pp 211–214.

Miyata et al., "Dispersion Compensation Design for 10–Gb/s, 16–Wave WDM Transmission System over Standard Single–Mode Fiber" ECOC '95, Brussels, Sep. 1995, pp. 63–66.

N. Fukushima, H. Onaka, M. Shirasaki, Y. Suzuki, T. Tokumasu, Non–Mechanical Variable Attenuator Module Using Faraday Effect, presented at the meeting "Optical Amplifiers and Their Application", held on Jul. 11–13, 1996, in Monterey, California, sponsored and managed by Optical Society of America.

M. Shirasaki, et al., "Compact Optical Isolator for Fibers Using Birefringent Wedges"; Applied Optics, vol. 21, No. 23, pp. 4296–4299, (Dec. 1982).

Govind P. Agrawal, *Nonlinear Fiber Optics,* "Group–Velocity Dispersion", pp. 51–65.

Francois Ouellette et al., "All Fiber Devices for Chromatic Dispersion Compensation Based on Chirped Distributed Resonant Coupling", *Journal of Lightwave Technology,* vol. 12, No. 10, Oct. 1994.

Bob Jopson et al., "Disperson Compensation for Optical Fiber Systems", *IEEE Communications Magazine,* Jun. 1995, pp. 96–102.

K. Sato et al., "Network Performance and Integrity Enhancement with Optical Path Layer Technologies", *IEEE Journal on Selected Areas in Communications,* vol. 12, No. 1, Jan. 1994, pp. 159–170.

Japanese Publication "Er:Doped Fiber Amplifer for WDM Transmission Using Fiber Gain Control", Technical Report of IEICE, OCS94–66, OPE94, Nov. 1994. (including English language Abstract).

Y. Sugaya et al., "Novel configuration for low–noise and wide–dynamic range Er–doped fiber amplifier for WDM systems" *OAA '95 paper FC3,* Jun. 16, 1995.

Vengsarkar et al., "Dispersion Compensating Single–Mode Fibers: Efficient Designs For First– and second–Order Compensation", Optics Letters, vol. 18, No. 11, Jun. 1, 1993, pp.–924–926.

Antos et al., "Dispersion Compensating Fiber For Upgrading Existing 1310–nm–Optimized Systems to 1550–nm Operation", OFC/IOOC '93 Technical Digest, Feb. 1993, pp. 204–205.

Cimini et al., "Optical Equalization For High–Bit–Rate Fiber–Optic Communications", IEEE Photonics Technology Letters, vol. 2, No. 3, Mar. 1990, pp. 200–202.

Inoue et al. "Wavelength Conversion Experiment Usig Fiber Four–Wave Mixing", IEEE Photonics Technology Letters, vol. 4, No. 1, Jan. 1992, pp. 69–72.

Hill et al, "CW Three–Wave Mixing in Single–Mode Optical Fibers", J. Appl. Phys. vol. 49, No. 10, Oct. 1978, p. 5098–5106.

Shibata et al., "Phase–Mismatch Dependence of Efficiency of Wave Mixing in a Single–Mode Optical Fiber", IEEE Journal of Quantum Electronics, vol. QE–23, No. 7, Jul. 1987, pp. 1205–1209.

Hamaide et al., "Limitations in Long Haul IM/DD Optical Fiber Systems Caused by Chromatic Dispersion and Non-Linear Kerr Effect," Electronics Letters, vol. 26, No. 18, Aug. 30, 1990, pp. 1451–1453.

Maeda et al., Effect of Four–Wave Mixing in Fibers on Optical Frequency–Division Multiplexed Systems, IEEE Journal of Lightwave Technology, vol. 8, No. 9, Sep. 1990, pp. 1402–1408.

Schadt et al., Numerical Investigation of Signal Degradation Due to Four–Wave Mixing in a 21–Channel 2.5 Gb/s Coherent Heterodyne DPSK System, IEEE Jnl of Lightwave Tech. vol. 9, No. 9, Sep. 1991.

Inoue, Four–Wave Mixing in an Optical Fiber in the Zero-–Dispersion Wavelength Region, IEEE Journal of Lightwave Technology, vol. 10, No. 11, Nov. 1992, pp. 1553–1561.

Inoue, "Phase–Mismatching Characteristic of Four–Wave Mixing in Fiber Lines with Multistage Optical Amplifiers", Optics Letters, vol. 17, No. 11, Jun. 1, 1992, pp. 801–803.

Forghieri et al., Reduction of Four–Wave–Mixing Cross Talk in WDM Systems Using Unequally Spaced Channels, OFC/IOOC '93 Technical Digest, Feb. 1993, p. 252.

Aoyama et al., Design and Operation of Transmission Lines Containing ER–Doped Fiber Amplifier Repeaters, IEEE Globecom '92, 1992, pp. 1875–1879.

T. Kashiwada et al., "Gain–flattened optical–fiber amplifiers with a hybrid Er–doped–fiber configuration for WDM transmission", OFC '95 Technical Digest, pp. 77–78.

Giles et al., "Dynamic Gain Equalization in Two–Stage Fiber Amplifiers", *IEEE Photonics Technology Letters,* vol. 2, No. 12, Dec. 1990, pp. 866–868.

E. Desurvire, "Erbium–Doped Fiber Amplifiers Principles and Applications", 1994, pp. 480–487.

Chraplyvy et al., "Equalization in Amplified WDM Lightwave Transmission Systems", *IEEE Photonics Technology Letters,* vol. 4, No. 8, Aug. 1992, pp. 920–922.

Y. Sugaya et al., "Experimental Investigation for the Designing of EDFA in WDM Transmission System", *Proceedings of the 1995 IEICE General Conference B–1098,* Mar. 1995.

Y. Sugaya et al., Configuration Design of Multi–wavelength Er–doped Fiber Amplifier for WDM Transmission System, *Technical Report of IEICE OCS95–36,* Jul. 26, 1998, vol. 95, No. 185.

U.S. patent application Ser. No. 08/752,516, Akira Miyauchi et al., filed Nov. 20, 1996, Fujitsu Limited.

U.S. patent application Ser. No. 08/699,563, Hiroshi Onaka et al., filed Aug. 19, 1996, Fujitsu Limited.

U.S. patent application Ser. No. 08/754,865, Tadashi Okiyama, filed Nov. 22, 1996, Fujitsu Limited.

U.S. patent application Ser. No. 08/789,178, Nobuhiro Fukushima, filed Jan. 24, 1997, Fujitsu Limited.

U.S. patent application Ser. No. 08/845,847, Yasushi Sugaya et al., filed Apr. 28, 1997, Fujitsu Limited.

* cited by examiner

FORMAT OF STS-192 (10Gb/s)

<TRAFFIC>

| CHANNEL NO. | FREQUENCY (THz) | WAVELENGTH (nm) | GRID (nm) | 4-WAVE WDM | 8-WAVE WDM | 16-WAVE WDM | 33-WAVE WDM | NOTE |
|---|---|---|---|---|---|---|---|---|
| 1 | 195.2 | 1535.82 | | | | | X | |
| 2 | 195.1 | 1536.61 | | | | | X | |
| 3 | 195.0 | 1537.40 | | | | | X | |
| 4 | 194.9 | 1538.19 | | | | | X | |
| 5 | 194.8 | 1538.98 | | | | | X | |
| 6 | 194.7 | 1539.77 | | | | | X | |
| 7 | 194.6 | 1540.56 | | | | | X | |
| 8 | 194.5 | 1541.35 | | | | | X | |
| 9 | 194.4 | 1542.14 | | | | | X | |
| 10 | 194.3 | 1542.94 | | | | | X | |
| 11 | 194.2 | 1543.73 | | | | | X | |
| 12 | 194.1 | 1544.53 | | | | | X | |
| 13 | 194.0 | 1545.32 | | | | | X | |
| 14 | 193.9 | 1546.12 | | | | | X | |
| 15 | 193.8 | 1546.92 | | | | | X | |
| 16 | 193.7 | 1547.72 | | | | | X | |
| 17 | 193.6 | 1548.51 | | X | X | X | X | |
| 18 | 193.5 | 1549.32 | | | | X | X | |
| 19 | 193.4 | 1550.12 | | | X | X | X | |
| 20 | 193.3 | 1550.92 | | | | X | X | |
| 21 | 193.2 | 1551.72 | | X | X | X | X | |
| 22 | 193.1 | 1552.52 | | | | X | X | REFERENCE FREQUENCY |
| 23 | 193.0 | 1553.33 | | | X | X | X | |
| 24 | 192.9 | 1554.13 | | | | X | X | |
| 25 | 192.8 | 1554.94 | | X | X | X | X | |
| 26 | 192.7 | 1555.75 | | | | X | X | |
| 27 | 192.6 | 1556.55 | | | X | X | X | |
| 28 | 192.5 | 1557.36 | | | | X | X | |
| 29 | 192.4 | 1558.17 | | X | X | X | X | |
| 30 | 192.3 | 1558.98 | | | | X | X | |
| 31 | 192.2 | 1559.79 | | | X | X | X | . |
| 32 | 192.1 | 1560.61 | | | | X | X | |

<OPTICAL SERVICE CHANNEL>

| NO. | FREQUENCY (THz) | WAVELENGTH (nm) | GRID (nm) | x4 | x8 | x16 | x32 | NOTE |
|---|---|---|---|---|---|---|---|---|
| 1 | | 1510.00 | − | X | X | X | X | OUT OF EDF GAIN BANDWIDTH |

FIG. 7

| OSC NO. | OSC NAME | FUNCTION NAME | FUNCTION | TERMINATION POINT OSC1 |
|---|---|---|---|---|
| 1 | J0 | SECTION TRACE | | |
| 2 | E1 | LOCAL ORDERWIRE | | |
| 3 | E1#2 | LOCAL OW CUT | | |
| 4 | F1 | USER CHANNEL | | |
| 5 | D1 | DCC DATA COMMUNICATION CHANNEL | | |
| 6 | D2 | DCC DATA COMMUNICATION CHANNEL | | |
| 7 | D3 | DCC DATA COMMUNICATION CHANNEL | | |
| 8 | R0 | SECTION RESERVED | | 0 |
| 9 | OAIS | OSC ALARM INDICATOR SIGNAL | OSC-AIS | 0 |
| 10 | SDI | SHUT DOWN INDICATOR | TRANSMITTING STATION LOL (LOSS OF LIGHT) RECEPTION INFORMATION | 0 |
| 11 | E2 | EXTRA-ORDERWIRE | | 0 |
| 12 | TC | TIME CONTROL BYTE | TIME SETTING, TRIGGER BYTE | |
| 13 | WCF1 | WDM CHANNEL FAILURE BYTE 1 | WDM CHANNEL FAULT INFORMATION CH1~CH8 | |
| 14 | WCF2 | WDM CHANNEL FAILURE BYTE 2 | WDM CHANNEL FAULT INFORMATION CH9~CH16 | 0 |
| 15 | WCF3 | WDM CHANNEL FAILURE BYTE 3 | WDM CHANNEL FAULT INFORMATION CH17~CH24 | 0 |
| 16 | WCF4 | WDM CHANNEL FAILURE BYTE 4 | WDM CHANNEL FAULT INFORMATION CH25~CH32 | 0 |
| 17 | R1R1 | RESERVED INTERRUPT REGISTER 1 | RESERVED BYTE FOR CPU INTERRUPT | |
| 18 | R1R2 | RESERVED INTERRUPT REGISTER 2 | RESERVED BYTE FOR CPU INTERRUPT | 0 |
| 19 | R1 | RESERVED BYTE 1 | LINE RESERVED BYTE 1 | 0 |
| 20 | R2 | RESERVED BYTE 2 | LINE RESERVED BYTE 2 | 0 |
| 21 | R3 | RESERVED BYTE 3 | LINE RESERVED BYTE 3 | 0 |
| 22 | R4 | RESERVED BYTE 4 | LINE RESERVED BYTE 4 | 0 |
| 23 | MB | MULTI-FRAME BYTE | MULTI-FRAME BYTE | 0 |
| 24 | CK | SUB FRAME CHECKER | PARITY CHECK | 0 |

FIG. 12

| | NUMBER OF BYTES | CONTENTS |
|---|---|---|
| WRC | 4 | WAVELENGTH (CHANNEL) BIT RATE (2.4Gbps OR 10Gbps) |
| WCS | 4 | WAVELENGTH (CHANNEL) 1S/00S DISPLAY |

| EXCITATION BAND | 980nm BAND | 1480nm BAND |
|---|---|---|
| EXCITATION BANDWIDTH | 970 ~ 985nm : 15nm | 1450 ~ 1500nm : 50nm |
| AMPLIFIER NF (NOISE FIGURE) | LOW NOISE $\geq$ 3dB (THEORETICAL LIMIT) | $\geq$ 4.5 dB |
| CONVERSION EFFICIENCY RATIO | 63%> | 95%> |

FIG. 21

| STATUS | | CONTENTS | b1 | b2 | b3 | b4 | b5 | b6 | b7 | b8 | NOTE |
|---|---|---|---|---|---|---|---|---|---|---|---|
| NORMAL | | | 0 | 0 | 0 | 0 | 0 | 0 | 0 | 0 | |
| OSC LINE FAIL | | LOS, LOF, AIS, BIP, ERR DETECTED | 1 | — | — | — | — | — | — | — | WCx-AIS |
| | | REVERSE SIDE OSC LINE FAIL DETECT | 1 | — | — | — | — | — | — | — | WCx-AIS (LB) |
| COMMAND | a | NORMAL | — | 0 | 0 | 0 | 0 | 1 | 1 | 1 | |
| | b | AGC→ALC + SHUT DOWN INH ENABLE | — | 0 | 0 | 0 | 1 | 1 | 1 | 1 | |
| | c | CHANGING WCS/WCR INFO. | — | 0 | 0 | 1 | 0 | 1 | 1 | 1 | |
| | d | BST 0/1 SCAN | — | 0 | 0 | 1 | 1 | 1 | 1 | 1 | |
| | e | ALARM SCAN | — | 0 | 1 | 0 | 0 | 1 | 1 | 1 | |
| | f | WAITING STATUS | — | 0 | 1 | 0 | 1 | 1 | 1 | 1 | |
| | g | WCS/WCR RENEWAL | — | 0 | 1 | 1 | 0 | 1 | 1 | 1 | |
| | h | ALC→AGC + SHUT DOWN INH | — | 0 | 1 | 1 | 1 | 1 | 1 | 1 | |
| | i | ΔP UP | — | 1 | 0 | 0 | 0 | 1 | 1 | 1 | |
| | j | ΔP DOWN | — | 1 | 0 | 0 | 1 | 1 | 1 | 1 | |
| | | RESERVED | — | 1 | 0 | 1 | 0 | 1 | 1 | 1 | |
| | | RESERVED | — | 1 | 0 | 1 | 1 | 1 | 1 | 1 | |
| | | RESERVED | — | 1 | 1 | 0 | 0 | 1 | 1 | 1 | |
| | | RESERVED | — | 1 | 1 | 0 | 1 | 1 | 1 | 1 | |

FIG. 31

----▶ : OSC (AMP CONT BITS IN OSC-AIS BYTE)
: OSC (WCS, WCR)

◄—— : DCC

| | | WMUXA | |
|---|---|---|---|
| | VAT | TWAA | |
| | | OSC UNIT | AMP UNIT |
| S2 | | RECEIVING CONTROL SYMBOL FROM MC TRANSMITTING CONTROL SIGNAL ALONG WITH OSC | RECEIVING INSTRUCTION FOR MAKING TRANSITION TO AGC MODE FROM OSC UNIT FIXING ALC ATT BY PRE-HOLDING AND MAKING TRANSITION TO AGC MODE MASKING DISCONNECTION DETECTION ALARM NOTIFYING OSC IN RWA OF AGC MODE TRANSITION COMPLETION RECEIVING CONTROL SIGNAL FROM OSC UNIT TRANSMITTING CONTROL SYMBOL ALONG WITH OSC SYMBOL TO DOWNSTREAM INSTRUCTING AMP UNIT TO MAKE TRANSITION TO AGC MODE |
| S3 | | | |
| S4 | | | |
| S5 | | | |

FIG. 39B

|  | LWA W1~W3 ||
|  | OSC UNIT | AMP UNIT |
| --- | --- | --- |
| S2 | RECEIVING CONTROL SIGNAL FROM OSC UNIT TRANSMITTING CONTROL SYMBOL ALONG WITH OSC SYMBOL TO DOWNSTREAM INSTRUCTING AMP UNIT TO MAKE TRANSITION TO AGC MODE | RECEIVING INSTRUCTION FOR MAKING TRANSITION TO AGC MODE FROM OSC UNIT FIXING ALC ATT BY PRE-HOLDING, AND MAKING TRANSITION TO AGC MASKING DISCONNECTION DETECTION ALARM NOTIFYING OSC UNIT IN REVERSE DIRECTION OF AGC MODE TRANSITION COMPLETION, AND TRANSMITTING NOTIFICATION TO UPSTREAM RWA VIA OSC SIGNAL IN REVERSE DIRECTION |
| S3 |  |  |
| S4 |  |  |
| S5 |  |  |

FIG. 39C

|  | RWAB ||
|---|---|---|
|  | OSC UNIT | AMP UNIT |
| S2 | RECEIVE CONTROL SIGNAL FROM OSC SIGNAL INSTRUCTING AMP UNIT TO MAKE TRANSITION TO AGC MODE | RECEIVING INSTRUCTION FOR MAKING TRANSITION TO AGC MODE FROM OSC UNIT FIXING ALC ATT BY PRE-HOLDING, AND MAKING TRANSITION TO AGC MODE MASKING DISCONNECTION DETECTION ALARM NOTIFYING OSC UNIT OF TWA OF AGC MODE TRANSITION COMPLETION, AND TRANSMITTING NOTIFICATION TO UPSTREAM RWA VIA OSC SIGNAL IN REVERSE DIRECTION |
| S3 |  | |
| S4 |  |  |
| S5 |  |  |

FIG. 39D

WMUXA

| | OPERATOR | MCA | SAU | VAT |
|---|---|---|---|---|
| S6 | | MAKING COMPARISON BETWEEN COMPARISON SETTING AND VAT INPUT SHUTDOWN INFORMATION | | NOTIFYING MC OF INPUT SHUTDOWN INFORMATION (NORMAL OPERATION) |
| S7 | RE-VERIFYING INCREASE/DECREASE OPERATION INSTRUCTING/PRESENCE ABSENCE OF SETTING RE-CHANGE | DISPLAYING INPUT SIGNAL STATE UNMATCH REQUESTING INSTRUCTION INDICATING WHETHER OR NOT SETTING MUST BE RE-CHANGED | | |
| S8 | | INSTUCTING SAU TO PERFORM CONTROL ACCORDING TO SETTING | RECEIVING INSTRUCTION FROM MC PERFORMING VAT CONTROL ACCORDING TO NEW SETTING | PERFORMING CONTROL ACCORDING TO SAU INSTRUCTION (NORMAL OPERATION) |
| S9 | | RECEIVING NOTIFICATION FROM SAU IF SETTING DOES NOT MATCH DETECTION RESULT PROCESS PROCEEDS TO | VERIFYING VAT CONTROL CONVERGENCE MAKING COMPARISON BETWEEN SETTING AND DETECTION RESULT, AND NOTIFYING MC OF ITS RESULT | |
| S10 | | | | |
| S11 | | VERIFYING COMPLETION OF PREPARATION OF TRANSITION TO ALC MODE FOR ALL OF TWA, IWA, AND RWA | | |
| S12 | VERIFYING COMPLETION OF INCREASE/DECREASE OPERATION | NOTIFYING OSC UNIT OF TWA OF CONTROL SIGNAL VERIFY COMPLETION OF TRANSITION TO ALC MODE FOR ALL OF TWA IWA, AND RWA DISPLAYING COMPLETION OF INCREASE/DECREASE OPERATION | | |

FIG. 40A

| | TWAA | |
|---|---|---|
| | OSC UNIT | AMP UNIT |
| S6 | | |
| S7 | | |
| S8 | | |
| S9 | | |
| S10 | RECEIVING NEW SETTING FROM MC TRANSMITTING NEW SETTING ALONG WITH OSC SIGNAL TO DOWNSTREAM NOTIFYING AMP UNIT OF NEW SETTING | RECEIVING NEW SETTING FROM OSC UNIT CHANGING DISCONNECTION DETECTION THRESHOLD CALCULATING TOTAL POWER SETTING VALUE ACCORDING TO NEW SETTING AND PREPARING FOR ALC CORRESPONDING TO NEW SETTING |
| S11 | | NOTIFYING OSC UNIT IN RWA OF COMPLETION OF ALC MODE PREPARATION |
| S12 | RECEIVING CONTROL FROM MC TRANSMITTING CONTROL SIGNAL ALONG WITH OSC SIGNAL INSTRUCTING AMP UNIT TO MAKE TRANSITION TO ALC MODE | RECEIVING INSTRUCTION FOR MAKING TRANSITION TO ALC MODE FROM OSC UNIT MAKING TRANSITION TO ALC MODE ACCORDING TO NEW SETTING CANCELLING MASKING OF DISCONNECTION DETECTION ALARM |

(columns above grouped under WMUXA)

FIG. 40B

| | LWA W1 W3 | |
|---|---|---|
| | OSC UNIT | AMP UNIT |
| S6 | | |
| S7 | | |
| S8 | | |
| S9 | | |
| S10 | RECEIVING NEW SETTING FROM OSC SIGNAL TRANSMITTING NEW SETTING ALONG WITH OSC SIGNAL TO DOWNSTREAM NOTIFYING AMP UNIT OF NEW SETTING | RECEIVING NEW SETTING FROM OSC UNIT CHANGING DISCONNECTION DETECTION THRESHOLD CALCULATING POWER SETTING VALUE ACCORDING TO NEW SETTING AND PREPARING FOR ALC CORRESPONDING TO NEW SETTING |
| S11 | | NOTIFYING OSC UNIT IN REVERSE DIRECTION OF COMPLETION OF ALC MODE PREPARATION, AND TRANSMITTING THIS NOTIFICATION TO UPSTREAM RWA VIA OSC SIGNAL IN REVERSE DIRECTION |
| S12 | RECEIVING CONTROL SIGNAL FROM OSC SIGNAL TRANSMITTING CONTROL SIGNAL ALONG WITH OSC SIGNAL TO DOWNSTREAM INSTRUCTING AMP UNIT TO MAKE TRANSITION TO ALC MODE | RECEIVING INSTRUCTION FOR MAKING TRANSITION TO ALC MODE FROM OSC UNIT MAKING TRANSITION TO ALC MODE ACCORDING TO NEW SETTING CANCELLING MASKING OF DISCONNECTION DETECTION ALARM NOTIFYING OSC UNIT IN REVERSE DIRECTION OF COMPLETION TRANSITION TO ALC MODE, AND TRANSMITTING THIS NOTIFICATION TO UPSTREAM RWA VIA OSC SIGNAL IN REVERSE DIRECTION |

FIG. 40C

| | RWAB | |
|---|---|---|
| | OSC UNIT | AMP UNIT |
| S6 | | |
| S7 | | |
| S8 | | |
| S9 | | |
| S10 | RECEIVING NEW SETTING FROM OSC SIGNAL NOTIFYING AMP UNIT OF NEW SETTING | RECEIVING NEW SETTING FROM OSC UNIT CHANGING DISCONNECTION DETECTION THRESHOLD CALCULATING TOTAL POWER SETTING VALUE ACCORDING TO NEW SETTING, AND PREPARING FOR ALC CORRESPONDING TO NEW SETTING |
| S11 | | NOTIFYING OSC UNIT IN TWA OF COMPLETION OF ALC MODE PREPARATION AND TRANSMITTING THIS NOTIFICATION TO UPSTREAM RWA VIA OSC SIGNAL IN REVERSE DIRECTION |
| S12 | RECEIVING CONTROL SIGNAL FROM OSC SIGNAL INSTRUCTING AMP UNIT TO MAKE TRANSITION TO ALC MODE | RECEIVING INSTRUCTION FOR MAKING TRANSITION TO ALC MODE FROM OSC UNIT MAKING TRANSITION TO ALC MODE ACCORDING TO NEW SETTING CANCELLING MASKING OF DISCONNECTION DETECTION ALARM NOTIFYING OSC UNIT IN TWA OF COMPLETION OF TRANSITION TO ALC MODE, AND TRANSMITTING THIS NOTIFICATION TO UPSTREAM RWA VIA OSC SIGNAL IN REVERSE DIRECTION |

FIG. 40D

OPTICAL AMPLIFIER

CROSS-REFERENCE TO RELATED APPLICATIONS

This application is based upon and claims priority to Japanese Patent Application No. 10-048454, filed Feb. 27, 1998, the contents being incorporated herein by reference.

INCORPORATED BY REFERENCE

The entire contents of Japanese Patent Application No. Heisei 10-26229, filed Feb. 6, 1998, U.S. patent application Ser. No. 08/655,027, filed May 28, 1996, now U.S. Pat. No. 6,055,092 and U.S. patent application Ser. No. 08/845,847, filed Apr. 28, 1997 now U.S. Pat. No. 6,025,947 are hereby incorporated herein by reference.

BACKGROUND OF THE INVENTION

1. Field of Invention

The present invention relates to a wavelength-division multiplexing optical communication system for wavelength-division multiplexing (WDM) a plurality of optical signals having different wavelengths and transmitting a wavelength-division multiplexed signal via an optical fiber transmission line.

2. Description of the Related Art

As future multimedia networks are built, there will continue to be an increased demand for an optical communication system with a higher capacity necessary for building future multimedia networks. As the Internet, broadband ISDN (B-ISDN), and so forth, increasingly become more popular and as several-Mbps of information are handled for enjoying dynamic image communications at home, a terabit (Tbps=1,000 Gbps) transmission capacity of a trunk system will soon be required. A terabit-transmission capacity is orders of magnitude larger than a current communication capacity a telephone network, which is 64 kbps. Therefore, interest in time-division multiplexing ("TDM"), optical time-division multiplexing ("OTDM"), wavelength-division multiplexing ("WDM"), and so forth, as multiplexing technologies for realizing a mass communications capacity has also increased.

WDM technology makes use of a wide gain bandwidth of an Erbium-Doped Fiber Amplifier ("EDFA") for amplifying an optical signal on an optical level, and promises to be a flexible means for performing a cross-connect or an add/drop operation on an optical level, or for realizing a light wave network. Because of the progress resulting from the study and development of the WDM technology, attempts at developing an optical fiber amplifier in a wavelength-multiplexing optical fiber amplifier based on the EDFA have also been actively made.

A wavelength-multiplexing optical fiber amplifier is a key component of a wavelength-division multiplexing communication system. The wavelength-multiplexing optical fiber amplifier normally amplifies a wavelength-multiplexed optical signal that has a plurality of wavelengths using a single-mode optical fiber on which a rare-earth ion, such as an erbium ion (Er3+), is doped. The most typical erbium-doped optical fiber amplifier has a wide gain bandwidth at 4 THz or more over approximately a 35 nm wavelength range from 1530 nm to 1565 nm. Amplification is made in one step by wavelength-multiplexing optical signals that have several tens to one hundred different wavelengths within this gain bandwidth.

A wavelength-multiplexing optical fiber amplifier, which is one of the key components of a wavelength-division multiplexing optical communication system, has the following problems which arise due to the simultaneous amplification of a plurality of wavelength-multiplexed optical signals having different wavelengths.

(1) A wide bandwidth characteristic needed for amplifying a multi-wavelength signal, (2) A wavelength flatness of a gain over a wide input dynamic range, (3) Controllability of an optical output of each channel, (4) Loss compensation of a dispersion compensator, and (5) Optical output control of fluctuations in the number of input channels.

In addition, the wavelength-multiplexing optical fiber amplifier needs to have a low noise characteristic and a high output characteristic (or a high efficiency characteristic when a pump light power is converted into a signal light power).

The wavelength flatness of a gain over a wide input dynamic range is a serious problem when a wavelength-multiplexing EDFA is used as an optical amplification repeater (in-line amplifier). Over a wide dynamic range, only one optical amplifier is sufficient even if losses caused in repeater periods are different.

Each wavelength-multiplexed channel, or each wavelength, must be received at a reception end while maintaining a good quality. To implement this reception, lower and upper limits must be determined for the output of each channel of an optical amplification repeater. The problem associated with the controllability of an optical output of each channel occurs because the optical amplification repeater is not capable of generating waveforms of a generation repeater and extracting its timing, and therefore noises are accumulated. The upper limit is determined in order to prevent a signal waveform from degrading due to non-linear effects such as self-phase modulation ("SPM"), cross-phase modulation ("XPM"), and four-wave mixing ("FWM"), which arise in a single-mode optical fiber, or a transmission line. The lower limit is determined in order to prevent a signal-to-noise ratio ("SNR") from degrading due to amplified spontaneous emission ("ASE") from an optical fiber amplifier. The optical output of each channel (each wavelength) of the optical fiber amplifier must be between the upper and lower limits.

The problem associated with loss compensation of a dispersion compensator arises due to distortion of a waveform when a signal is transmitted at a high transmission speed, such as 10 GHz. This is because dispersion of approximately 18 ps/nm/km arises in a transmission line with a light having a 1.55 µm wavelength, which exists in an amplification bandwidth of the EDFA, if the transmission line is a 1.3 µm zero-dispersion single-mode optical fiber ("SMF"). To overcome this problem, there is a method for providing each repeater with a (negative) dispersion inverse to that which occurred in a fiber between repeaters. In addition, an insertion loss of a dispersion compensator is compensated for with an optical fiber amplifier.

The problem associated with optical output control of fluctuations in the number of input channels is serious when a wavelength-multiplexing optical fiber amplifier is applied to a light wave network to perform a cross-connect, or an add/drop operation. That is, the number of channels input to the optical fiber amplifier varies during operations. However, the output of each channel must keep at a predetermined value.

To overcome problems associated with optical output control of fluctuations in the number of input channels, it is necessary to arrange an optical service channel for controlling the optical fiber amplifier, and to cope with a change of the number of channels using the service channel.

SUMMARY OF THE INVENTION

It is an object of the present invention to provide an optical amplifier which overcomes the above described problems, and which is suitable for a wavelength-division multiplexing transmission system.

It is another object of the present invention to provide an optical amplifier that reduces manufacturing, maintenance, and inspection costs thereof.

Objects of the invention are achieved by an optical amplifier that includes a pre-stage optical amplifying unit and a post-stage optical amplifying unit. The pre-stage optical amplifying unit includes a rare-earth element doped optical fiber and a pump light source for inputting a pump light to the rare-earth element doped optical fiber. The post-stage optical amplifying unit includes a second rare-earth element doped optical fiber and a pump light source for inputting a pump light to the second rare-earth element doped optical fiber. A detachable optical coupling means optically connects the pre-stage optical amplifying unit and the post-stage optical amplifying unit.

Further objects of the invention are achieved by an optical amplifier that includes a pre-stage optical amplifying unit and a post-stage optical amplifying unit. The pre-stage optical amplifying unit includes a rare-earth element doped optical fiber for transmitting a wavelength-multiplexed signal light that has a plurality of different wavelengths, and the post-stage optical amplifying unit includes a second rare-earth element doped optical fiber. A detachable optical coupling means optically connects the pre-stage optical amplifying unit and said post-stage optical amplifying unit. A gain equalizer is positioned on an output side of the pre-stage amplifying unit to compensate for a wavelength dependency of a gain characteristic of the doped optical fiber.

Still further objects of the invention are achieved by an optical amplifier that includes a pre-stage optical amplifier and a post stage optical amplifier. The pre-stage optical amplifier has a rare-earth element doped optical fiber, to transmit a wavelength-multiplexed signal light having a plurality of different wavelengths, and outputs an amplified optical signal. The post-stage optical amplifier includes a second rare-earth element doped optical fiber. A dispersion compensator compensates for dispersion of the amplified optical signal from the pre-stage optical amplifier, and outputs a corresponding signal. A gain equalizer, positioned on an output side of the second rare-earth element doped optical fiber, compensates for wavelength-dependency of a gain characteristic of the second rare-earth element doped optical fiber and outputs an optical signal to a third rare-earth element doped optical fiber.

BRIEF DESCRIPTION OF THE DRAWINGS

The invention will now be described in more detail in connection with the attached drawings in which like reference characters represent like elements, wherein:

FIG. 7 is a table of a wavelength arrangement (channel arrangement) of optical signals having respective wavelengths of the wavelength-division multiplexing transmission system of FIGS. 1A and 1B;

FIG. 12 is a schematic view of contents of byte information inserted into each time slot of an optical service channel OSC;

FIG. 21 is a schematic view of operations of the optical amplifier;

FIG. 31 is an alternate schematic view of details of the OSC monitor/control monitor information when a number of channels is increased/decreased;

FIGS. 39A–39D together represent an alternate schematic view of an operational sequence of each optical amplifier when a number of channels is increased/decreased; and FIGS. 40A–40D together represent an alternate schematic view of an operational sequence of each optical amplifier when the number of channels is increased/decreased.

DETAILED DESCRIPTION OF THE PREFERRED EMBODIMENTS

Figure 1A:
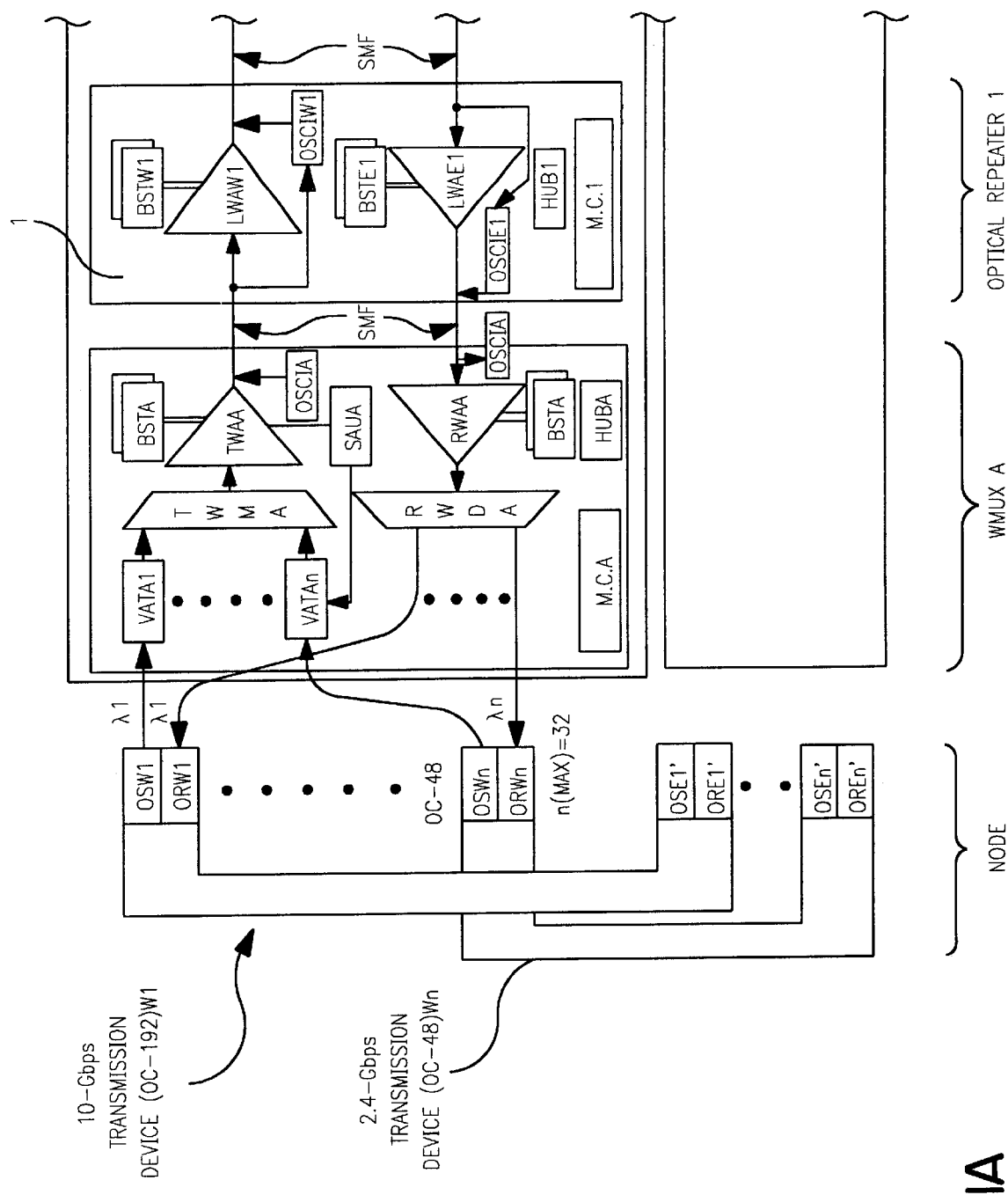
FIGS. 1A and 1B are schematic views of a wavelength-division multiplexing transmission system according to a preferred embodiment of the present invention.

Reference will now be made in detail to the preferred embodiments of the present invention, examples of which are illustrated in the accompanying drawings, wherein like reference numerals refer to like elements throughout.

Figure 1B:
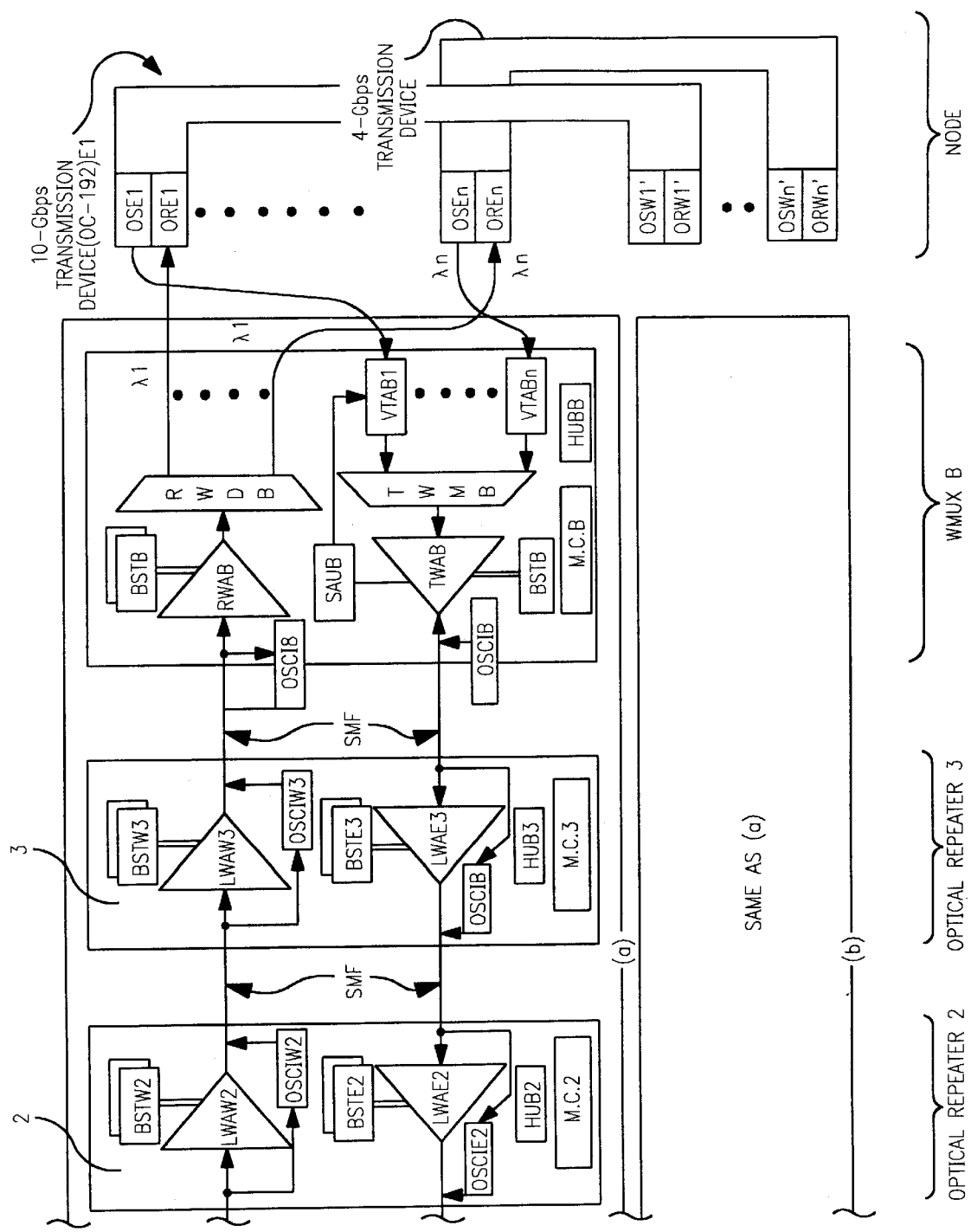

The optical wavelength-division multiplexing transmission system according to a preferred embodiment of the present invention is illustrated in FIGS. 1A and 1B. In the optical wavelength-division multiplexing transmission system, different wavelengths (channels) are allocated to an optical signal frame OC-192 at a bit rate of 10 Gbps and an optical signal frame OC-48 at a bit rate of 2.4 Gbps, as stipulated by the synchronous optical network ("SONET") transmission system of North America. Up to 32 channels, for example, are wavelength-multiplexed and transmitted via one single-mode optical fiber SMF. In the explanation provided, it is assumed that each optical signal is input from the left side (WEST side) of FIG. 1A and transmitted to the right side (EAST side) of FIG. 1B, or is input from the right side (EAST side) and transmitted to the left side (WEST side) of FIG. 1A.

A 10-Gpbs transmission device W1 located on the west side of FIG. 1A includes an optical signal transmitting unit OSW1 and an optical signal receiving unit ORW1. The optical signal transmitting unit OSW1 modulates a light wave having a wavelength $\lambda 1$ with a 10-Gbps electric signal conforming to the SONET STS-192 frame, and outputs a single wavelength optical signal having a wavelength $\lambda 1$ (10 Gpbs) conforming to the OC-192 optical signal frame. The optical signal with wavelength $\lambda 1$ is output at the next stage to a light variable attenuator VATA 1 arranged on an input side of a wavelength multiplexing/demultiplexing device WMUX A. The optical signal receiving unit ORW 1 receives a single wavelength optical signal having the wavelength $\lambda 1$ (10 Gbps) conforming to the OC-192 optical signal frame, which is transmitted via a single-mode optical fiber from an optical wavelength demultiplexer RWDA on the output side of the wavelength multiplexing/demultiplexing device WMUX A, and regenerates a 10-Gbps electric signal conforming to the STS-192 frame. A 10-Gbps transmission device E1 on the EAST side of FIG. 1B has the same configuration as that of 10-Gpbs transmission device W1 on the WEST side, and includes an optical signal receiving unit ORE 1 and an optical signal transmitting unit OSE 1. The optical signal receiving unit ORE 1 receives the signal wavelength optical signal having the wavelength $\lambda 1$ conforming to the OC-192 optical signal frame from an optical wavelength demultiplexer RWDB on an output side of a wavelength multiplexing/demultiplexing device WMUX B at the preceding stage, and regenerates a 10-Gbps electric signal conforming to the STS-192 frame. Optical signal transmitting unit OSE 1 modulates the light wave having the wavelength $\lambda 1$ with the 10-Gbps electric signal conforming to the SONET STS-192 frame, and outputs the single wavelength optical signal (10 Gbps) having a wavelength $\lambda 1$ conforming to the OC-192 optical signal frame to a variable light attenuator VATB 1 arranged on an input side of wavelength multiplexing/demultiplexing device WMUX B.

Similarly, a 2.4-Gbps transmission device Wn located on the WEST side of FIG. 1A includes an optical signal transmitting unit OSWn, and an optical signal receiving unit ORWn. The optical signal transmitting unit OSWn modulates a light wave having a wavelength $\lambda n$ with a 2.4-Gbps electric signal conforming to the SONET STS-48 frame, and outputs a single wavelength optical signal (2.4 Gbps) conforming to the OC-48 optical signal frame to a light variable attenuator VATAn arranged on the input side of the wavelength multiplexing/demultiplexing device WMUX A. Optical signal receiving unit ORWn receives the single wavelength optical signal having a wavelength $\lambda 1$ (2.4 Gbps), which conforms to the OC-48 optical signal frame and which is transmitted via a single-mode optical fiber SMF from an optical wavelength demultiplexer RWDA on the output side of wavelength demultiplexer WMUX A at the preceding stage, and regenerates a 2.4-Gbps electric signal conforming to the STS-48 frame.

A 2.4-Gbps transmission device En on the EAST side of FIG. 1B has the same configuration as the 2.4-Gbps transmission device Wn on the WEST side of FIG. 1A, and includes an optical signal receiving unit OREn and an optical signal transmitting unit OSEn. Optical signal receiving unit OREn receives a single wavelength optical signal having a wavelength $\lambda 1$ (2.4 Gbps) conforming to the OC-48 optical signal frame from an optical wavelength demultiplexer RWDB on the output side of the wavelength multiplexing/demultiplexing device WMUX B at the preceding stage, and regenerates a 2.4 Gbps electric signal conforming to the STS-48 optical signal frame. Optical signal transmitting unit OSEn modulates the light wave having the wavelength $\lambda n$ with a 2.4-Gbps electric signal conforming to the SONET STS-48 frame, and outputs a single wavelength optical signal having the wavelength λn (2.4 Gbps) conforming to the OC-48 optical signal frame to a variable light attenuator VATBn arranged on the input side of wavelength multiplexing/demultiplexing device WMUX B.

The 10-Gbps transmission devices W1 and E1 and the 2.4-Gbps transmission devices Wn and En are optical transmitting devices for configuring an existing SONET high-speed optical communication network. The optical wavelength-division multiplexing transmission system shown in FIGS. 1A and 1B receives and wavelength multiplexes (combines) optical signals λ1–λn from existing optical transmitting devices such as the optical transmitting devices W1–Wn on the WEST side of FIB. 1A, for up to 32 channels using the wavelength multiplexing/demultiplexing device WMUX A, and outputs a wavelength-multiplexed optical signal (a WDM signal). The wavelength-multiplexed optical signal is input to one existing single-mode optical fiber SMF. To compensate for the loss of the single-mode optical fiber SMF, a wavelength-multiplexing optical fiber amplifier that includes an Er-doped optical fiber as an optical amplification fiber is used as an optical repeater, with which wavelength-multiplexed optical signals are amplified together and transmitted to an opposing optical wavelength multiplexer WMUX B. Optical wavelength multiplexer (multiplexing/demultiplexing device) WMUX B wavelength-demultiplexes the received wavelength-multiplexed signal into single wavelength optical signals λ1–λn for each of the channels, and transmits the wavelength-demultiplexed signals to optical transmitting devices E1–En on the EAST side of FIG. 1B.

FIG. 1B illustrates only the 10-Gbps transmission device E1 and the 2.4-Gbps transmission device En. However, since the wavelength multiplexing transmission does depend on a bit rate, a particular channel may be allocated to an optical signal of a different transmission speed (bit rate) from a transmitting device, such as a 600-Mbps transmitting device (which transmits an optical signal conforming to the OC-12 optical signal frame), or the like.

In order to perform a wavelength multiplexing transmission, wavelengths used for an optical transmission of each optical transmitting device must be different. However, an existing optical transmitting device does not always transmit optical signals having different wavelengths. Therefore, wavelengths are converted into suitable wavelengths for a wavelength multiplexing transmission system with a transponder, or wavelength converter (not shown) before optical signals are input to wavelength multiplexing/demultiplexing devices WMUX A and WMUX B. The transponder (not shown) is assumed to be arranged at the input and output ends of the wavelength multiplexing/demultiplexing WMUX A and WMUX B for each channel in FIGS. 1A and 1B. The optical wavelengths to be input from the optical transmitting devices W1–Wn and from E1–En to wavelength multiplexing/demultiplexing devices WMUX A and WMUX B are represented as different wavelengths λ1–λn for each existing system.

The optical signals, having wavelengths λ1–λn, input from the existing single wavelength light transmitting devices W1–Wn and E1–En to wavelength multiplexing/demultiplexing devices WMUX A and WMUX B, are input to light variable attenuators (VATA1–VATAn and VATB1–VATBn) arranged for the respective optical signals having the respective wavelengths (channels). Because the environments where the optical signals input from the respective optical transmitting devices to the light variable attenuators are transmitted differ depending on the respective optical signals, the optical power levels are diversified. Accordingly, by arranging a light variable attenuator for each of the channels, and adjusting the input level of each of optical signals to optical wavelength multiplexers TWMA and TWMB, a level difference of each wavelength is suppressed when each of the optical signals propagates through the wavelength-division multiplexing transmission system. An optical signal whose power level is adjusted by the light variable attenuator is input to optical wavelength multiplexer TWMA or TWMB, wavelength-multiplexed, and output as an optical wavelength-multiplexed signal (WDM).

The optical wavelength-multiplexed signal is then input to an optical post amplifier ("TWAA" or "TWAB"), with which the signal is amplified and output. The optical post amplifier TWAA or TWAB is a wavelength multiplexing optical amplifier, and includes an Er-doped fiber, for light amplification and a pump light source which is normally used for supplying the energy to the Er-doped fiber for light amplification. Pump light source units BSTA and BSTB for expansion can be added with an increase in the number of channels (wavelengths). If a pump light is supplied to the Er-doped fiber, and input optical signals of each channel are attempted to be amplified with a predetermined gain, the power of the pump light must be increased in proportion to the number of channels. Accordingly, when the power of the pump light supplied by a pump light source becomes insufficient, and an optical signal cannot be amplified with a predetermined gain, pump light source units for expansion BSTA and BSTB are added to increase the power of the pump light.

As illustrated in FIGS. 1A and 1B, part of the optical wavelength-multiplexed signal amplified with optical post amplifiers TWAA and TWAB is split and input to an optical spectrum analyzer SAUA or an optical spectrum analyzer SAUB. Optical spectrum analyzers SAUA and SAUB detect the power level of the optical signal of each channel, included in the optical wavelength-multiplexed signal after being amplified, and determine whether the power level is an appropriate value. Optical spectrum analyzers SAUA and SAUB feed back the determination result to light variable attenuators VATA 1 through VATA n and VATB 1 through VATB n, each of which is arranged for each input of each channel, to adjust the light attenuation of each light variable attenuator so that an output of light pre-amplifier TWAA or TWAB is appropriate, and thereby adjusting the level of the optical signal of each channel.

Managing devices MCA unit and HUBA included in optical wavelength multiplexing/demultiplexing device WMUX A and managing devices MCB unit and HUBB used in WMUX B are monitors composed of an LSI, and so forth. The devices process the result of the detection of optical spectrum analyzers SAUA and SAUB, an alarm signal, and so forth. The details will be described later.

Optical repeaters 1–3 include optical in-line amplifiers LWAW1–LWAW3 and LWAE1–LWAE3, and serve as relay stations for amplifying an optical wavelength-multiplexed signal attenuated by passing through the single-mode optical fiber. Pump light source units for expansion BSTW1–BSTW3 and BSTE1–BSTE2 are added to respective optical repeaters 1–3 as well as optical in-line amplifiers LWAW1–LWAW3 and LWAE1–LWAE3. At the same time, optical repeaters 1–3 include HUB 1–HUB 3 and the managing units MC1 unit–MC3 unit, which are monitors of the pump light source units for expansion.

FIGS. 1A and 1B illustrate three optical repeaters. However, the number of optical repeaters is not limited to three. The required number of repeaters must be arranged according to a transmission distance.

The wavelength-multiplexed light output from optical repeater 3 or 1 optical repeater is input to optical pre-amplifier RWAB or RWAA arranged in wavelength multiplexing/demultiplexing device WMUX B or WMUX A, and is amplified. Both optical pre-amplifiers RWAB and RWAA are wavelength multiplexing optical amplifiers like the other optical post-amplifier and optical in-line amplifier. Optical pre-amplifiers RWAB and RWAA include a pump light source for supplying a pump light power to the Er-doped fiber. Pump light source units for expansion BSTB and BSTA are arranged in wavelength multiplexing/demultiplexing devices WMUX B an WMUX A, and insufficient pump light power, due to an increase in the number of channels, can be increased by supplying the pump light source units to optical pre-amplifiers RWAB and RWAA. Optical pre-amplifiers RWAB and RWAA input the amplified optical wavelength-multiplexed signal to optical wavelength demultiplexers RWDB and RWDA, where the signal is wavelength-demultiplexed (split) into optical signals having respective wavelengths. The wavelength-demultiplexed signals of each channel is converted by a transponder into an optical wavelength to be input by the existing optical transmitting devices of 10-Gbps transmission devices E1 and W1 and 2.4-Gbps transmitting devices En and Wn.

In FIGS. 1A and 1B, a 10-Gbps optical signal having a wavelength λ1 is input to optical signal receiving unit ORE1 in optical transmitting device E1, and to optical signal receiving unit ORW1 in optical transmitting device W1, while a 2.4-Gbps optical signal having a wavelength λn is input to optical signal receiving unit OREn in optical transmitting device En, and optical signal receiving unit ORWn in optical transmitting device Wn. That is, the optical signal input from 10-Gbps transmission device W1 on one side of the optical wavelength-division multiplexing system is transmitted to 10-Gbps transmission device E1 on the other side, while the optical signal input from 2.4-Gbps transmission device Wn on one side of the optical wavelength-division multiplexing system is transmitted to 2.4-Gbps transmission device En on the other side.

Figure 10:
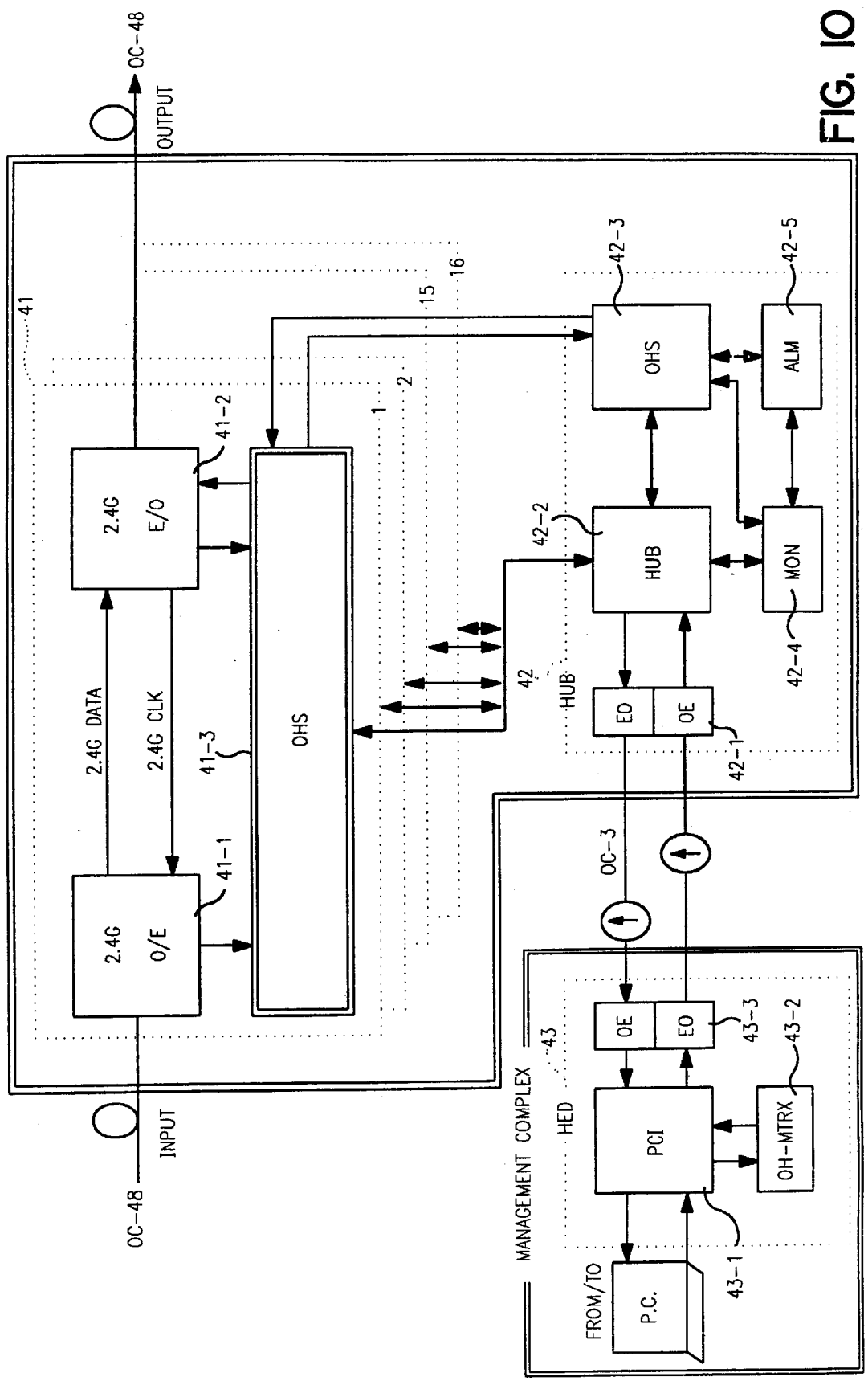
FIG. 10 is a schematic view of a basic configuration of a transponder for converting an optical signal wavelength of an existing transmitting device based on a channel arrangement of FIG. 6.

In FIGS. 1A and 1B, 10-Gbps optical transmission devices W1 and E1 and 2.4-Gbps transmission devices Wn and En are key-shaped. On both sides of the optical wavelength-division multiplexing system (b) located in a lower portion (having the same configuration as that of optical wavelength-division multiplexing system (a) in the upper portion), respective corresponding optical signal transmitting units OSE 1', OSE n', OSW 1', and OSW n' and the optical signal receiving units ORE 1', ORE n', ORW 1', and ORW n' are arranged. This is because a network having a loop-shaped (ring-shaped) topology, that is, a SONET ring network, is considered to be configured by optical wavelength-division multiplexing systems (a) and (b). Accordingly, in optical wavelength-division multiplexing system (b) in the lower portion, the left and right sides respectively correspond to the EAST side of FIG. 1A and WEST side of FIG. 1B, and an optical signal is therefore transmitted in a loop state. However, the optical wavelength-division multiplexing system may not always be in a loop state, and may also be applied to a linear network.

Figure 2:
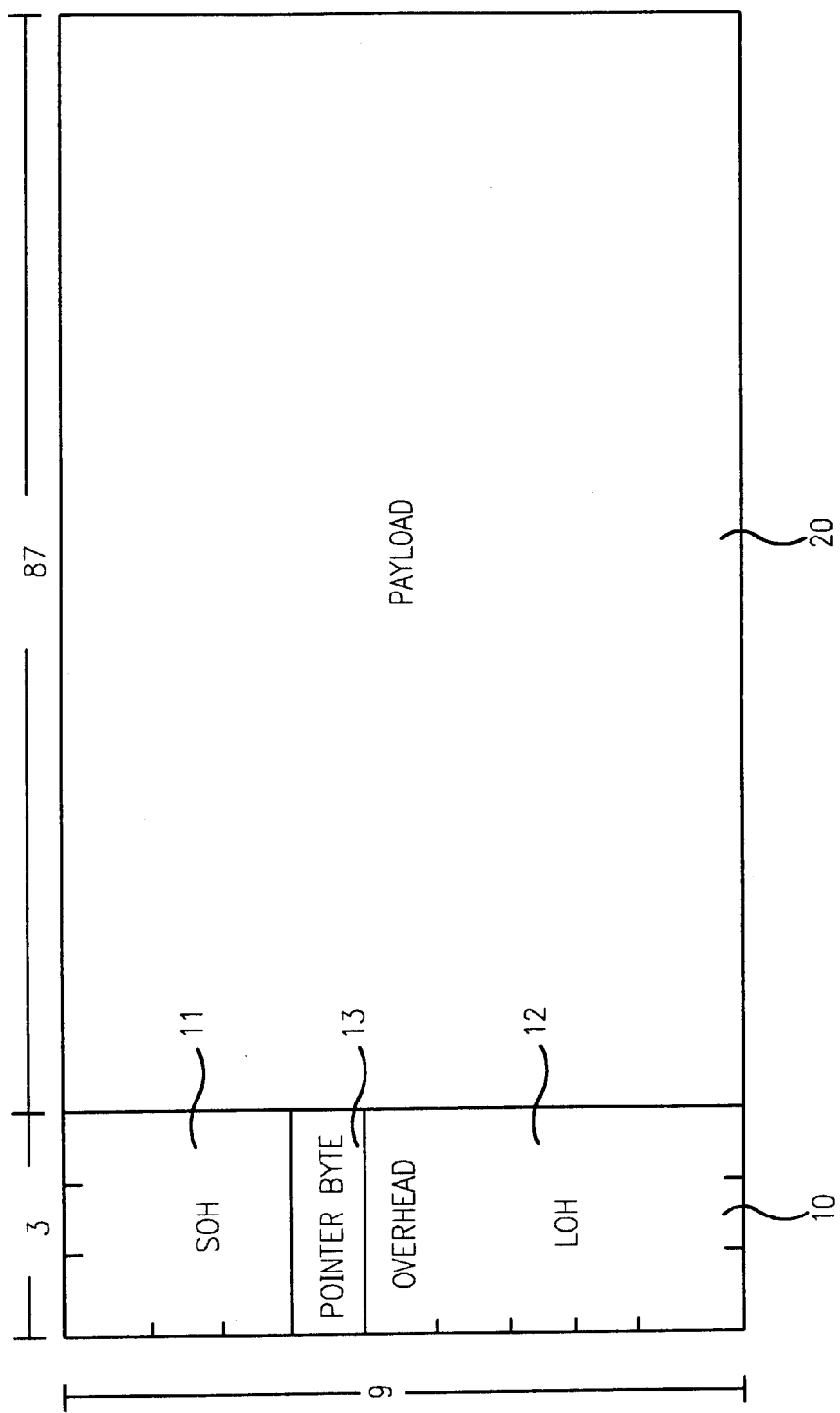
FIG. 2 is a schematic view of a frame format of an SONET STS-1 frame.

Next an explanation is provided concerning a transmission frame handled by the SONET transmission system, which is the format of an optical signal transmitted on respective λ1–λn channels in the optical wavelength-division multiplexing transmission system shown in FIGS. 1A and 1B. FIG. 2 illustrates a fundamental (Synchronous Transport Signal Level, "STS-1") frame format handled by the SONET. Transmission frame STS-1 is composed of an overhead 10 of 9×3 bytes where various maintenance and operation (monitor and control) information such as a frame synchronization signal, a parity check signal, and so forth, are stored. In addition, transmission frame STS-1 is composed of a payload 20 of 9×87 bytes in which actual communication data are stored. Overhead 10 and payload 20 total 9×90 bytes of information. The frame of 90×9 bytes (=810 bytes) is transmitted by the SONET 8,000 times per second, thereby generating a signal having a transmission speed of 90×9×8×8000=51.84 Mbps. The SONET transmitting system is a standard synchronous multiplexing transmitting system of North America, which conforms to the international standard (Synchronous Digital Hierarchy "SDH") set forth by the ITU-T. In the SDH transmitting system, the frame corresponding to the STS-1 is referred to as a Synchronous Transfer Module Level 0 "STM-0".

Figure 3:
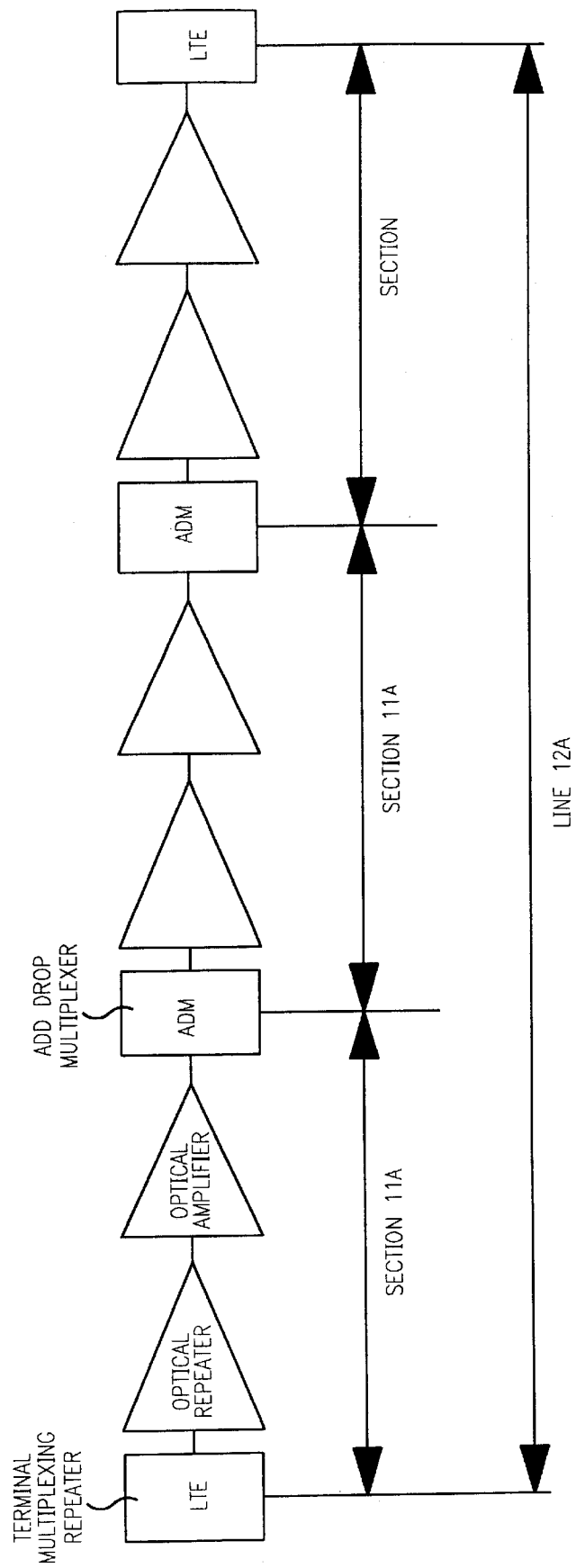
FIG. 3 is a schematic view of a section overhead (SOH) and a line overhead (LOH) of an STS-1 frame format.

As illustrated in FIGS. 2 and 3, overhead 10 includes preparation of a section overhead SOH 11 and a line overhead LOH 12. Section overhead 11 is terminated and the contents are replaced at a Line Terminal Equipment ("LTE") or an Add/Drop Multiplexer ("ADM") when a communication is made between the LTE and the ADM or between ADMs, and line overhead LOH 12 is terminated and the contents are replaced at each LTE when a communication is made between LTEs. In the SDH, the section overhead is referred to as a relay section overhead ("R-SOH"), while the line overhead is referred to as a multiplexing section overhead ("M-SOH"), both of which are sometimes referred to as a section overhead ("SOH").

Figure 4:
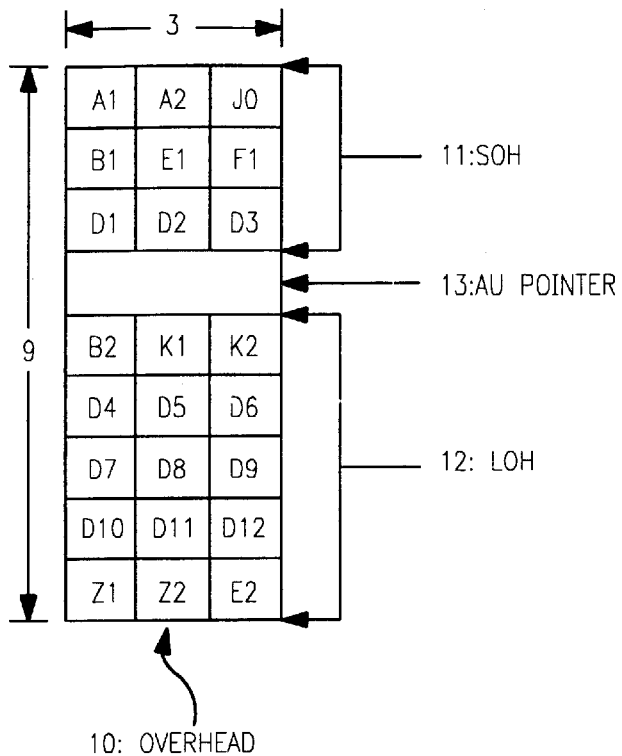
FIG. 4 is a schematic view of a byte assignment of an overhead of an STS-1 frame.

Overhead 10 includes various items of maintenance and operation information. As illustrated in FIG. 4, the SOH 11 includes, for example, bytes A1 and A2 for establishing a frame synchronization, a transmission error monitor (bit interleaved parity "BIP") byte B1 in a section 11A, data communication channel ("DCC") bytes D1–D3 (192-Kbps data link) for making a communication in order to monitor and control the section 11A, etc. LOH 12 includes a BIP byte B2, automatic protection switch ("APS") bytes K1 and K2 on a line 12A, DCC bytes D4–D12 (576-Kbps datalink) on the line 12A, etc. In FIGS. 2 and 4, a pointer byte (administrative unit, "AU" pointer) 13 indicates a difference between a phase of a transmission frame and that of a management data unit (virtual tributary unit "VT") frame stored in a payload 20 by using an address. The pointer byte 13 allows a VT frame synchronization to be established quickly.

Figure 5:
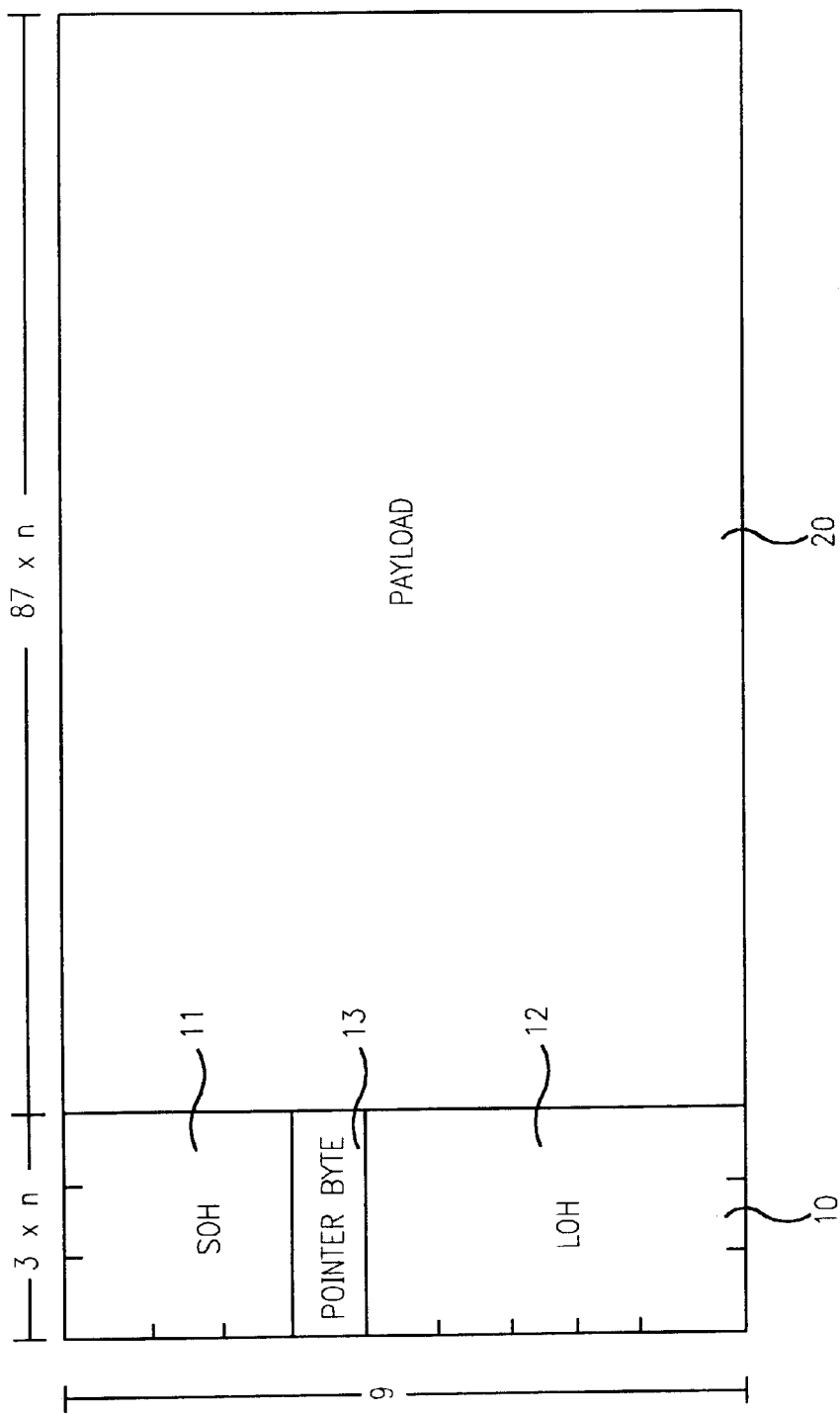
FIG. 5 is a schematic view of an STS-n frame obtained by n-byte-multiplexing an STS-1 frame.

In the SONET, the fundamental transmission frame (STS-1) having such a frame structure is time-division-multiplexed (byte-multiplexed) in byte units by "n" frames (n=3, 12, 48, 192, etc.), thereby structuring an STS-n frame as illustrated in FIG. 5. For example, if 3, 12, 48, and 192 STS-1 frames are respectively byte-multiplexed, high-speed signals such as an STS-3 (51.84 Mbps×3=155.52 Mbps, an STS-12 (622.08 Mbps), an STS-48 (2.488 Gbps), or an STS-192 (9.953 Gbps) are respectively generated. Note that the STM-N (N=n/3) corresponds to the signals having transmission speeds equivalent to those of the STS-n.

Figure 6:
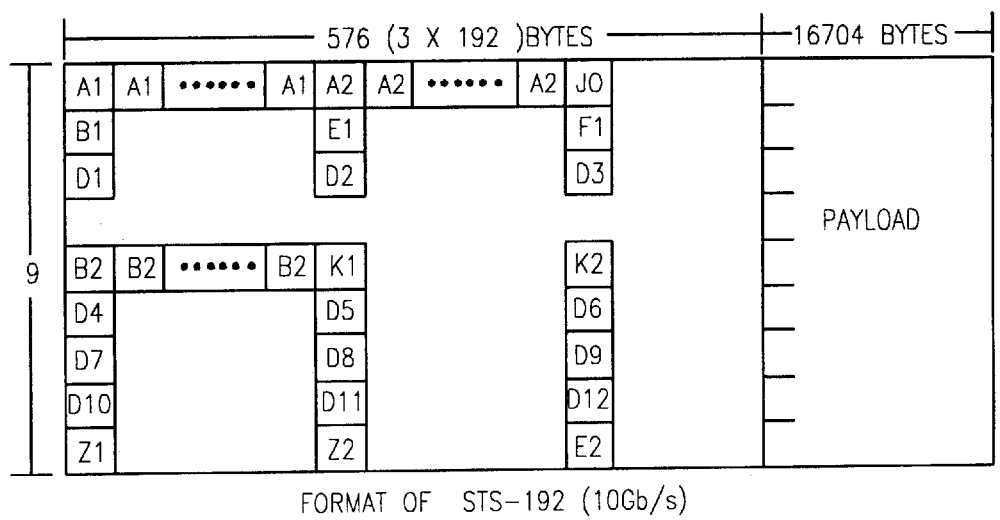
FIG. 6 is a schematic view of a frame format of an OC-192 (STS-192)

As illustrated in FIG. 6, using the STS-192 (optical signal frame OC-192) explained in reference to FIGS. 1A and 1B as an example, the frame is composed of an overhead of 9×576 (3×192) bytes and a payload 20 of 9×16, 704 (87× 192) bytes. Note, however, that all of the bytes of the overhead are not multiplexed. That is, particular signals (such as A1, A2, B2 (BIP byte), and so forth are n-byte-multiplexed. The other control signals remain constant regardless of a multiplexing number. Therefore, most of the overhead is currently unused.

With the optical wavelength-division multiplexing system shown in FIGS. 1A and 1B, the OC-192 and 48 (Optical Carrier-Level 192 and 48), which are the optical signal frames corresponding to the above described STS-192 and 48, are wavelength-multiplexed for up to 32 channels, and the wavelength-multiplexed frames are transmitted over one single-mode optical fiber as a wavelength-multiplexed signal.

In the optical wavelength-division multiplexing system shown in FIGS. 1A and 1B, optical repeaters 1–3 composed of optical in-line amplifiers LWAW1–LWAW3 and LWAE1–LWAE3 are arranged along a route of a single-mode optical fiber transmission line SMF. The optical amplifiers used in the optical wavelength-division multiplexing system illustrated in FIGS. 1A and 1B, which include optical post-amplifiers TWAA and TWAB and optical pre-amplifiers RWAB and RWAA, fundamentally have only one capability for amplifying an optical signal in an amplification bandwidth (gain bandwidth) of an Er-doped fiber. However, the optical repeaters 1–3 are installed in unattended stations at sites distant from the nodes W and E in many cases. Therefore, the capability for monitoring optical repeaters 1–3 by some means or other is required. Additionally, the optical wavelength-division multiplexing system illustrated in FIGS. 1A and 1B can wavelength-multiplex up to 32 optical signals having different wavelengths (channels), and transmit the wavelength-multiplexed signals by using one single-mode optical fiber SMF.

When the system is introduced, it is more cost efficient to transmit only optical signals having, for example, 4 wavelengths (channels), and to increase the number of channels as traffic grows. It is desirable to increase the number of channels while continuing to use the system. Since the pump light power supplied to an Er-doped fiber may sometimes be insufficient to increase the number of channels described above, as the number of channels increases, a staged increase of the pump light sources for expansion BSTW1–BSTW3, BSTE1–BSTE3, BSTA, and BSTB must be performed. Therefore a capacity to control optical repeaters 1–3 is provided according to the increase in number of channels. Consequently, with the optical wavelength-division multiplexing system illustrated in FIGS. 1A and 1B, an optical service channel "OSC" for transmitting a signal which monitors/controls optical repeaters 1–3 is transmitted using an optical signal that has a wavelength outside the gain bandwidth of an Er-doped fiber (normally in the optical wavelength range between approximately 1530 nm to 1560 nm).

As illustrated in FIGS. 1A and 1B, wavelength multiplexing/demultiplexing devices WMUX A and WMUX B further wavelength-multiplex the monitor/control optical signals output from optical service channel interfaces OSCIA and OSCIB with the wavelength-multiplexed optical signal (including optical signals for up to 32 channels), amplified by optical pre-amplifiers TWAA and TWAB, and input the wavelength-multiplexed signal to the single-mode optical fiber SMF. In each of optical repeaters 1–3, the monitor/control optical signal is split with the inputs to the optical in-line amplifiers LWAW1–LWAW3 and LWAE1–LWAE3. The split signal is input to the optical service channel interfaces OSCIW1–OSCIW3 and OSCIE1–OSCIE3, converted into an electric signal that is transmitted to HUB 1–HUB 3. The monitor/control signal output from the HUB 1–HUB 3 is converted into an optical signal by the optical service channel interfaces OSCIW1–OSIW3 and OSCIE1–OSCIE3, and further multiplexed with the wavelength-multiplexed optical signal which is amplified and output by the optical in-line amplifiers LWAW1–LWAW3 and LWAE1–LWAE3 as a monitor/control optical signal. In optical wavelength multiplexing/demultiplexing devices WMUX B and WMUX A, the monitor/control optical signal is split with the inputs of optical pre-amplifiers RWAB and RWAA, the split signal is input to optical service channel interfaces OSCIB and OSCIA, and the input signal is converted into an electric signal. HUBB and HUBA included in optical wavelength multiplexing/demultiplexing devices WMUX B and WMUX A analyze the monitor/control signal converted into the electric signal, thereby monitoring and controlling optical repeaters 1–3.

FIG. 7 is a table exemplifying a channel (wavelength) arrangement in the optical wavelength-division multiplexing transmission system shown in FIGS. 1A and 1B. According to the ITU-T recommended draft Gmcs, an optical wavelength of 1552.52 nm is defined as a reference wavelength, and channels are defined to be arranged at the grids in 100-GHz (approximately 0.8 nm wavelength) intervals as the wavelength (channel) allocation used in an optical wavelength-division multiplexing transmission system adopting an Er-doped fiber, as illustrated in FIG. 7. Since the optical wavelength-division multiplexing system illustrated in FIGS. 1A and 1B conforms to this recommended draft, respective wavelengths (channels) are arranged at grids marked with crosses when 4, 8, 16, and 32 wavelengths are multiplexed. The optical service channel OSC is set to an optical wavelength 1510 nm outside the gain bandwidth (amplification bandwidth) of the Er-doped fiber.

As a matter of course, this channel arrangement is only one example. According to the channel arrangement illustrated in FIG. 7, up to 16 wavelengths can be multiplexed and transmitted by using one half of the gain bandwidth of the Er-doped fiber. The broad bandwidth characteristic requested for an optical amplifier with an Er-doped fiber is improved compared to when the entire gain bandwidth (1530 nm to 1560 nm) of the Er-doped fiber is used.

In case of the channel arrangement of 4-Wave-WDM, the channel spacing between each of the 4 channels is 400 GHz (i.e., approximately 3.2 nm) which is as great as four times the minimum channel spacing 100 GHz. Similarly, in case of 8-Wave WDM, the channel spacing between each of the 8 channels is 200 GHz (i.e., approximately 1.6 nm) which is as great as two times of the minimum channel spacing. Usually, when bandwidth for an optical filter is narrower, the cost of the optical filter is more expensive. Therefore, a less expensive optical filter can be employed for 4-Wave WDM or 8-Wave WDM.

Figure 11:
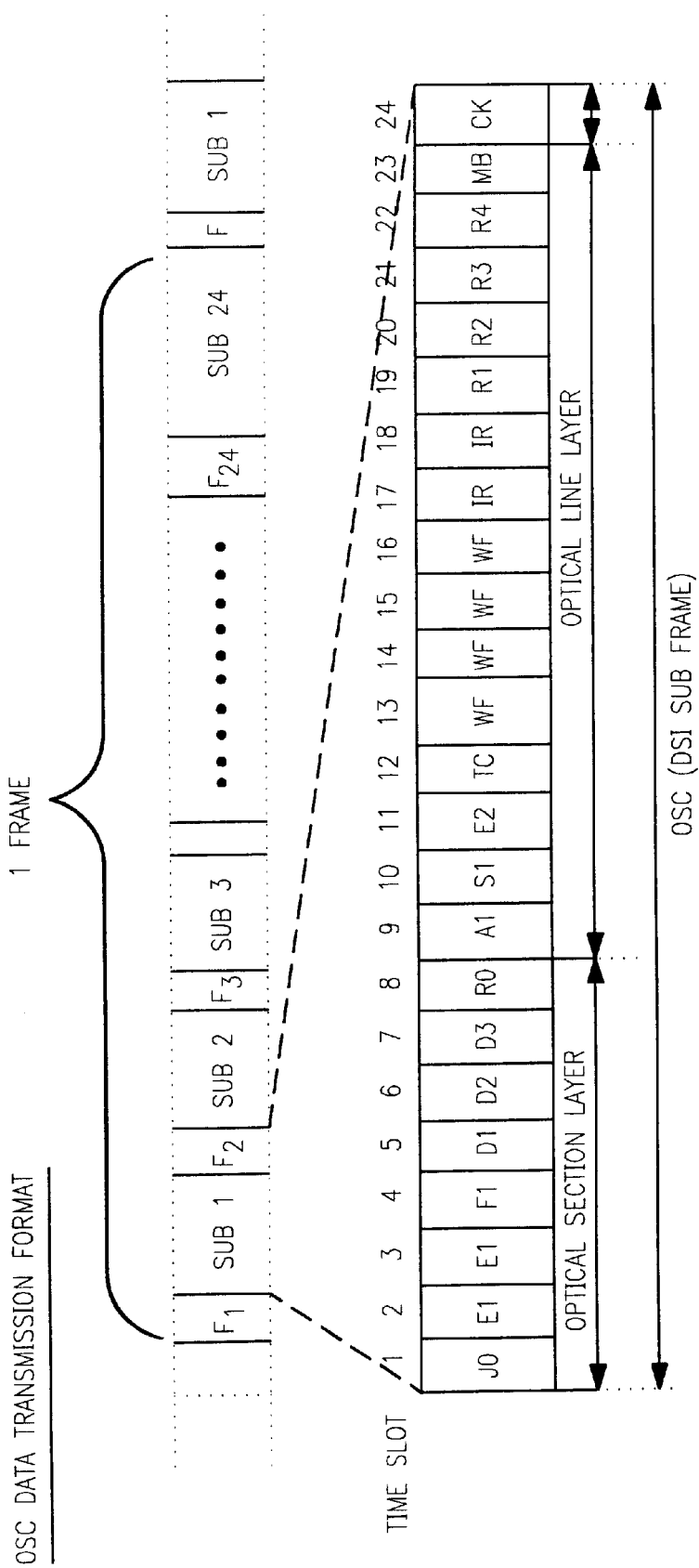
FIG. 11 is a schematic view of a frame format of an optical service channel.
Figure 13:
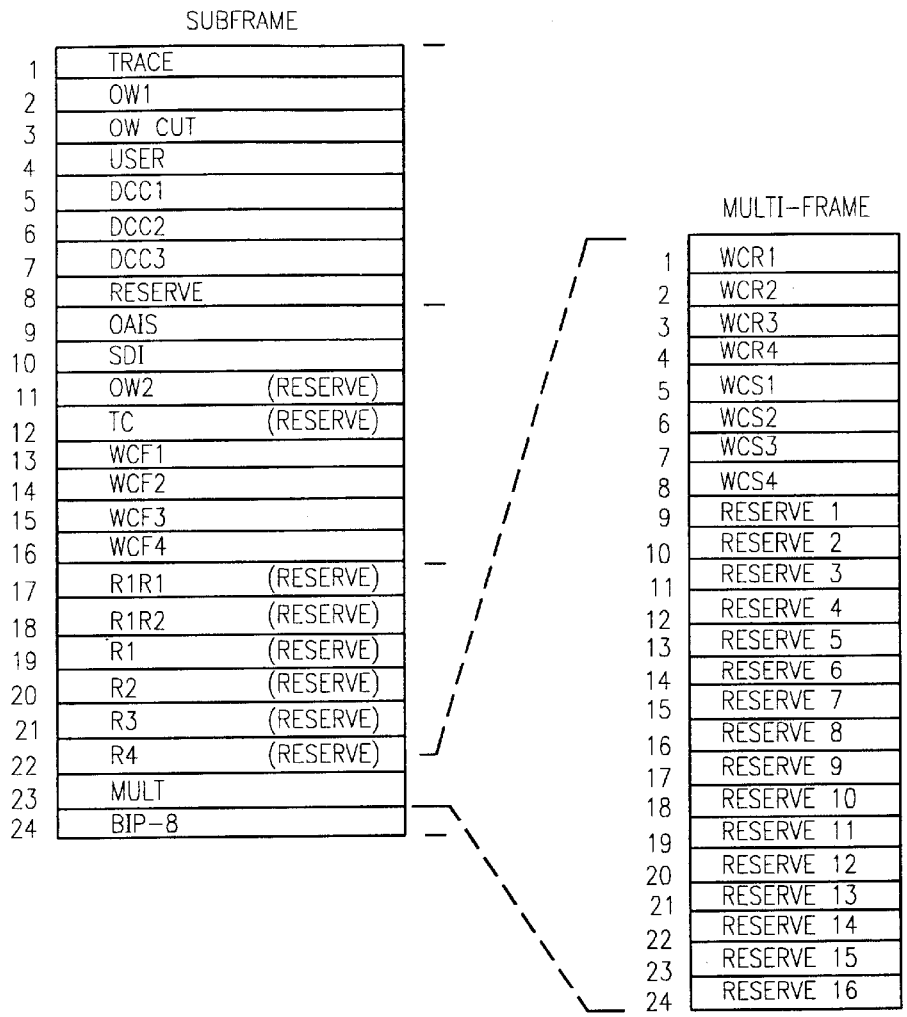
FIG. 13 is a schematic view of a structure of a multi-frame of a multi-frame byte in a time slot 23 of an optical service channel OSC.

An explanation will now be provided concerning the transmission format of the optical service channel OSC. The optical wavelength-division multiplex transmission system illustrated in FIGS. 1A and 1B uses a 1.544-Mbps DS1 format as the OSC transmission format. FIG. 11 illustrates the OSC transmission format, in which subframes Sub1–Sub24 structure one frame in the OSC transmission format. 1-bit frame synchronization bits $F_1$–$F_{24}$ are arranged between respective subframes, and frame synchronization is implemented by detecting a particular bit pattern formed by subframes $F_1$–$F_{24}$. The first bit of one frame is then identified. A subframe "Sub" is composed of 24 time slots (8 bits). Byte information, including the contents illustrated in FIG. 12 is inserted into each of the subframes. The byte information of time slot 23 has a multi-frame structure. One multi-frame is composed of the byte information 8×24 bits (24 bytes) in each time slot 23 of subframes Sub1–Sub24 as illustrated in FIG. 13. The contents of bytes 1–8 in one multi-frame are as follows.
1) Bytes 1–4 (32 bits)
   WCR1–WCR4: Wavelength Channel Rate
   The transmission rate (10 Gbps or 2.4 Gbps) of each channel (wavelength) is displayed by 1 bit.
2) Bytes 5–8 (32 bits)
   WCS1–WCS4: Wavelength Channel State
   Whether each channel (wavelength) is either busy (In-Service) or idle (Out-Of-Service) is indicated by 1 bit.
3) Bytes 9–24
   Reserve (Reserved Byte)

Among the byte information, time slots 9–10, 13–16, and 19–24 include control information required for controlling the optical amplifier, especially control information for increasing/decreasing the number of channels, and are terminated at OSC interfaces OSCIA, OSCIB, and OSCIW1–OSCIW3, arranged in wavelength multiplexing/demultiplexing devices WMUX A and WMUX B, and optical repeaters 1–3. The other byte information is terminated at the management complex "MC" unit, and analyzed. Information to be terminated at the OSC interfaces will be described later.

Each OSC byte information is coded mark inversion ("CMI")-encoded and transmitted. Accordingly, the clock speed of a DS1 frame illustrated in FIG. 11 will become 1.544×2 Mbps.

Figure 8:
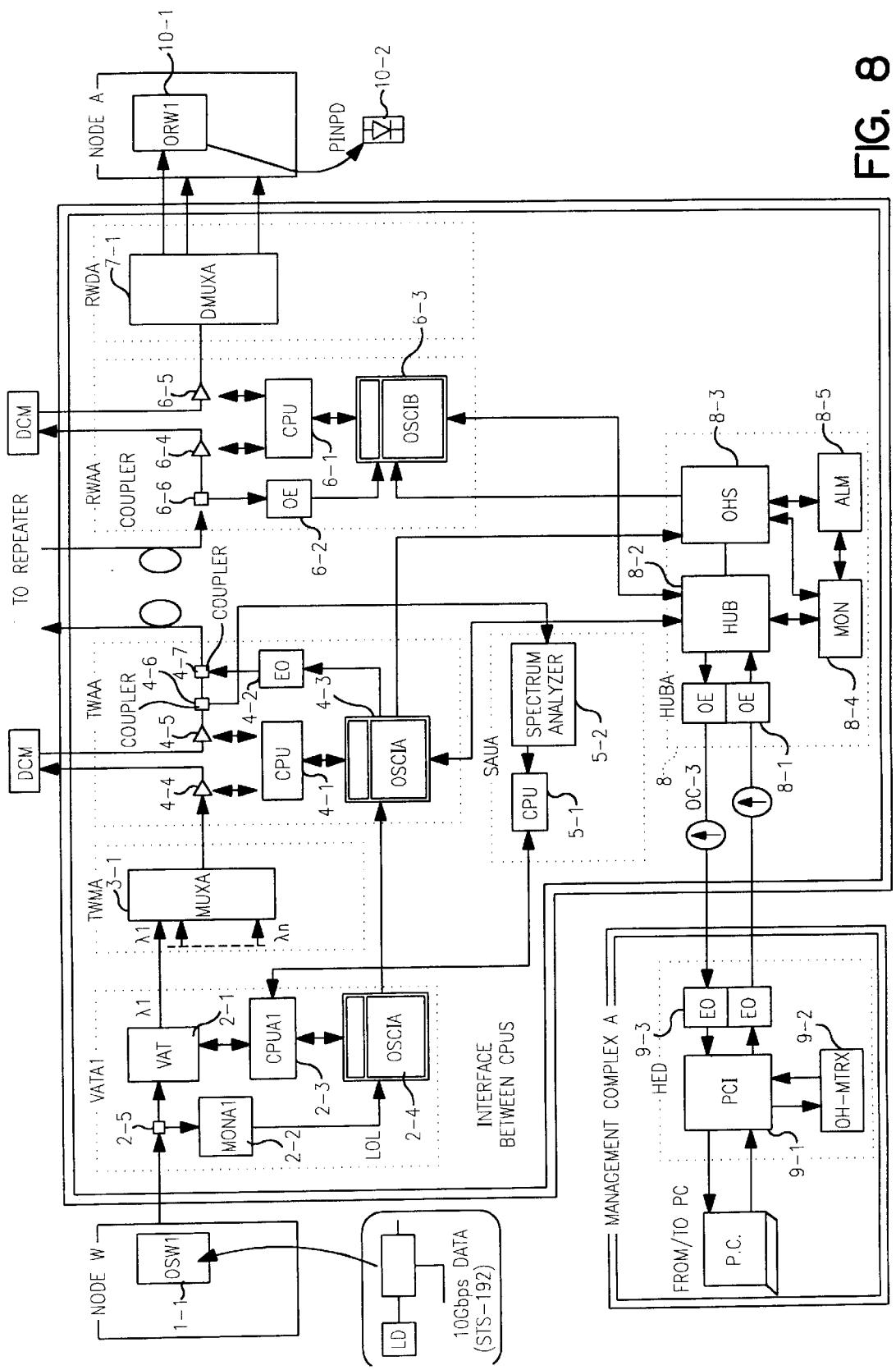
FIG. 8 is a schematic view of a basic configuration of wavelength multiplexing/demultiplexing devices WMUX A and WMUX B.

FIG. 8 illustrates the detailed configuration of optical transmitting device W1 and wavelength multiplexing/demultiplexing device WMUX A, which are illustrated in FIGS. 1A and 1B. FIG. 8 illustrates the configuration obtained by combining the upper stage (from the WEST to the EAST) and the lower stage (from the EAST to the WEST) of the optical wavelength-division multiplexing transmission system (a) illustrated in FIGS. 1A and 1B, and represents one shelf. An optical signal transmitting unit OSW1 of the optical transmission device W1 comprises a narrow bandwidth light transmitting unit 1-1. Narrow bandwidth light transmitting unit 1-1 is composed of a light source implemented by a semi-conductor laser LD and an external light modulator Mod for amplitude-modulating a direct current light output from the semi-conductor laser LD with a 10-Gbps STS-192 signal. A Mach-Zehnder optical modulator adopting an LiNbO$_3$ crystal may be used as external light modulator Mod. The optical signal output from the external light modulator has a narrow spectrum width. The optical signal output from OSW1 is input to a variable attenuator module VATA 1 arranged for each input optical signal. Part of the optical signal is split in variable attenuator module VATA-1 by an optical coupler 2-5, and the split signal is received by a monitor 2-2. The monitor 2-2 monitors whether the OC-192 signal is output from optical signal transmitting unit OSW1 in optical transmission device W1 of node W. This signal is converted into an electric signal and input to an optical service channel interface OSCIA 2-4.

Meanwhile, the optical signal which is not split by optical coupler 2-5 is input to variable light attenuator 2-1 of variable attenuator module VATA 1 and the power level is adjusted. From attenuator VAT 2-1, signal is input to an optical multiplexer 3-1 in an optical multiplexer module TWMA. The optical signal is input to optical multiplexer module TWMA to be wavelength-multiplexed with optical signals having different wavelengths, input from variable light attenuator modules VATA 2–VATA n (not shown) arranged for the other channels. Optical multiplexer module TWMA inputs a wavelength-multiplexed optical signal to an optical post-amplifier module TWAA. The wavelength-multiplexed optical signal input to the optical post-amplifier module TWAA is amplified by a pre-stage optical amplifier 4-4 controlled by a CPU 4-1, and is input to a dispersion compensation fiber DCF in a dispersion compensation module DCM. The dispersion compensation fiber is suitable for compensating for dispersion occurring in an optical signal of each channel in a wavelength-multiplexed optical signal, resulting from propagation through the single-mode optical fiber SMF between optical pre-amplifier TWAA and optical in-line amplifier LWAW1, and assigns this dispersion value to the optical signal of each channel. The wavelength-multiplexed optical signal where the suitable dispersion value is assigned to the optical signal of each channel is again amplified by a post-stage optical amplifier 4-5, and is input to an optical coupler 4-6. Part of the wavelength-multiplexed optical signal, which is split by optical coupler 4-6, is input to a spectrum analyzer 5-2 in an optical spectrum analyzer unit SAUA, where a wavelength difference and a power level, of an optical signal having each wavelength (channel) included in the wavelength-multiplexed optical signal amplified by the optical pre-amplifier TWAA are measured.

The measurement results are then input to a CPU 5-1. CPU 5-1 processes the results of the spectrum measurement of the wavelength-multiplexed optical signal, obtained from spectrum analyzer 5-2, and notifies CPUA1 2-3 in VATA 1 of the results. Based on the measurement results, CPUA1 controls the amount of optical attenuation of variable attenuator 2-1, and then controls a power level of an optical signal having a wavelength $\lambda 1$. For example, if the wavelength of an optical signal of each channel is detected to be different from the grid shown in FIG. 7 by a predetermined value (such as 0.05 nm) or more, an error is determined to have occurred. As a result, the amount of attenuation of attenuator 2-1 is set to a signal shutdown state to prevent the optical signal from being transmitted.

An OSC interface OSCIA 4-3 in an optical post-amplifier module TWAA is notified of the monitor/control signal that an OSCIA interface OSCIA 2-4 receives from monitor 2-2. OSCIA 4-3 detects the presence/absence of a fault from the received monitor/control signal. For example, if the signal shutdown occurrence is notified, the amount of attenuation of variable attenuator 2-1 is maximized in order to prevent the optical signal from being input to the optical multiplexer TWMA. After receiving the monitor/control signal from the OSC interface OSCIA 2-4, OSCIA 4-3 transmits this signal to an electro-optic converter EO 4-2, where the signal is converted into a monitor/control optical signal having a wavelength of 1510 nm. A WDM coupler 4-7 combines this signal with a wavelength-multiplexed optical signal which is amplified and output from optical pre-amplifier TWAA.

Information communicated by a system operator, such as an order wire signal OW, a data communication channel DCC, and so forth, in time slots 1–7, 11, 12, 17, and 18 which are not terminated in the monitor control signal (OSC) received by OSCIA 4-3 is transmitted to an overhead serial interface OHS 8-3 of a hub unit (HUBA) 8. An alarm is detected by an alarm detecting unit ALM 8-5, while, at the same time, the transmitted information is processed between alarm detecting unit ALM 8-5 and HUB 8-2. Communication is made, for example, between OSCIA 2-4, OSCIA 4-3 and HUB 8-2, and between OSCIB 6-3, OSCIB 7-2, and the HUB 8-2, by using ATM cells. Communication is made, for example, between OSCIA 4-3, OSCIB 6-3, and OHS 8-3, by using serial data. OSCIA 2-4, OSCIA 4-3, OSCIB 6-3, and OSCIB 7-2 receive the monitor/control ATM cells from HUB 8-2, analyze the VCI of the ATM cells, and control each unit according to its content. In addition, OSCIA 2-4, OSCIA 4-3, OSCIB 6-3, and OSCIB 7-2 receive the monitor/control signal from each unit, put the signal into an ATM cell, and output the cell to HUB 8-2. HUB 8-2 terminates the respective OSCIs. That is, HUB 8-2 makes the ATM cells transmitted from the respective OSCIs consistent. Namely, HUB 8-2 analyzes the VCI of a transmitted ATM cell, selects either of the output to OHS 8-3 or the output to each of the OSCIs according to its content, and makes the selected output. HUB 8-2 interfaces with a monitor MON 8-4 for monitoring/controlling its own unit. Alarm ALM 8-5 monitors information, such as termination of the alarm information from each unit, information of an error of the interface signal with the managing device MCA unit, and so forth. Monitor MON 8-4 extracts the information from the ATM cell based on the control information from the MCA unit, which is output from HUB 8-2, and performs control. Additionally, monitor MON 8-4 puts the alarm information, etc., detected within the unit, into an ATM cell, and outputs the ATM cell to the HUB 8-2.

From HUB 8-2, each information is transmitted to a managing device (Management Complex "MCA" unit) using an OC-3 signal (150 Mbps), which is an optical signal, via an opto-electric converter 8-1. In the MCA unit, signals are exchanged between the electro-optic and opto-electric converters (EO and OE) 9-3, and the monitor/control information and the overhead information are identified by a personal computer interface PCI 9-1. The overhead information is transmitted to an OH-MTRX 9-2, where the overhead is processed. The control/monitor information is transmitted to a personal computer, serving as a console, and is terminated. The MCA unit is arranged in common with a plurality of shelves. For example, the unit can control up to 6 shelves.

On the receiving side of the wavelength multiplexing/demultiplexing device WMUX A, upon receipt of the wavelength-multiplexed optical signal from optical repeater 1 via single-mode optical fiber SMF, the monitor/control optical signal (having a wavelength of 1510 nm) is split using a WDM coupler 6-6 in an optical pre-amplifier module RWAA, the split signal is converted into an electric signal by an opto-electric converter 6-2, and the converted signal is terminated by the OSC interface OSCIB 6-3. Additionally, OSCIB 6-3 obtains the overhead information from OHS 8-3, and controls pre-stage optical amplifier 6-4 and post-stage optical amplifier 6-5 via CPU 6-1, based on the monitor/control information and the overhead information, by communicating with HUB 8-2.

A dispersion compensation module DCM for compensating for dispersion is arranged between pre-stage optical amplifier 6-4 and post-stage optical amplifier 6-5. Dispersion which has occurred in the optical signal of each channel, caused by propagation through the single-mode optical fiber between optical repeater 1 and wavelength multiplexing/demultiplexing WMUX A, is compensated for using a dispersion compensation fiber in dispersion compensation module DCM.

The wavelength-multiplexed optical signal amplified by optical pre-amplifier module RWAA is split into optical signals having respective wavelengths by an optical demultiplexer 7-1 included in an optical demultiplexer module RWDA. The split signals are received by a PIN photodiode (PINPD) 10-2, which is a photoreceiver of optical signal receiving unit (ORW 1) in optical transmission device W1. The signals are converted into a 10-Gbps STS-192 signal.

Figure 9:
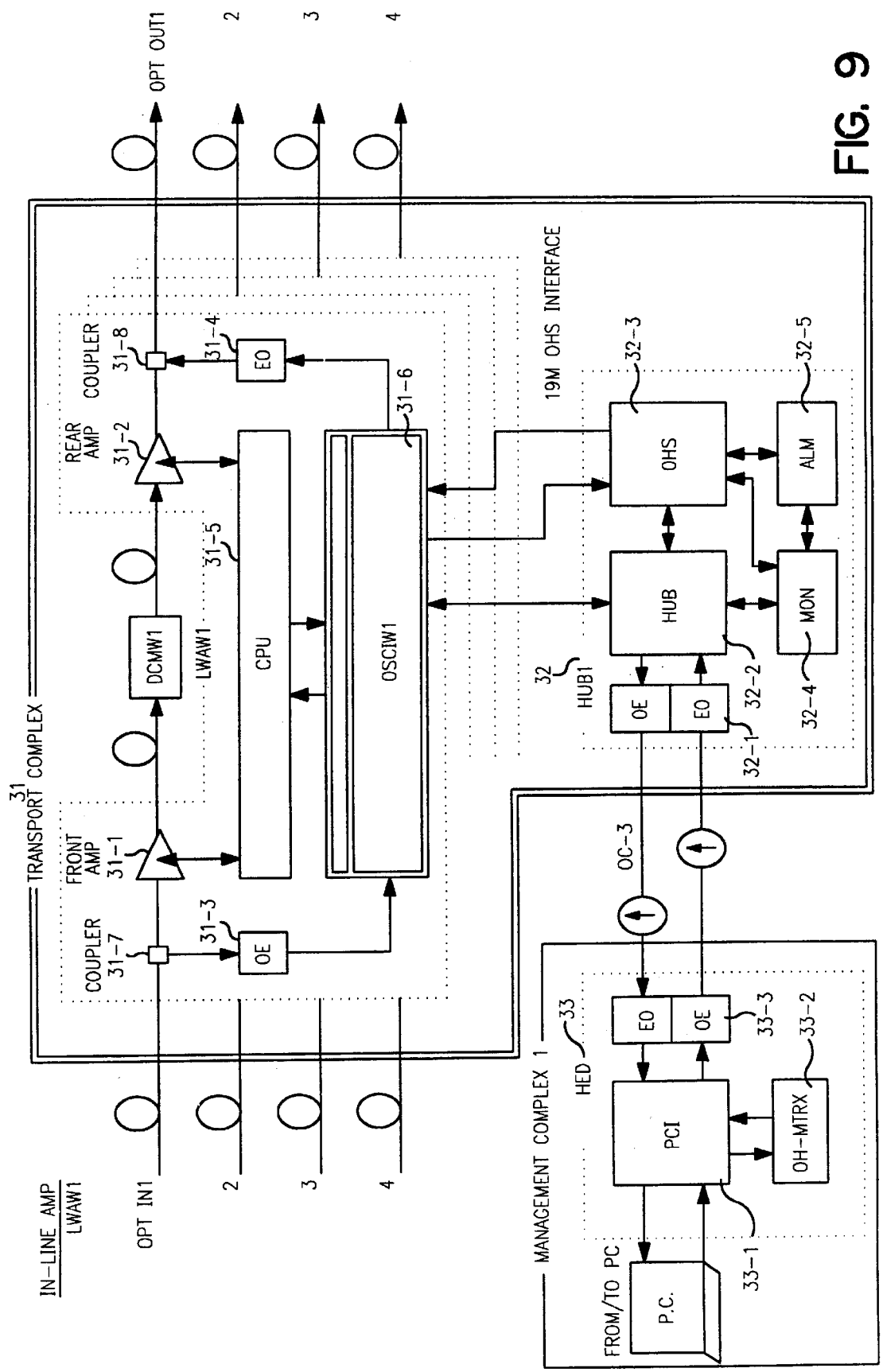
FIG. 9 is a schematic view of a basic configuration of optical in-line amplifiers LWAW 1–3.

A configuration of optical repeater 1 is illustrated in FIG. 9. The wavelength-multiplexed optical signal from the single-mode optical fiber is input from any of OPT-IN1–OPT-IN4 to a shelf of a repeater illustrated in FIG. 9, and is input to an optical in-line amplifier module (LWAW1) 31 arranged on a corresponding board. First, the monitor/control optical signal is split by a WDM coupler 31-7. The split signal is then converted into an electric signal by an opto-electric converter 31-3, and is input to an OSC interface (OSCIW1) 31-6. OSCIW1 3+6 terminates time slots 8–10, 13–16, and 19–24, which include control information required for controlling an optical amplifier in the monitor/control signal as described above, and transmits the remaining information to an OHS 32-3. The terminated information is transmitted to a HUB 32-2. The operations of HUB 1 module and a managing device MC are the same as those illustrated in FIG. 8.

OSCIW1 (31-6) that has received the monitor/control signal, processes the information by making a communication with HUB 32-2, and controls amplification ratios of pre-stage amplifier 31-1 and post-stage amplifier 31-2 by outputting a control signal to a CPU 31-5. The wavelength-multiplexed optical signal which is not split by WDM coupler 31-7 is amplified by pre-stage optical amplifier 31-1 controlled by CPU 31-5, and is dispersion-compensated by a dispersion compensation module DCMW1. The dispersion-compensated signal is again amplified by post-stage optical amplifier 31-2 also controlled by CPU 31-5. The amplified signal is then combined with the monitor/control signal converted into an optical signal by electro-optic converter 31-4, and is output from OPT OUT1–OPT OUT4.

The optical repeater illustrated in FIG. 9 includes one optical in-line amplifier module LWAW1 as one shelf, and indicates that up to four modules can be included. An optical device which is easy to handle can be assembled by accommodating an optical part on one shelf as described above.

FIG. 10 is a schematic diagram illustrating the configuration of the transponder used for converting a wavelength of an optical signal, which transponder is not illustrated in FIGS. 1A and 1B. An OC-48 optical signal is input from the input side of the transponder. This optical signal is input to a 2.4-Gbps opto-electric converter O/E in a photoelectric converting module 41. 2.4-Gbps clock are output from an opto-electric converter 41-1. Simultaneously, information, such as overhead information referred to in reference to FIG. 2, 13 is input to an overhead interface OHS 41-3, and the signal is transmitted to a HUB 42. In addition, wires are arranged on a reverse side of a circuit board of photoelectric converting module 41 for future upgrade, so that overhead information is input to OHS 42-3.

As described above, OHS 42-3 transmits/receives the overhead information, and HUB 42-2 terminates the signal from OHS 41-3. The information is transmitted as an optical signal from HUB 42-2 to an HED module 43 in a management complex unit via an opto-electric converter 42-1, and the optical signal is converted into an electric signal by an opto-electric converter 43-3. The information converted into the electric signal is divided into the overhead and monitor/control information by a PCI 43-1. The overhead is processed by an OH-MTRX 43-2 and control information is processed by a personal computer PC serving as a console terminal.

OHS 41-3 generates a 2.4-Gbps OC-48 optical signal by controlling electro-optic converter E/O 41-2, and outputs the generated signal. At this time, the wavelength of this optical signal (OC-48) is converted into the wavelength of the channel allocated by the wavelength-division multiplexing system.

FIG. 10 illustrates inclusion of shelves 1–16 of photoelectric converting module 41. The overhead information and the monitor/control information are collected from OHS 42-3 on each of the shelves of HUB module 42, where the information is processed. The transponder is configured for each shelf and is arranged on one rack, in order to make connections between the shelves with optical wires and electric wires. As a result, an optical device with high operability can be manufactured.

Figure 14:
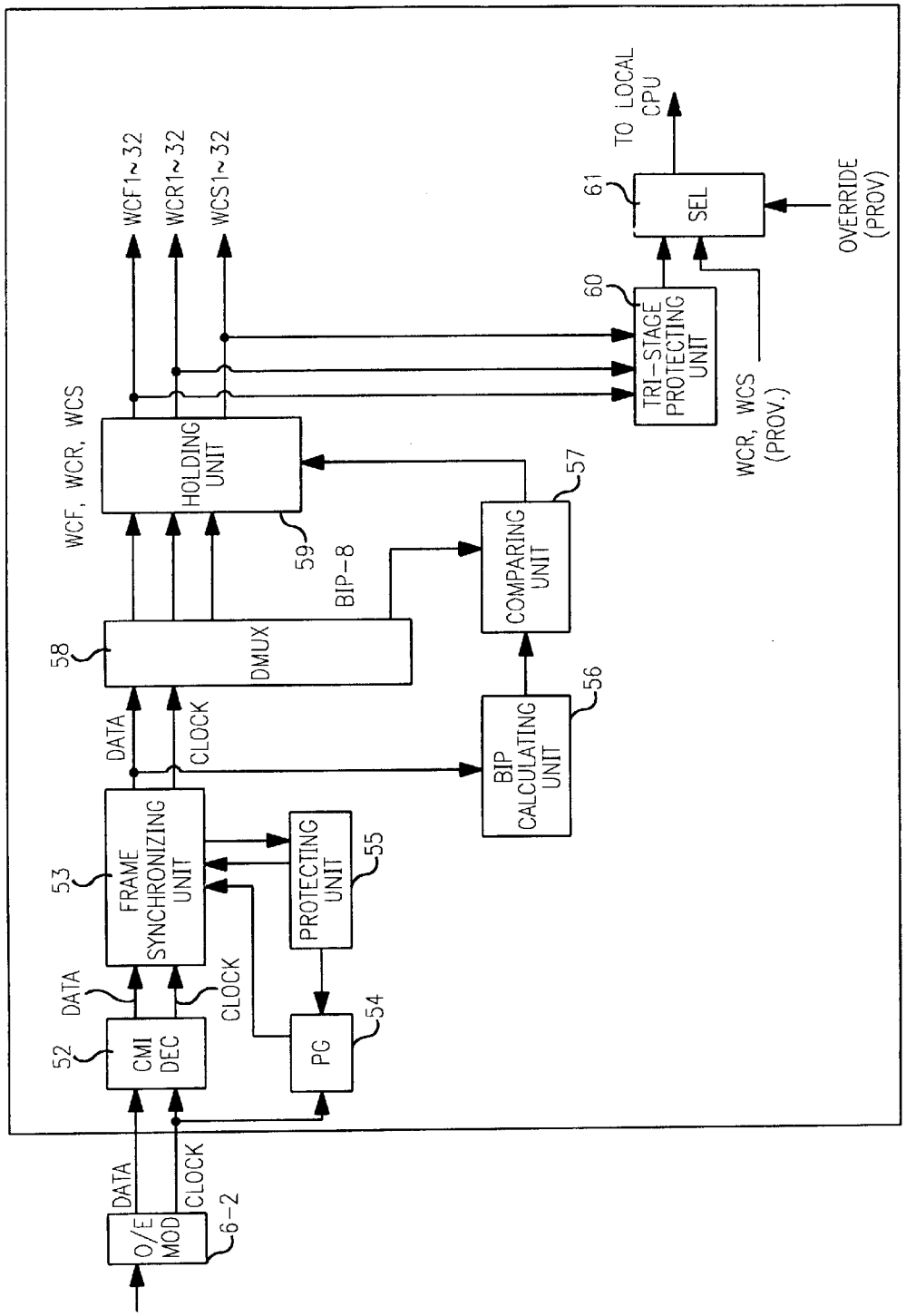
FIG. 14 is a schematic view of a basic configuration of a signal receiving unit of an optical service channel interface OSCIA of a wavelength multiplexing/demultiplexing device.

FIG. 14 is a schematic diagram illustrating part of the configuration of OSCIB 6-3 arranged in RWAA of FIG. 8. The monitor/control signal, the optical signal, input to an O/E module 6-2, is converted into an electric signal. A clock signal is generated, based on the converted data, and the optical signal is input to a CMI decoder 52. The data is then decoded by CMI decoder 52, and is input to a frame synchronizing unit 53. At this time, the clock signal is also input to frame synchronizing unit 53. Frame synchronizing unit 53 detects the data frame of the monitor/control signal. This detection result is input to a protecting unit 55, which attempts to match the timing at which a frame is generated. If a predetermined number of matches is found, protecting unit 55 transmits a signal, indicating that frames have been synchronized, to frame synchronizing unit 53. In the meantime, a PG 54 extracts the clock from the signal prior to being CMI-decoded, receives the timing at which a frame is generated, and supplies the clock for establishing synchronization. The generated clock is input to frame synchronizing unit 53, and is used for detecting a frame.

When frames are synchronized, both the data for which the frame synchronization process is performed and the clock signal are input to a demultiplexer 58, and optical amplifier monitor/control signals (wavelength channel failure "WCF", wavelength channel rate "WCR", and wavelength channel state "WCS") are extracted. A BIP calculating unit 56 obtains a parity from the output of frame synchronizing unit 53, and transmits the parity to a comparator 57. Comparator 57 makes a comparison between the transmitted parity and the parity bit of the monitor/control signal output from demultiplexer 58. If they match, comparator 57 outputs the monitor/control signal unchanged without holding the signal in a holding unit 59. The monitor/control signal output from holding unit 59 is directly transmitted to a HUBA module 8, illustrated in FIG. 8. At the same time, the monitor/control signal, output from holding unit 59, is input to a selector via a tri-stage protecting unit 60. Monitor control signals (indicated as a "provision") such as the WCR, WCS, etc. input from an operator, are input to a selector 61. Selector 61 selects and outputs either the received monitor/control signal or the monitor/control signal input from the operator upon receipt of the input of an override signal input by the operator via predetermined software, and outputs the selected signal to local CPU 6-1 which controls TWAA.

If an error occurs at the time of a parity check made by comparator 57, the respective monitor/control signals in the previous states, such as WCF, WCR, and WCS, are held in holding unit 59 so as not to be output. If an error elimination is waited for and completed, holding unit 59 transmits signals WCF, WCR, and WCS to the HUBA module.

Figure 15:
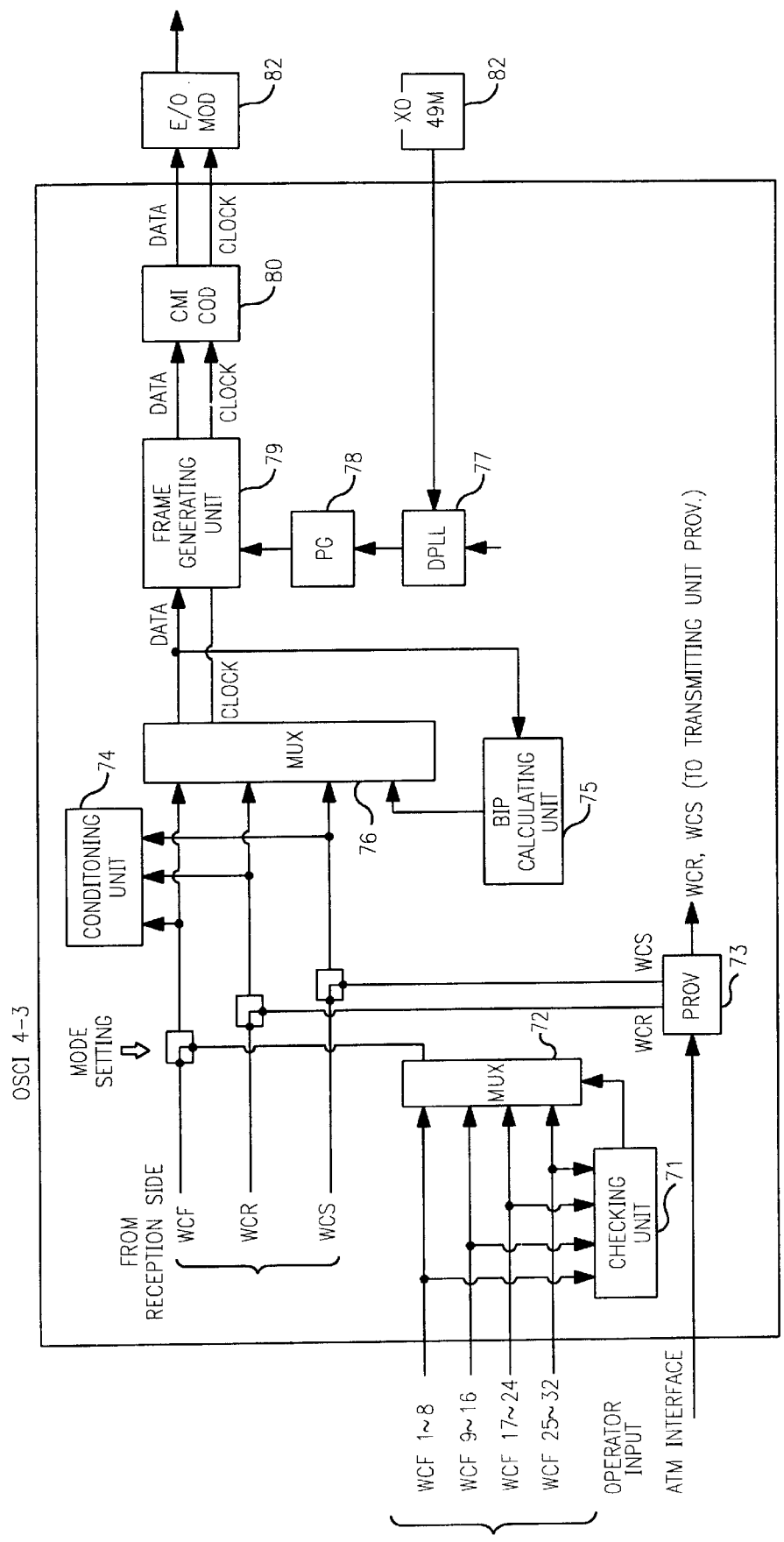
FIG. 15 is a schematic view of a basic configuration of a signal transmitting unit of an optical service channel interface OSCIA of a wavelength multiplexing/demultiplexing device.

FIG. 15 is a schematic diagram illustrating a portion of the configuration of OSCIA 4-3 arranged in the TWAA illustrated in FIG. 8. OSCIA 4-3 included in the TWM module receives monitor/control signals WCF, WCR, and WCS from OSCIA 2-4 in the VATA module, and at the same time, receives WCR and WCS as inputs from an operator. WCF1~WCF 32 are signals generated by hardware monitoring its own state, and are input to a multiplexer 72 and to a checking unit 71. Checking unit 71 checks which signal is received, monitors each signal, and performs a parity check, and so forth. Checking unit 71 multiplexes and outputs WCF1~WCF32 by controlling the multiplexer according to the checking contents. A 19-Mbps ATM interface inputs the WCR and WCS to a provisioning unit 73. Provisioning unit 73 determines whether an input from the operator is switched to an input from the VAT module. The mode setting is also made for the WCF. That is, a determination is made as to whether a multiplexer is input with either the WCF transmitted from OSCIA 2-4 in the VAT module or the input from the operator.

In this way, multiplexer 76 has the monitor/control signal input from OSCIA 2-4 in the VAT, or the monitor/control signal from the operator. A condition unit 74 monitors which signal is input as the respective monitor/control signals (WCF, WCR, and WCS).

Multiplexer 76 multiplexes the monitor/control signals, such as WCF, WCR, and WCS, and inputs the multiplexed signal to a frame generating unit 79. A BIP calculating unit 75 reads the parity from the signal output from multiplexer 76, feeds back the parity to the input of multiplexer 76, and assigns the parity value to the parity bit.

The clock from a PG 78 is input to a frame generating unit 79. This clock is a clock signal generated by controlling the phase of the cyclic wave output from a 49-MHz oscillator (XO) 82 with a digital PLL 77, and turning it into a clock signal. Frame generating unit 79 inputs the clock signal from PG 78 to multiplexer 76. Multiplexer 76 multiplexes signals based on this clock signal. The data frame generated by frame generating unit 79 is input to a CMI coding unit 80 together with the clock signal, and is CMI-encoded. The data frame is then input to an E/O module 81 together with the clock signal, and is converted from the electric signal into an optical signal. The optical signal is then combined with the main signal amplified with an optical amplifier as a monitor/control signal.

Figure 16:
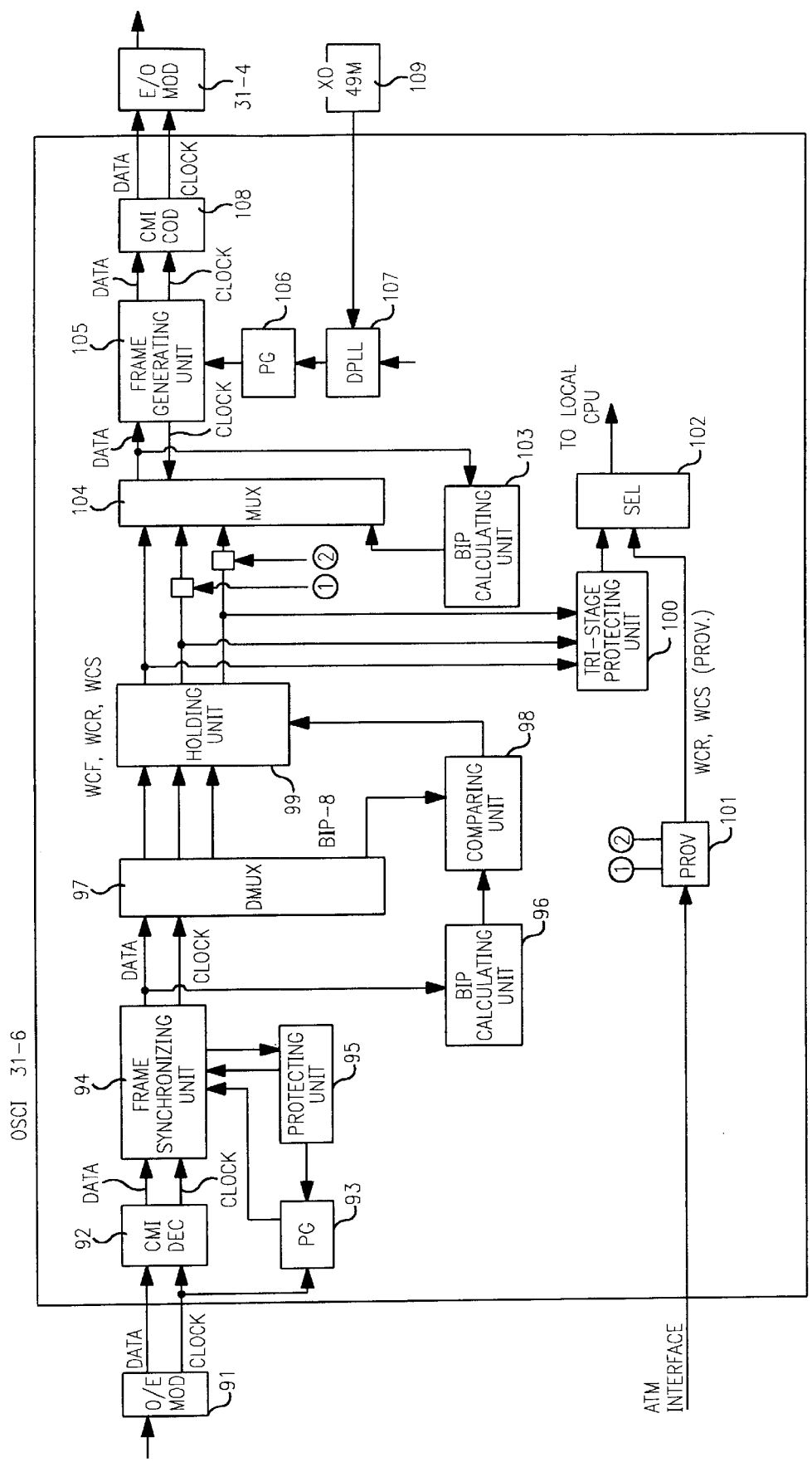
FIG. 16 is a schematic view of a basic configuration of an optical service channel interface OSCI of an optical repeater.

FIG. 16 a schematic diagram illustrating a portion of the configuration of the OSC interface OSCIW1 31-6 included in LWAW1 module in the repeater shown in FIG. 9.

OSCIW1 31-6 of FIG. 16 is configured by connecting an output of OSCIA 2-4 of FIG. 14 and the input of OSCIB 6-3 of FIG. 15. That is, the monitor/control signal split by a coupler is input to an O/E module 91, and is converted into an electric signal. That is output to a CMI decoder 92, together with a clock signal, and is input to a frame synchronizing unit 94 again together with the clock signal. A protecting unit 95 determines whether the frame synchronization is obtained a predetermined number of times, as described above. A PG 93 reads the clock signal from the electric signal prior to being CMI-decoded, combines the clock signal with the frame synchronization signal from protecting unit 95, and inputs the frame synchronization establishment clock to frame synchronizing unit 94.

The monitor/control electric signal for which the frame synchronization is performed is input to a demultiplexer 97 together with the clock signal generated by PG 93, and is demultiplexed to respective monitor/control signals (WCF, WCR, and WCS, etc.). A parity bit is input to a comparing unit 98, in which the parity bit is compared with the parity that a BIP calculating unit 96 reads from the electric signal for which frame synchronization is performed. If they match, the respectively demultiplexed monitor/control signals pass through a holding unit 99 unchanged, and are input to a multiplexer 104. If the parities do not match, the respective monitor/control signals are held in holding unit 99 until they match.

The respective monitor/control signals output from holding unit 99 are transmitted to a tri-stage protecting unit 100, where they are protected at three stages, and are then input to a selector SEL 102. An instruction is input to a provision unit 101 via a 19-Mbps ATM interface by an operator, and WCR or WCS input by the operator is input to selector 102. The monitor/control signal received by a local CPU, or the monitor/control signals input from the operator are transmitted according to an override signal that is also input by the operator.

Provision unit 101 makes a mode setting for determining whether the received monitor/control signal or the monitor/control signals input from the operator are transmitted to the output side. According to this mode setting, either the received monitor/control signal or the monitor/control signals input from the operator are input to a multiplexer 104 and multiplexed. Note that the WCF signal is a parameter that an operator cannot set and its mode is not switched. A BIP calculating unit 103 reads the parity from the signal output from multiplexer 104, feeds the parity back to the input side of multiplexer 104, and sets the parity bit.

The signal, generated by digitally controlling the phase of a cyclic wave at 49 MHz output from an oscillator 109 (DPLL 107) and turning it into the clock signal (PG 106), is input to a frame generating unit 105 and used for generating a frame. As described above, this clock signal is also input to multiplexer 104, and supplies the timing for multiplexing signals. The monitor/control signal assembled into a frame is coded with the clock signal by a CMI coding unit 108, converted from the electric signal into an optical signal based on the clock signal, combined with the main signal amplified by an optical amplifier, and is output to a transmission line.

Figure 17A:
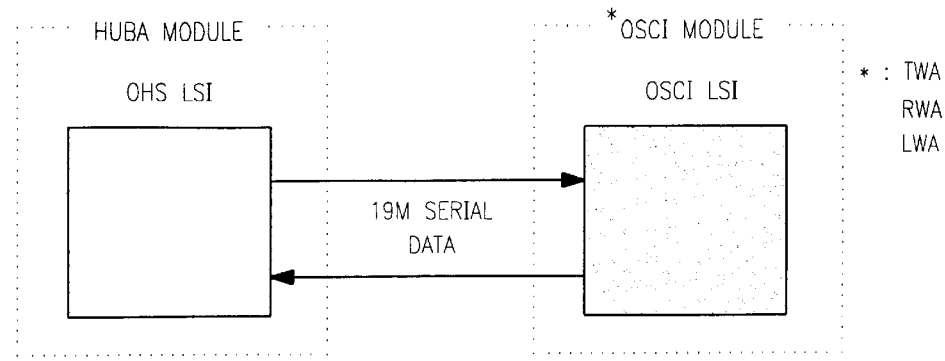
FIG. 17 are schematic views of an interface between OSC interfaces OSCIB, OSCIA, and OSCIW1, which are arranged in RWAA, TWAA, and LWAW1, and an overhead serial interface OHS.
Figure 17B:
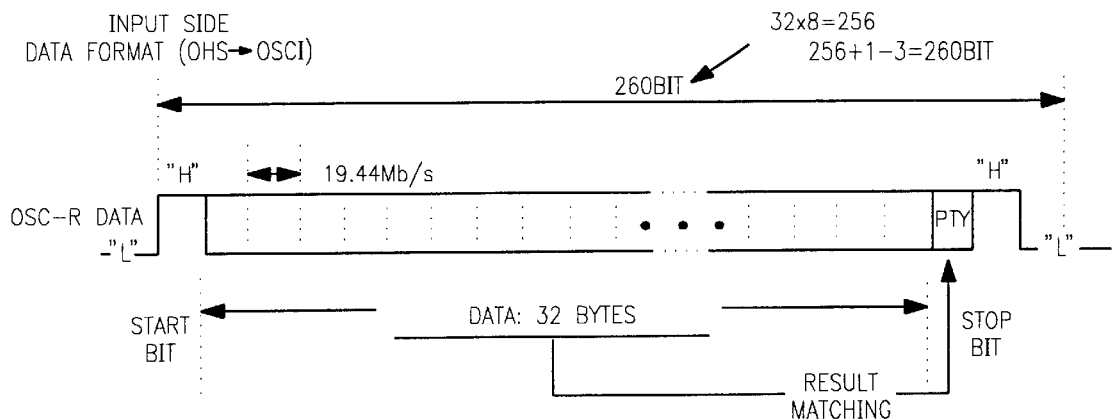
Figure 17C:
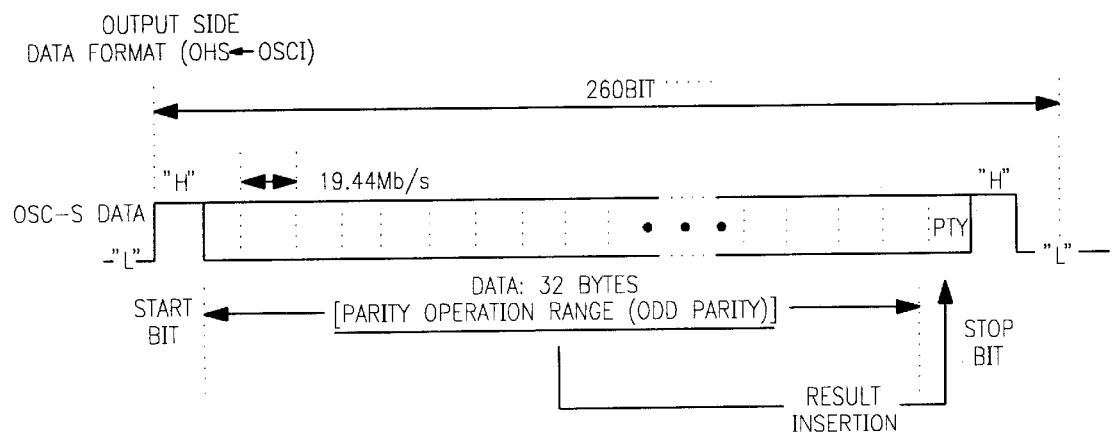

FIGS. 17(A)–17(C) are schematic diagrams for explaining an interface between the OSC interfaces OSCIB, OSCIA, and OSCIW1, arranged in the RWAA, TWAA and LWAW1 illustrated in FIGS. 14–16, and an overhead serial interface OHS.

As illustrated in FIG. 17(A), communication between the OHS LSI in the HUB module and TWAA, and the OSC interface OSCI LSI in the TWAA, RWAA, LWAW1, and so forth, is made via a 19-Mbps serial data cable. Two cables are used since the communication is bidirectional.

FIG. 17(B) illustrates the format of data to be transmitted from the OHS to the OSCI. The first bit of the data is a start bit. By detecting this bit, data arrival can be recognized. Data, composed of 32 bytes follows the start bit. A parity is calculated during a data reception, and a determination is made as to whether the data is properly received with the parity bit appended to the end of the data. It is assumed in FIG. 17(B) that the parity is an odd number. The parity is followed by a stop bit, which indicates the end of the data.

FIG. 17(C) illustrates the format of data to be transmitted from the OSCI to the OHS. In this case, the data has fundamentally the same format as in FIG. 17(B). The data starts with a start bit, a 32-byte data area follows the start bit, and the data ends with a stop bit. In a manner similar to FIG. 17(A), a parity is detected during the reception of the data area, and the parity is compared with the value of the parity bit. If they match, it is determined that the data is properly received. If they do not match, it is determined that the data are not properly received.

Figure 18:
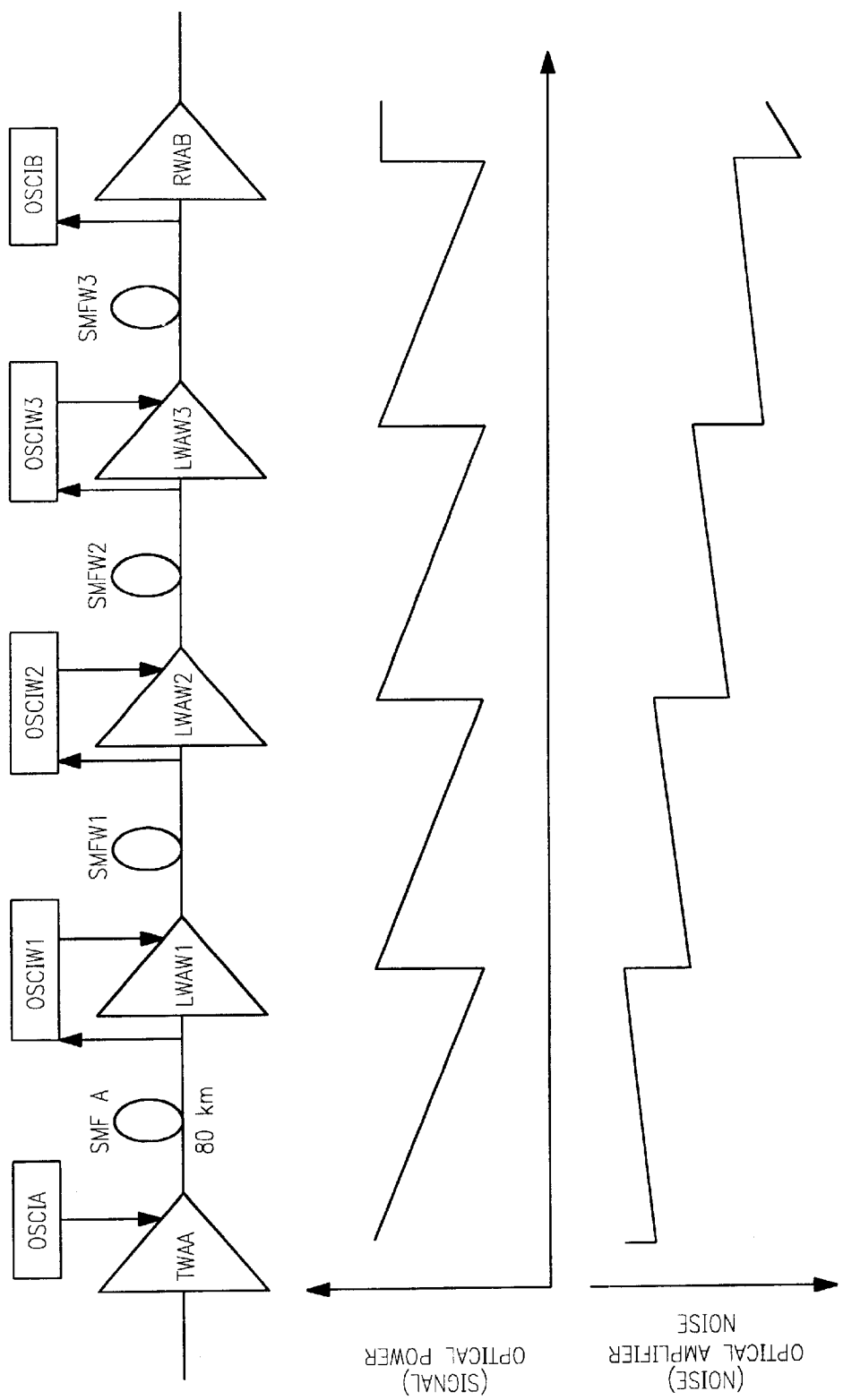
FIG. 18 is a schematic view of a relationship between optical signal power and noise in a wavelength-division multiplexing transmission system of FIGS. 1A and 1B.

A relationship between signal and noise in an optical wavelength-division multiplex transmission system employing a preferred embodiment an optical wavelength multiplexing amplifier of the present invention is illustrated in FIG. 18. While FIG. 18 illustrates a system in which a linear communication path is arranged, a system where a loop communication path is arranged would be similar.

The optical wavelength multiplexing transmission system of FIG. 18 comprises an optical post-amplifier TWAA, a single-mode optical fiber transmission line SMF for propagating an optical signal, and an optical pre-amplifier RWAB. Optical in-line amplifiers LWAW1–LWAW3 are arranged on transmission line SMF, and monitor/control optical signal processing units OSCIA, OSCIW1, OSCIW2, OSCIW3, and OSCIB. A relationship between the transitions of the power of an optical signal to be propagated and noise (ASE noise, etc.) caused by the optical post-amplifier TWAA, and a distance from the optical amplifier TWAA are illustrated in the lower portion of FIG. 18.

The optical signal amplified by the optical post-amplifier TWAA passes through a transmission line SMFA. Optical signal power becomes weak when the optical signal reaches optical in-line amplifier LWAW1. The weakened optical power is amplified and transmitted by optical in-line amplifier LWAW1, and attenuated by a transmission line SMFW1 in a similar manner. While an optical signal propagates through transmission line SMF, that is, until the optical signal is converted into an electric signal and the signal is regenerated after being received by an optical receiving unit, the process is repeated. The signal weakened due to the loss of transmission line SMF is repeatedly amplified and transmitted by an optical amplifier. If an optical signal is amplified by an optical amplifier having an Er-doped fiber, noise, especially the amplified spontaneous emission noise, is caused in the optical amplifier. Although the noise is attenuated while propagating transmission line SMF, the noise as well as the optical signal is amplified by the optical amplifier.

Since transmission lines SMF offered by various manufacturers and manufactured in various years are normally used, the loss characteristics of transmission lines SMF are not uniform. Namely, when the distance between optical amplifiers (the length of the SMF) varies, if an optical fiber SMF with a low degree of transparency, or if an optical fiber SMF whose disconnection is restored (spliced) is used, optical amplifiers LWAW1–LWAW3 and RAWB must absorb the differences between various optical input powers, amplify an optical signal up to a predetermined output, and output the signal.

With the WDM optical communication system, an optical signal having a plurality of channels (main signal) is wavelength-multiplexed and transmitted, and at the same time, a monitor/control signal (supervisory signal "SV signal") is similarly wavelength-multiplexed and transmitted by an optical service channel for monitoring and controlling a transmission state. In optical in-line amplifiers LWAW1–LWAW3 and optical pre-amplifiers RWAB, the main signal is amplified. The SV signal is separately demultiplexed and separately processed by SV signal processing units OSCIW1–OSCIW3, again wavelength-multiplexed with the main signal, and transmitted.

Figure 19:
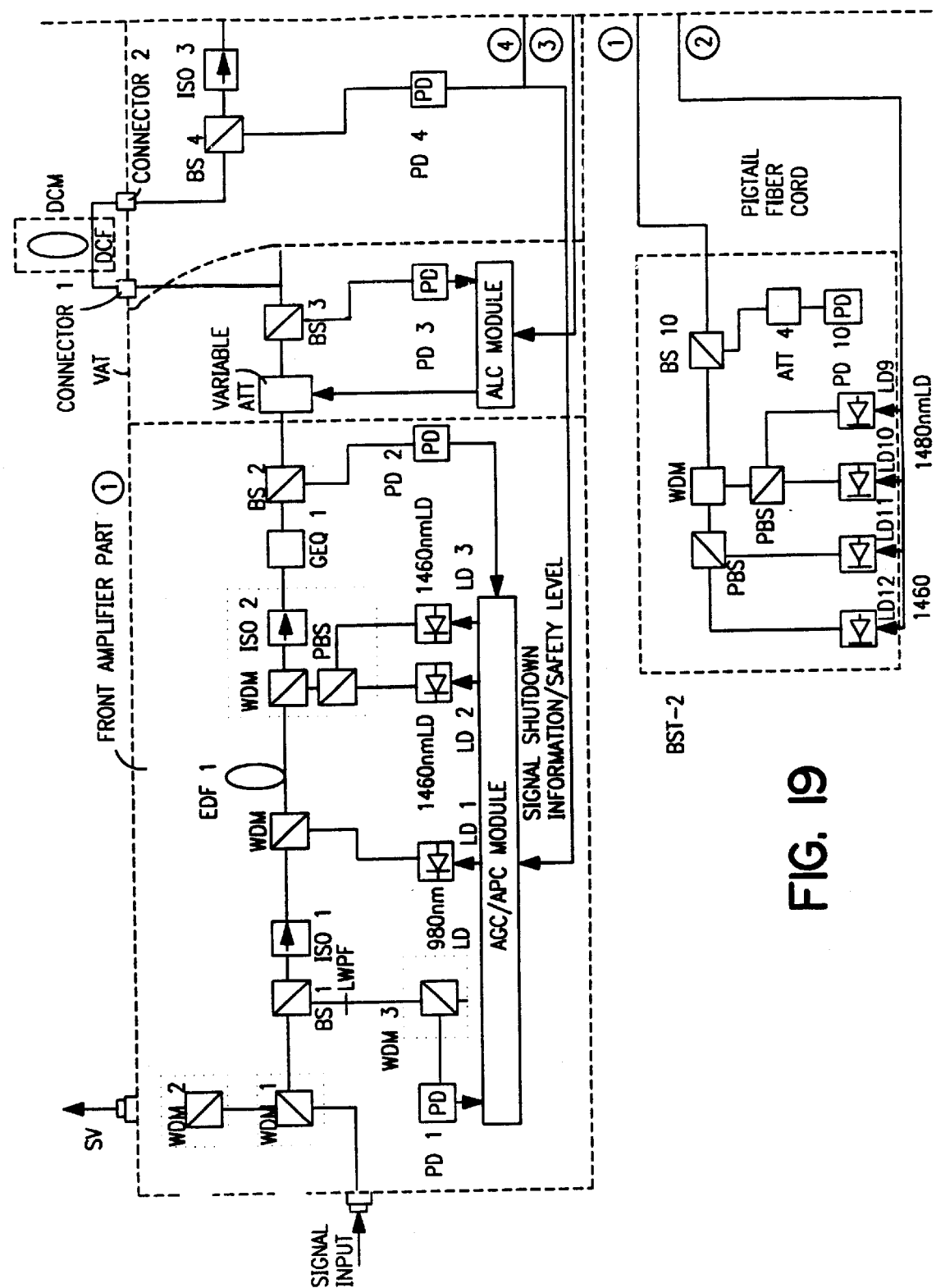
FIG. 19 is a schematic of a specific configuration of an optical amplifier.
Figure 20:
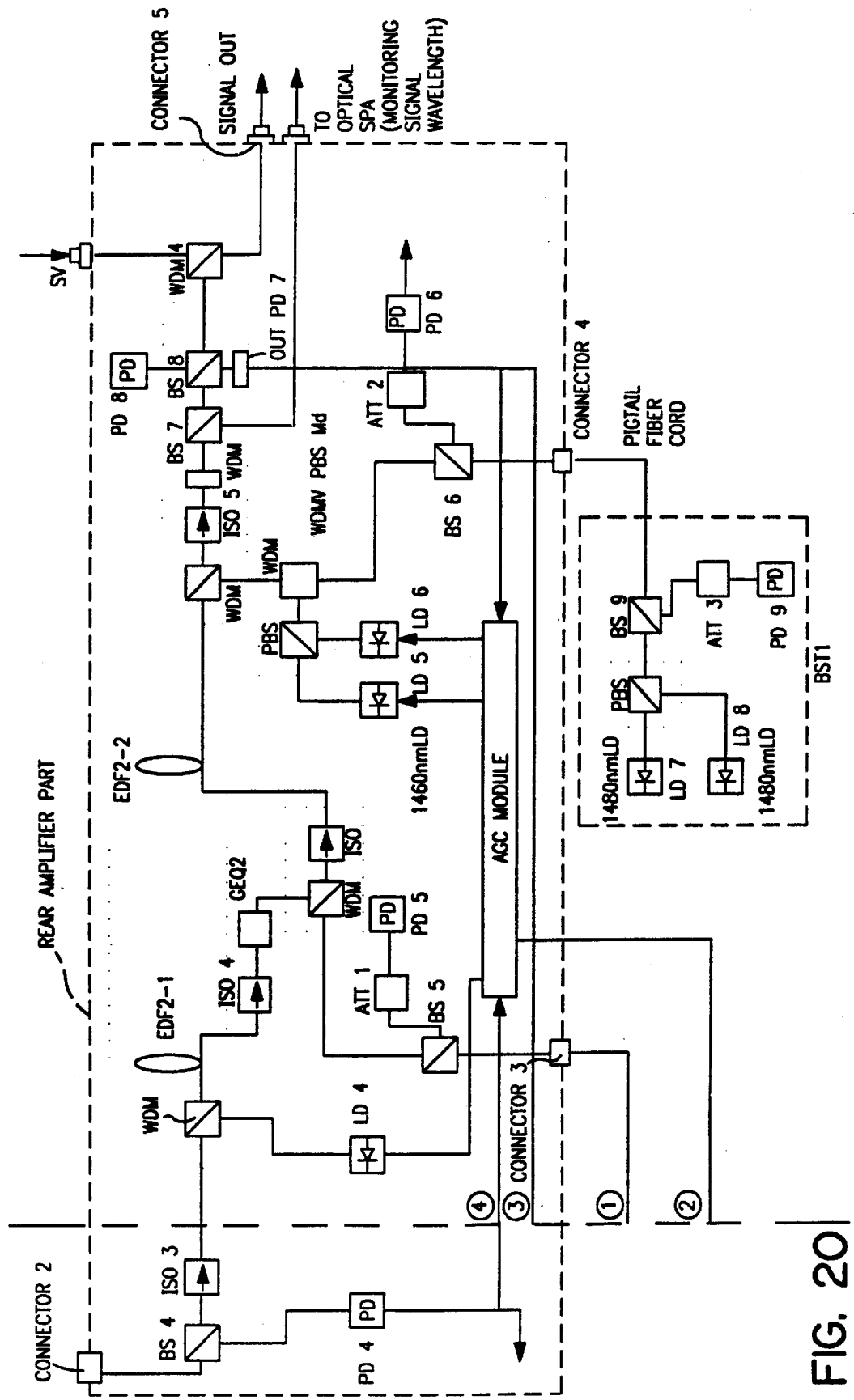
FIG. 20 is a schematic view of a specific configuration of an optical amplifier.

Wavelength multiplexing optical amplifiers (TWAA, LWAW1–LWAW3, and RWAB) used in the wavelength-division multiplexing transmission system of FIGS. 1A and 1B are schematically illustrated in FIGS. 19 and 20. The optical amplifiers of FIGS. 19 and 20 are used for multiplexing and transmitting different wavelengths of up to 32 channels, as referred to in the explanation of FIGS. 1A and 1B. In addition to the optical signal having 32 wavelengths, which carries the main signal (OC-48 or OC-192), a supervisory/control signal (SV signal) for supervising and controlling the system is multiplexed and transmitted using a wavelength (optical service channel: the wavelength outside the gain bandwidth of an Er-doped fiber 1510 nm) different from the 32 wavelengths of the optical signal, so as to be outside the gain bandwidth of an Er-doped fiber (1510 nm).

When a wavelength-multiplexed signal is input to an optical in-line amplifier, the SV signal is initially extracted by a WDM optical coupler (WDM 1). The extracted SV signal is then input to a WDM 2 optical coupler (WDM 2), where the SV signal is again extracted. The SV signal passes through two WDM optical couplers (WDM 1 and WDM 2) arranged at two stages because there is not a perfect wavelength split when the SV signal passes through only one WDM coupler, and part of the wavelengths of the main signal appears. As a result, the signal is received and the SN ratio (signal-to-noise ratio) of the SV signal is improved by completely filtering the wavelength component of the main signal. The split SV signal is output to the outside of the optical in-line amplifier of the main signal of FIGS. 19 and 20, and is processed by a SV signal processing unit (OSCI). The SV signal is then combined again with the main signal, and output to transmission line SMF.

The optical signal is output from the first WDM coupler (WDM 1) to a beam splitter BS1. Beam splitter BS1 splits the power of the entire main signal, for example, in a ratio of 10 to 1, so that 10/11 of the optical signal is output to an isolator ISO1.

1/11 of the optical signal split by beam splitter BS1 is output to WDM 3 which is an optical input monitor. The wavelength component not included in the main signal is removed, and the signal is received by a photodiode PD 1. The level of the main signal received by photodiode PD 1 is input to an Automatic Gain Control/Automatic Power Control module AGC/APC as a power level of an input side to an amplifying medium EDF (Er-doped fiber) EDF 1. EDF 1 is in an optical amplifying unit at the first or preceding stage.

The optical signal transmitted to isolator ISO 1 is input unchanged to EDF 1 and amplified. The energy (pump light power) for amplifying the optical signal is supplied from a laser diode LD 1 that has an output wavelength of 980-nm. Energy is also supplied from laser diodes LD 2 and LD 3 which respectively have an output wavelength of 1460-nm. The pump light from laser diode LD 1 is input to EDF 1 by a WDM coupler. If the pump light (980 nm) to be transmitted to EDF 1 suffers from a great loss when combined by WDM coupler, much of the output of laser diode LD 1 will be wasted. Therefore, a WDM coupler having a very small loss may be used.

The output wavelength of laser diode LD 1 excites the energy level of an Er ion doped using a 980-nm absorption bandwidth of the Erbium-doped fiber "EDF," and amplifies an input wavelength-multiplexed light based on a stimulated emission operation created in the Erbium-doped fiber. Because the working bandwidth (wavelength width) of the 980-nm amplification bandwidth of the EDF is narrow, it is desirable that the oscillation wavelength of laser diode LD 1 be stabilized. The pump light of exactly 980 nm is considered to be extracted by using an optical filter, etc. In the meantime, the pump lights of laser diodes LD 2 and LD 3 are polarized in vertical and horizontal directions, respectively. However, the polarized lights from LD 2 and LD 3 are combined by a polarization beam splinter (PBS). As a result, two pump lights can be combined without any loss.

The polarized-combined pump lights are transmitted to the EDF by a WDM coupler. The transmission line for transmitting the pump lights from laser diodes LD 2 and LD 3 to the PBS is a polarization maintaining fiber for maintaining the polarization of the pump lights (laser beams) output from laser diodes LD 2 and LD 3, using a PANDA fiber, for example. As described above, the pump light of laser diode LD 1 is used for forward excitation, while the pump lights of laser diodes LD 2 and LD 3 are used for backward excitation. Accordingly, the pump light of laser diode LD 1 proceeds in the same direction as the propagation direction of the main signal. In the meantime, the pump lights of laser diodes LD 2 and LD 3 proceed in the direction of the input side of the optical in-line amplifier, which is the reverse of the propagation direction of the main signal.

Isolator ISO 1 prevents the pump lights of laser diodes LD 2 and LD 3 from proceeding in the reverse direction. However, since the pump lights of laser diodes LD 2 and LD 3 cannot be perfectly isolated, photodiode PD 1 may receive some part of these pump lights. When photodiode PD1 receives a portion of the pump lights, the actual input power level of the main signal cannot be detected, and a problem arises in AGC/APC control. Accordingly, 1/11 of the wavelength-multiplexed light for input monitoring, which is split in the 10 to 1 ratio of beam splitter BS1, further passes through a long wavelength pass filter (LWPF). In this way, the pump lights of laser diodes LD 2 and LD 3 can be prevented from proceeding inversely, so that photodiode PD 1 receives only the main signal (wavelength-multiplexed light).

Laser diode LD 1 (oscillation wavelength=980 nm) and laser diodes LD 2 and LD 3 (oscillation wavelength=1460 nm) are used to supply pumping energy for amplification to EDF 1. Laser didoes LD 1–LD 3 function to supply sufficient amplification energy to the EDF 1. That is, since it may be difficult to obtain a sufficient pump light power with only one laser diode at present, a plurality of laser diodes are used in this embodiment. (Of course, however, if one laser diode could supply sufficient pump power, one diode could be used.) In addition, laser diode LD 1 is used for forward excitation, and contributes to the o amplification of the main signal attenuated when the main signal is first input to the EDF 1. When the main signal is input to EDF 1, the optical power of the main signal is reduced, since the main signal propagates through a long optical transmission line SMF. If such an optical signal is amplified with the EDF, noise will occur.

However, it is possible to suppress the noise caused when an optical signal is amplified (approximately 3 dB close to a theoretical limit is achieved) in a 980-nm band of the EDF so that the main signal can be prevented from being buried among noise. Note, however, that the efficiency for converting the energy of a pump light into that of the main signal in the 980-nm band is slightly lower than in a 1480-nm band. Therefore, amplification is made in the 980-nm band at an early stage, and then in the 1460-nm band of laser diodes LD 2, LD 3, and so forth in a later stage, when the optical signal is amplified. That is, a backward excitation method is used for excitation of laser diodes LD 2, LD 3, and so forth, where the optical signal that has passed through the EDF is amplified with the pump lights of laser diodes LD 2 and LD 3 after being amplified with the pump light of laser diode LD 1 to some extent without degrading the SN. Although the amplification characteristic of the EDF in the 1460-nm band corresponding to the oscillation wavelength of laser diodes LD 2 and LD 3 causes some noise, the power of the pump light is converted into the main signal with a relatively high level of efficiency. As a result, a relatively high main signal output is obtained. Note again that it may be possible to use one laser diode, such as a LD 1 having a 980 nm wavelength, instead of the three laser diodes (LD1, LD2 and LD3) described.

FIG. 21 is a table summarizing the characteristics of the excitation band of the EDF. As illustrated in FIG. 21, the EDF has two practical excitation bands. One excitation band is a 980-nm band, while the other is a 1480-nm band. The 980-nm excitation band (the absorption band of the EDF) has a width approximately equal to 15-nm from 970 to 985 nm. Approximately 3 dB, which is the theoretical limit of low noise, is achieved for the NF (noise figure) of the amplifier. However, the efficiency for converting the power of a pump light into that of an optical signal is 63%, which is relatively low.

The 1480-nm excitation band (absorption band) is approximately 50 nm from the 1450 to 1500 nm range, which is considered to be relatively wide. Note that the 1480-nm band includes two sub-bands at 1460 nm (1450 nm–1470 nm) and at sub-band at 1480 nm (1470 nm–1500 nm). Backward pumping by laser diodes LD2 and LD3 is within the 1460 nm sub-band. Therefore, even if the wavelength of a pump light slightly deviates, the amplification operation can be obtained. The NF of the amplifier is 4.5 dB, which is slightly larger. However, the efficiency for converting the power of the pump light into that of the optical signal is equal to or higher than 95%, which is a very high value. To obtain an efficient amplification operation, a 1480-nm band is used.

Returning to the explanation corresponding to FIGS. 19 and 20, the optical main signal amplified by EDF 1 passes through an isolator ISO2, and is input to a gain equalizer GEQ 1. Isolator ISO 2 is arranged to shut down light returning from gain equalizer GEQ 1 and connector 1. If the light returning from gain equalizer GEQ 1 and connector 1 exists, EDF 1 reacts sensitively to the light, and begins to oscillate. Accordingly, the behavior of EDF 1 becomes unstable, leading to a deterioration in the performance of the optical amplifier. Therefore, isolator ISO 2 is arranged to prevent the behavior of EDF 1 from becoming unstable. Also the above described isolator ISO 1 prevents EDF 1 from oscillating with the returning light of laser diodes LD 2 and LD 3, which reaches the connector arranged in the input unit of optical in-line amplifier LWAW1 and makes a reflection.

Figure 22A:
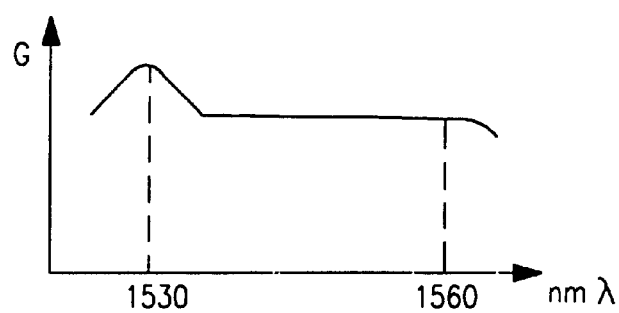
FIG. 22 is a schematic view of operations of the optical amplifier.

Gain equalizer GEQ 1 is a filter that is arranged to make a gain characteristic of the EDF flat. As illustrated in FIG. 22(A), the gain characteristic of the EDF has a wave-shaped characteristic between 1530 nm and 1560 nm. Accordingly, if the wavelength (main signal) of each channel to be multiplexed is arranged in this wavelength range, the amplification ratio of the peak is high and the amplification ratio of the trough is low. Accordingly, if the wavelength-multiplexed main signal is amplified by the EDF, the amplification gain of each signal having each wavelength differs. As a result, a level difference occurs between different wavelengths of amplified wavelength-multiplexed light. The power of an optical signal propagating through a transmission line must be somewhat high in order not to be buried in noise. However, if the power is too high, non-linear effects, such as self-phase modulation, cross-phase modulation, four-wave mixing, and so forth, become significant, degrading the wave forms. Accordingly, the optical signal propagating through a transmission line has upper and lower limits of optical power for each wavelength, and the power of the optical signal having each wavelength must be within these upper and lower limits. However, if the power level of each wavelength is different, the optical signal that has the wavelength of the highest level must be set in order not to exceed the upper limit. Therefore, the power of the optical signal having another wavelength cannot be increased to the upper limit, even though it is desirable for, the power to be high. As a result, the signal-to-noise ratio (SN ratio) for each wavelength is lowered, so that the performance of a transmission system is degraded. However, if the power levels of all the optical signals having respective wavelengths are the same, all the optical signals can be amplified to the upper limit, thereby improving the performance of the transmission system. Therefore, the fluctuations caused by a wavelength change of the gain of the EDF are eliminated by gain equalizer GEQ 1.

Figure 22B:
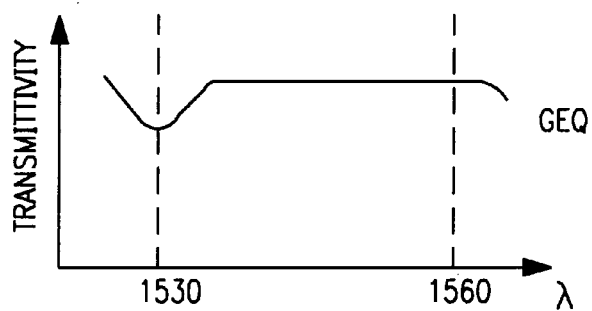
Figure 22C:
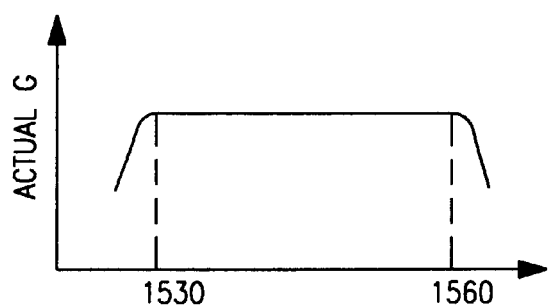

As illustrated in FIG. 22(B), gain equalizer GEQ 1 is manufactured so that its transparency rate is low in the portion where the EDF gain is large, while the transparency rate is high in the portion where the gain is low. By making the wavelength-multiplexed light amplified by EDF 1 pass through a filter, a gain with an essentially flat characteristic can be obtained as illustrated in FIG. 22(C).

As illustrated in FIG. 19, an optical output whose gain characteristic is made flat is split by beam splitter BS2, and the output light is received by photodiode PD 2. The result of the light received by the photodiode PD 2 is input to AGC/APC module as an output light level. AGC/APC module makes a comparison between power at the input end to EDF 1, which was previously received by photodiode PD 1, and power at the output end of EDF 1, which is received by photodiode PD 2, and controls the power of the pump lights of laser diodes LD 1–LD 3 so that the amplification ratio (gain) becomes constant. In this way, automatic gain control of EDF 1 is performed by AGC/APC module. The APC is intended to control the output light powers of respective pump light sources LD 1–LD 3 so that they become constant. Normally, automatic power control performs control by monitoring the back light or the bias current of laser diodes LD 1–LD 3, so that output light levels become constant.

Light from EDF 1 passes through gain equalizer GEQ 1 and is fed back to AGC/APC module because the powers of the respective wavelengths scatter even if the output whose gain is not made flat is fed back, and an accurate AGC/APC cannot be performed due to the loss of the gain caused by gain equalizer GEQ 1 when the output is fed back before passing through gain equalizer GEQ 1.

Wavelength multiplexing optical amplifiers illustrated in FIGS. 19 and 20 amplify a wavelength multiplexed light having up to 32 wavelengths. However, if all of the 32 wavelengths are not used, which optical signal having which wavelength to be used is dependent upon a selection made by a user who purchases and installs the system. Accordingly, it is not known which optical signal having which wavelength is used. However, if the gain is not flat, the performance of the system varies depending on a wavelength to be used. As a result, as table transmission characteristic cannot be provided.

Use of a gain equalizer flattens the gain characteristic of the EDF, thereby making the amplification gain of the optical in-line amplifier almost constant even if the optical signal having any wavelength is used. As a result, a stable system performance can be realized.

AGC/APC is performed at a stage preceding the optical in-line amplifier, as described above, because the power of the optical signal to be input to the optical in-line amplifier varies, depending on the location where the optical in-line amplifier is installed. That is, the length of the optical fiber between optical in-line amplifiers used for an optical transmission line may vary depending on the system configuration. Additionally, if a currently manufactured optical fiber is used, the degree of transparency is high and loss is small.

In the meantime, the degree of transparency of a previously manufactured optical fiber is low and its loss is large. Therefore, the power level of the optical signal input to the optical in-line amplifier is not constant.

However, it is important that the optical in-line amplifier operate properly or in the same way if installed under any conditions, even if the power levels of input wavelength-multiplexed optical signals differ. The AGC/APC makes the gain constant even if the level of an input wavelength-multiplexed optical signal differs. As a result, the optical signal of each channel can be amplified with almost the same gain. However, if the input level of an input wavelength-multiplexed light differs even though the gain is constant, the output level of the amplified wavelength-multiplexed light output from the EDF may differ.

The fluctuations of the output level of the optical in-line amplifier due to different input levels are problematic when a system is designed by standardizing the optical in-line amplifier. Therefore, the main signal (wavelength-multiplexed light) which has passed through beam splitter BS2 is input to a variable attenuator VATT. If input power is increasing or pumping power has reached a maximum, then APC is switched to AGC. In this case, if the total gain of the EDFs (EDF1, EDF2-1 and EDF2-2) is constant, the required wavelength characteristics regarding gain can be obtained. The total gain is important. EDF 2-1 or EDF 2-2 can compensate for a gain decrease in EDF 1 to keep the total gain of EDF 1, EDF 2-1 and EDF 2-2 constant.

A variable attenuator arranged in variable attenuator VATT can adjust the amount of attenuation of light according to the value of a voltage to be applied. The variable attenuator can adjust the output power level of the wavelength-multiplexed optical signal amplified with the AGC/APC. The optical signal which has passed through the variable attenuator is split by beam splitter BS3. One of the split signals is received by photodiode PD 3. The power level of the optical signal received by photodiode PD 3 is input to the ALC module, and is adjusted to be constant. The power level of the optical signal is adjusted in order to input a wavelength-multiplexed optical signal of a suitable power level to a dispersion compensation fiber DCF in a dispersion compensation module DCM linked with connecters 1 and 2, and to stabilize the behavior of the variable attenuator. To increase output power, laser gain can be increased with AGC or attenuator loss can be decreased with APC.

Dispersion compensation module DCM compensates for degradation of a waveform due to dispersion of an optical signal that occurred while propagating an optical transmission line. To effectively compensate for waveform degradation of the optical signal by using dispersion compensation fiber DCF in dispersion compensation module DCM, the power level of an input signal must be so high as to not be buried in noise, while not being so high that non-linear effects are caused in dispersion compensation fiber DCF. In particular, a core diameter of dispersion compensation fiber DCF (approximately 3 to 4 μm) is smaller than that of a normal SMF, and is concentrated with optical powers. Therefore, non-linear optical effects tend to occur. To prevent the non-linear effects of dispersion compensation fiber DCF, the upper limit of the power level of an input optical signal must be strictly observed. Therefore, the power level of the optical signal is adjusted by performing ALC in beam splitter BS3.

As illustrated in FIG. 20, the optical signal input to dispersion compensation fiber DCF is dispersion-compensated and again input from connector 2 to an EDF 2 structuring the post-stage (second stage) optical amplifying unit. This optical signal is split by a beam splitter BS4, and the split signal is received by a photodiode PD 4. The split signal is received by photodiode PD 4 in order to determine whether dispersion compensation module DCM is connected to optical connectors 1 and 2. If dispersion compensation module DCM is disconnected, the optical signal amplified by EDF 1 is externally output unchanged, leading to a dangerous situation. Therefore, photodiode PD 4 receives light in order to determine whether the optical signal (wavelength-multiplexed light) from EDF 1 has passed through dispersion compensation module DCM. The result of the light reception is transmitted to AGC/APC module. If the optical signal has been transmitted, no process is performed. If the input level of the optical signal is equal to or lower than a predetermined value, it is determined that either or both of the optical connectors 1 and 2, which link between dispersion compensation module DCM, the pre-stage optical amplifying unit, and the post-stage optical amplifying unit, are unplugged. Therefore, the amplification ratio (gain) of EDF 1 is decreased and the intensity of the optical signal is set to a non-dangerous level, or the amplification behavior is suspended by stopping the supply of the pump lights from laser diodes LD 1–LD 3. As a result, the power level of the optical signal output from connector 1 becomes low if dispersion compensation module DCM is disconnected, preventing a dangerous situation even if an operator is close to the optical amplifier.

As illustrated in FIG. 20, the result of the light reception of photodiode PD 4 is also input to the AGC module, and the power level of the optical signal on the input side of the AGC is provided. The main signal which has passed through beam splitter BS4 is input to an optical isolator ISO 3, through which the main signal passes. Isolator ISO 3 determines a passage direction of light, so that EDF2-1 does not oscillate with the reflection light from connector 2. The optical signal which has passed through isolator ISO 3 is input to EDF 2-1 and amplified. The pump light of EDF 2-1 is supplied from laser diode LD 4, whose oscillation wavelength is 980 nm. The pump light from laser diode LD 4 is combined with the optical signal by WDM coupler, and is transmitted to EDF 2-1.

The WDM coupler may combine with an optical signal with little loss. Amplification is performed in EDF 2-1 with only the pump light of the 980 nm band. Because noise occurrence can be suppressed to approximately a theoretical limit in the 980-nm band, as described above, this bandwidth is effective for amplifying a weak optical signal. That is, the optical signal to be input to EDF 2-1 has passed through dispersion compensation fiber DCF which has a length approximately equal to 10 km. Accordingly, optical signal power is attenuated. The loss of dispersion compensation fiber DCF is larger than that of SMF. Assuming that a dispersion of approximately 1,000 ps/nm is attempted to be compensated for, the loss of dispersion compensation fiber DCF will become as large as approximately 10 dB. Since the wavelength-multiplexed light to be input to EDF 2-1 suffers from such large attenuation, the amplification which suppresses noise is performed using the pump light of the 980-nm band. Laser diode LD 4 is feed-back-controlled by AGC module and changes the output power in order to adjust the gain of EDF 2-1.

The optical signal amplified by EDF 2-1 passes through optical isolator ISO 4, and is input to a gain equalizer GEQ 2. The operation of gain equalizer GEQ 2 is the same as that described in reference to FIG. 22. Gain equalizer GEQ 2 is intended to make the gain characteristic of EDF 2-1 and EDF 2-2 flat. Isolator ISO 4 does not input the reflection light from gain equalizer GEQ 2 to EDF 2-1, which also prevents EDF 2-1 from oscillating with are turning light.

Since a gain equalizer GEQ 2 is arranged between EDF 2-1 and EDF 2-2, a low noise figure (NF) can be obtained and the high efficiency of converting pumping power into signal power can be maintained.

The optical signal which has passed through gain equalizer GEQ 2 passes through WDM coupler and an optical isolator ISO, and is input to EDF 2-2. The pump light from a booster BST 2, which is the pump light source unit for expansion illustrated in FIG. 19, is input from WDM coupler. The internal structure of booster BST 2 will be described later. A beam splitter BS5 is positioned between connector 3 and WDM coupler. Note the reference numeral 1 indicates how BST-2 in FIG. 19 is connected to EDF 2-2 in FIG. 20. The path for splitting the pump light from the pump light source unit for expansion of booster BST 2 determines whether the pump light from booster BST 2 is properly input. After the power level of the pump light split by beam splitter BS5 is adjusted, the power level is received by photodiode PD 5.

Photodiode PD 5 obtains a result for indicating whether the pump light from connector 3 is properly received, and notifies booster BST 2 of the result via a line, not shown. If the result indicates that photodiode PD 5 does not receive the pump light despite the emission of the pump light source of booster BST 2, it is determined that connector 3 is unplugged, and that the pump light of the pump light source may leak, which is a dangerous situation if anyone is close to the optical amplifier. The pump light source of booster BST 2 is therefore turned off.

The pump light is supplied to EDF 2-2 from booster BST 2 with the forward excitation method. The backward excitation method is also used to amplify the output of the optical signal. That is, laser diodes LD 5 and LD 6, whose oscillation wavelengths are 1460 nm are provided. Laser diodes LD 5 and LD 6 are internal pump light sources that adjust a gain of EDF 2-2 according to the control from the AGC module. In addition, booster BST 1, which is a pump light source unit for expansion, is attached to connector 4 so as to obtain an optical signal with a large output. The internal structure of booster BST 1 will be described later along with the explanation of booster BST 2.

It should be noted that the number of the pumping LDs, such as LD 5, LD 6 and the LDs in boosters BST 1 and BST 2 is given only by way of example. If the necessary pumping power can be obtained with fewer LDs, the number of the pumping LDs can be decreased.

To monitor the attachment/detachment of a connector 4, a beam splitter BS6 is arranged in a similar manner as beam splitter BS5. Beam splitter BS6 splits the pump light from booster BST 1, and the split light is received by a photodiode PD 6 via an attenuator ATT 2. The result of this light reception is indicated to booster BST 1 via a line, not shown in FIG. 20. If it is determined that connector 4 is unplugged despite the emission of the pump light source, the pump light source of booster BST 1 is turned off.

Figure 23:
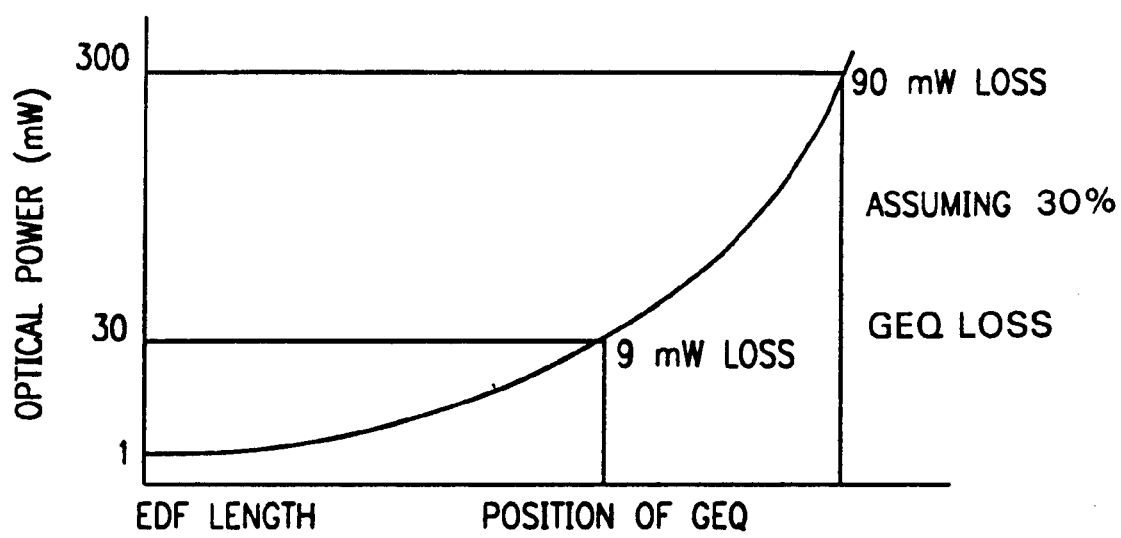
FIG. 23 is a schematic view of operations of an optical amplifier.

EDF 2-2 employs a 1480-nm band where the efficiency for converting the energy of a pump light into that of an optical signal is high, in order to increase the output of the optical signal. To make the overall gain flat, gain equalizer GEQ 2 is arranged on the output side of EDF 2-1. That is, gain equalizer GEQ 2 is arranged between EDF 2-1 and EDF 2-2 because the gain equalizer composed of a filter causes a huge loss, which could be a 30% loss. As illustrated in FIG. 23, when the gain equalizer is arranged on the output side of EDF 2-2, an optical signal output is made large (for example, approximately 300-mW if the input to the optical in-line amplifier is 1 mW) by EDF 2-2. Therefore, if there is a 30% loss, a loss in terms of an absolute value also becomes large (such as 90-mW loss), leading to a waste of energy of a single pump light source laser diode.

If the gain equalizer is inserted at a stage where the output of the optical signal is not so large, for example, only 1-mW loss is caused when the output is 10 mW, compared with a 10-mW loss when the output is 100 mW. As a result, the gain equalizer is arranged between EDF 2-1 and EDF 2-2. The two gain equalizers GEQ 1 and GEQ 2 are arranged at two locations in the optical in-line amplifier so that output levels of each wavelength are made to be substantially equal before the input to the dispersion compensation fiber DCF. The maximum power level which is allowed to be input to the DCF is obtained for each of the wavelength and then each wavelength is input to DCF at the maximum power level allowed.

Additionally, since gains on EDF 1 side (front amplifier part) and EDF 2 side (rear amplifier part) are equal, it becomes easy to separately manufacture EDF's of the amplifier parts, and to later combine them. That is, the output at the side of EDF 1 side as made flat by the gain equalizer GEQ 1, so that a main optical signal having respective wavelengths has a uniform characteristic for each wavelength. In addition, the side corresponding to EDF 2-1 and EDF 2-2 receives, amplifies, further makes uniform, and outputs a uniform optical signal. Accordingly, a uniform optical signal can be exchanged, thereby easily interfacing between EDF 1 and EDFs 2-1 and 2-2. By arranging gain equalizers GEQ 1 and GEQ 2 at locations as described above, a manufacturing advantage is obtained. Additionally, because the configuration of the wavelength-division multiplexing amplifier becomes complicated, the optical amplifying units (front amplifying part including EDF 1 and rear amplifying part including EDF 2) and dispersion compensation module DCM, which are put into modules, are made attachable/detachable with optical connectors, thereby partially performing maintenance, inspection, and part replacement, and significantly reducing operation costs.

The optical signal output from EDF 2-2 passes through WDM coupler for combining the pump light for use in backward excitation, and then passes through an isolator ISO 5. Isolator ISO 5 shuts out light reflected and returned from the output end of the optical in-line amplifier, and prevents EDF 2-2 from oscillating with the returning light. In addition, the optical signal which has passed through isolator ISO 5 further passes through a WDM coupler. WDM coupler does not combine optical signals having different wavelengths, and prevents the pump light of EDF 2-2, EDF 2-1, or the EDF in the EDF 1 from being output to the outside of the optical in-line amplifier by making only a main signal pass through. That is, the light proceeding in the direction reverse to the proceeding direction of the main signal can be isolated by isolator ISO 5, but the light proceeding in the same direction as the proceeding direction of the main signal cannot be isolated by isolator ISO 5. Therefore, the pump light is prevented from being output to the outside of the optical in-line amplifier by using WDM coupler as a filter for propagating only the main signal.

The optical signal which has passed through WDM coupler is split by a beam splitter BS7. One of the split signals is led to the output terminal for an optical spectrum analyzer optical SPA. Optical SPA is attached to this terminal when needed, and checks if the power levels of wavelength-multiplexed optical signals having respective wavelengths (channels) are the same. Since it is assumed that only one optical SPA is to be used in the current state, and that its size is almost the same as that of the optical in-line amplifier illustrated in FIG. 19 or FIG. 20, the optical in-line amplifier becomes larger than necessary if optical SPA is attached. Accordingly, whether the powers of wavelength-multiplexed optical signals with respective wavelengths are the same is checked and adjusted by connecting optical SPA as needed, for example, during an upgrade where the number of wavelength-multiplexed signals is increased.

The optical main signal split by beam splitter BS7 is output to a beam splitter BS8, and is split into a main optical signal which proceeds straight and a signal that proceeds to an OUT PD 7. A junction PD 8 that is also connected to beam splitter BS8 monitors light reflected from the output end (optical connector 5) of the optical in-line amplifier and, supplies a control signal to the pump light sources of laser diodes LD 4, LD 5, LD 6, booster BST 1, and booster BST 2 via lines, not shown in FIG. 20. Junction PD 8 monitors the reflected light by recognizing that connector 5 at the output end is unplugged if the intensity of the reflected light becomes higher, decreases the output, and reduces the gain of EDFs 2-1 and 2-2. The gain of EDFs 2-1 and 2-2 are controlled so that the power of the optical signal output from the output end of the optical in-line amplifier is approximately equal to or lower than 10 mW.

The intensity of the optical signal output from beam splitter BS8 to OUT PD 7 is converted into an electric signal. The electric signal is fed back to the AGC module where the AGC operation is performed together with the optical signal from photodiode PD 4, and is fed back to the ALC module where the ALC operation is performed by controlling the amount of attenuation of variable ATT. The ALC operation keeps the output power of the optical in-line amplifier constant. As described above, feedback from both photodiode PD 3 and OUT PD 7 are provided to the ALC module. The feedback from OUT PD 7 to the AGC module is combined with that from photodiode PD 4, and a gain is detected. As a result, the pump light sources of laser diodes LD 4, LD 5, LD 6, and boosters BST 1 and BST 2 are controlled.

The main optical signal (amplified wavelength-multiplexed light) which is not split by beam splitter BS8 is combined with a separately processed SV signal by a WDM coupler WDM 4, and is output from the output end of the optical in-line amplifier. Connectors 3 and 4 can be respectively linked with booster BST 2 and BST 1, which are pump light source units added and used if the power of the pump light of an internal laser diode LD is insufficient. For example, if the number of multiplexed wavelengths (the number of channels) is between 1 and 8, the pump light can be obtained with sufficient power by internal laser diodes. Alternatively, if the number of multiplexed wavelengths (the number of channels) is between 9 and 16, booster BST 1 is connected and used. If the number of multiplexed wavelengths is between 17 and 32, both boosters BST 1 and BST 2 are connected and used.

Laser diodes LD 7 and LD 8, whose polarizations are different, and which have a 1480-nm oscillation wavelength, are used as the pump light source of booster BST 1. Since the pump lights output from laser diodes LD 7 and LD 8 therefore have different polarizations, and laser diodes LD 7 and LD 8 are polarization-wave-combined by a polarization beam splitter PBS, and are output to the outside of booster BST 1 via a pigtail fiber cord. As a result of the polarization-wave-combination, the powers of laser diode pump lights output with different polarization waves will have the approximate relationship of "1+1=2". Therefore, the advantage given by arranging a plurality of laser diodes can be effectively used.

Furthermore, the oscillation wavelength of laser diodes LD 7 and LD 8 in booster BST 1 is different from that of internal laser diodes LD 5 and LD 6, and laser diodes LD 7 and LD 8 are combined (wavelength-multiplexed) by a WDM coupler in a WDM PBS. Similarly, if pump lights having the same wavelengths are attempted to be combined, the output of the combined lights does not always become the total power because of the phase difference between the pump lights. However, if pump lights which originally have different wavelengths are combined by a WDM coupler, the total power will ideally have the relationship of "1+1=2". Consequently, pump light having power approximately equal to the total power of all the lights from laser diodes LDs is obtained.

Figure 24:
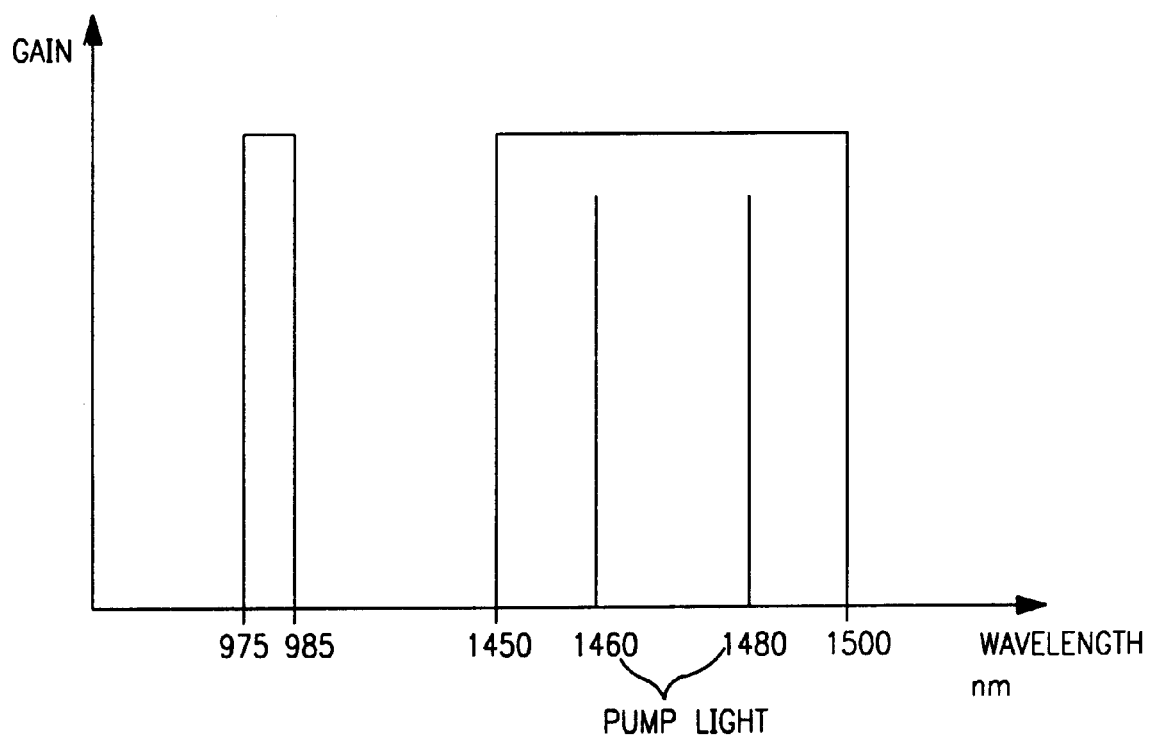
FIG. 24 is a schematic view of operations of an optical amplifier.

The oscillation wavelength of laser diodes LD 5 and LD 6 is different from that of laser diodes LD 7 and LD 8, and EDF 2-2 has a wide absorption band in a 1480-nm band as described above. Accordingly, both a 1460-nm pump light and a 1480-nm pump light are absorbed in the same band, and can be used as a pump light. As described above, pump lights having different wavelengths are combined by a WDM coupler, so that a pump light with a large output can be obtained. At the same time, as illustrated in FIG. 24, an amplification operation of an optical signal can be obtained in one EDF working band.

As illustrated in FIG. 20, after the output lights of laser diodes LD 7 and LD 8 are combined by a polarization beam splitter PBS, the combined light is split by a beam splitter 9. The split light is received by a photodiode PD 9 via an attenuator ATT 3. Photodiode PD 9 monitors whether output levels of laser diodes LD 7 and LD 8 in booster BST 1 are normal, and monitors whether the power level of the pump light obtained by combining outputs of laser diodes LD 7 and LD 8 is approximately lower than 10 mW in order to determine whether connector 4 of the pigtail fiber cord of booster BST 1 is unplugged. If connector 4 is determined to be unplugged as a result of the light reception, an instruction is issued from the AGC module to the respective laser diodes to decrease their outputs. Therefore, the APC operation is performed for the pump light sources LD 1–LD 3, so as to set the output levels of LD 1–LD 3 to low.

In booster BST 1, pump light sources LD 7 and LD 8 having the same oscillation wavelength (1480 nm) are polarization-wave-combined by polarization beam splitter PBS, and a pump light is supplied. To simplify the configuration, laser diodes LD 7 and LD 8 are just switched between ON and OFF. The AGC and ALC operations are not performed. If the output power of a semiconductor laser having a 1480-nm oscillation wavelength is low, the oscillation wavelength is shifted to a short wavelength side. For example, if the oscillation wavelength is shifted to approximately 1469 nm, it cannot be combined with laser diodes LD 5 and LD 6, which have a 1460-nm oscillation wavelength, by WDM coupler in WDM PBS module. Since WDM coupler is designed to input a 1480-nm pump light input from booster BST 1 to EDF 2-2, as described above, a pump light having a 1460-nm wavelength from booster BST 1 cannot be efficiently input to EDF 2-2. Accordingly, laser diodes LD 7 and LD 8 fix the oscillation wavelength to 1480 nm. For example, if the number of channels is between 9 and 12, only laser diode LD 7 operates with the maximum power. If the number of channels is between 13 and 16, laser diodes LD 7 and LD 8 operate with maximum power. The excitation power can be adjusted with AGS module by controlling the output powers of internal laser diodes LD 5 and LD 6.

Booster BST 2 includes laser diodes LD 9 and LD 10 whose oscillation wavelengths are 1460 nm, and laser diodes LD 11 and LD 12 whose oscillation wavelengths are 1480 nm. The polarization of laser diodes LD 9 and LD 10 is different from that of laser diodes LD 11 and LD 12. Laser diodes LD 9 and LD 10 are combined by a polarization beam splitter PBS. Furthermore, outputs of laser diodes LD 9 and LD 10, which are polarization-wave-combined, and outputs of laser diodes LD 11 and LD 12, which are polarization-wave-combined, are combined and output by WDM coupler. In addition, the combined pump light is split in booster BST 2 by a beam splitter BS 10, and is received by a photodiode PD 10 via an attenuator ATT 4. Then, it is determined whether the respective laser diodes properly operate based on the result of the light reception by photodiode PD 10.

Most of the pump light which is not split by beam splitter BS 10 is transmitted to EDF 2-2 via connector 3. In addition, photodiode PD 5 determines whether connector 3 is properly linked. If connector 3 is determined to be unplugged, laser diodes LD 9–LD 12 are controlled so that the power of the pump light output from booster BST 2 is decreased to a power level which is not dangerous to the eyes of an operator, with output power of booster BST 2 being detected by photodiode PD 10. In BST 2, the total pumping light power output from the WDM coupler is monitored by photodiode PD10, so that LD 9–LD 12 can be always driven at the same time. BST 2 does not have the same technical issues as that of BST 1 as discussed.

If booster BST 1 or both booster BST 1 and BST 2 are connected, AGC module keeps the gain constant. However, boosters BST 1 and BST 2 control laser diodes only by turning the laser diodes ON and OFF. A subtle adjustment is made by changing the outputs of internal laser diodes LD 4, LD 5, and LD 6.

In addition, since a number of boosters BSTs, such as boosters BST 1 and BST 2 may be accommodated on one shelf, and be connected to an optical in-line amplifier, there is a high probability that an optical in-line amplifier is configured having a different electric wire connection and pump light connection. In such a case, boosters BST 1 and BST 2 initially output the pump light with a small output, which is not dangerous to the eyes of an operator. If boosters BST 1 and BST 2 are linked to the optical in-line amplifier, this linkage is detected by photodiodes PD 5 or PD 6, and connectors 3 and 4 are recognized to be plugged. Then, the instruction for further increasing the output level of the pump light is issued from the AGC module. If the pump light connection and the electric wire connection are made from the same booster to the same optical in-line amplifier, no problem is posed if the output level of the pump light is maximized at this stage. However, if the connections are erroneously made, an instruction for increasing the output of the pump light is issued to booster of the optical in-line amplifier to which the pump light is not input. If the pump light of the booster to which the instruction is issued via the electric wire is not connected to the same optical in-line amplifier, the pump light will be input to another optical in-line amplifier, which leads to an improper behavior. Additionally, if the pigtail fiber cord is not linked anywhere, the pump light with high intensity will leak outside, which is dangerous if the eyes of an operator are exposed to the light.

Therefore, if the optical in-line amplifier detects linkage of booster BST 1 and BST 2, the power of the pump light is slightly increased (for example, to the level of a safety light) even if it leaks outside. If the power of the pump light slightly increases according to an instruction for increasing the power of the pump light, the optical in-line amplifier side determines that the pigtail fiber cord linkage and the electric wire connection are properly made, and issues an instruction for maximizing the power of the pump light to the booster.

As described above, leakage of dangerous pump light with an extremely high power, or the input of a pump light to an erroneous optical in-line amplifier can be avoided by setting the power of a pump light within a power range not dangerous to an operator (in the safety light state) in two stages, verifying that the connections are properly made on the optical in-line amplifier side, and then maximizing the power of the pump light.

The optical in-line amplifier illustrated in FIGS. 19 and 20 monitors the total power of the output of an optical signal using a photodiode. Accordingly, if the number of multiplexed wavelengths is increased the following problem occurs. Assume that there are upper and lower limits of the power level of each wavelength of an optical signal which propagates through an optical transmission line, and four wavelengths are multiplexed and transmitted at an initial setting stage. In this case, each optical signal having four different wavelengths is transmitted so that power is within the upper and lower limits of the transmission line. If the number of multiplexed wavelengths is increased to eight, the optical in-line amplifier suppresses the power of the optical signal to a low level with the increase of the total power of the wavelength-multiplexed optical signal. This is because the optical in-line amplifier monitors the total power of the wavelength-multiplexed optical signal.

Consequently, the power of the optical signal multiplexed with each of the wavelengths could become a level equal to or lower than the lower limit of the transmission line. As a result, transmission system performance cannot be maintained. Accordingly, if the number of multiplexed wavelengths is increased, each optical in-line amplifier is notified by the SV signal. After receiving this notification, the optical in-line amplifier suspends the ALC when the number of wavelengths is increased. Because the optical in-line amplifier also serves as an AGC amplifier, the optical in-line amplifier amplifies an optical signal with a constant gain even if the number of wavelengths is increased. The optical in-line amplifier then reactivates the ALC, and resets the power level of an optical signal to a predetermined value. The power level of the entire optical signal set for a new number of multiplexed wavelengths is defined to be set in the ALC module via the SV signal. In this way, the increase in number of multiplexed wavelengths can be processed without arranging a new configuration.

Figure 25:
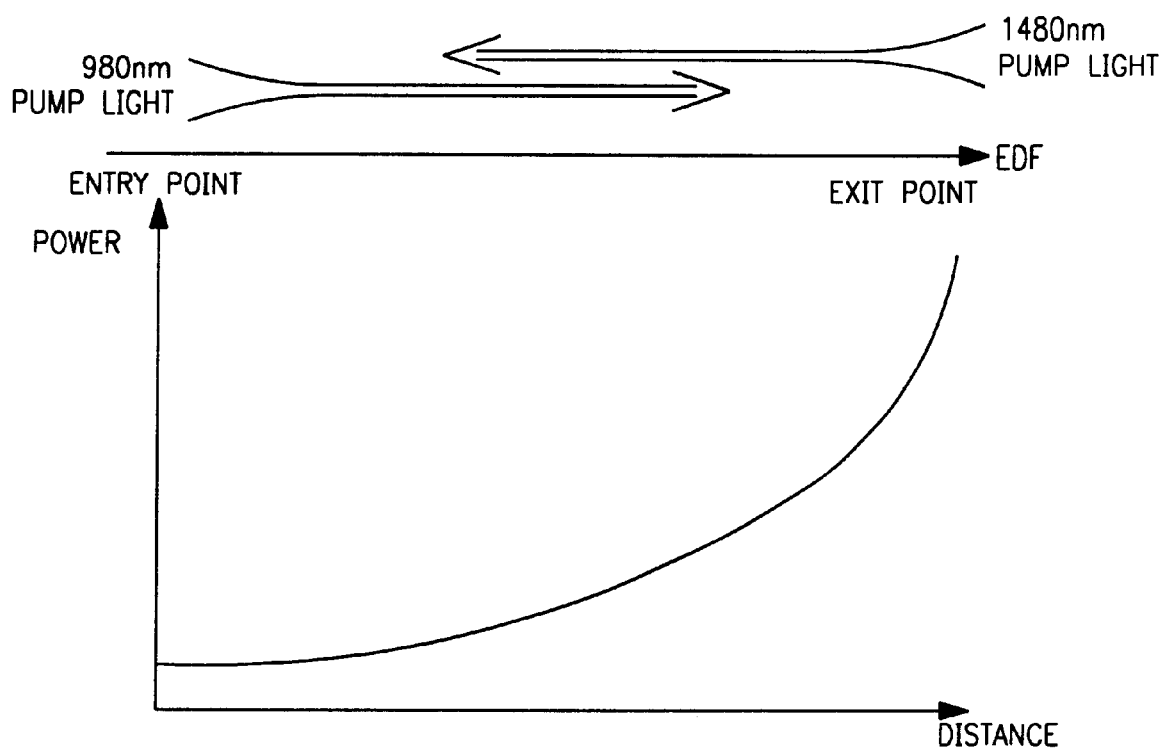
FIG. 25 is a schematic view of operations of an optical amplifier.

Furthermore, the power of a pump light must be increased with the increase of the number of multiplexed wavelengths. With this optical in-line amplifier, amplification is first performed in a 980-nm band whose noise characteristic or Noise Figure "NF" is good, and amplification is further performed in a highly efficient 1480-nm band if a pump light having high power becomes necessary. This situation is illustrated in FIG. 25. A horizontal axis of FIG. 25 corresponds to a distance starting from the entry point to the exit point of the EDF, while the vertical axis indicates the power of an amplified optical signal. FIG. 25 depicts the pump light in a 980-nm band and a 1480-nm band. Because the pump light in the 980-nm band is forward-excited, the pump light is input from the entry point of the EDF and is consumed as it proceeds backward. Additionally, since the pump light in the 1480-nm band is backward-excited, the pump light is input from the exit point to the entry point of the EDF and is consumed as it proceeds forward. In the meantime, an optical signal propagates from the entry point to the exit point. Therefore, power of the optical signal is gradually amplified as the signal approaches the exit point. As described above, an optical signal with a relatively good noise characteristic is amplified by performing amplification in the 980-nm band, and further performing a sufficient amount of the amplification in the 1480-nm band.

The configurations of the optical in-line amplifier described in reference to FIGS. 19 and 20 are also applied to the optical post-amplifier and the optical pre-amplifier. Note, however, that the optical post-amplifier does not comprise WDMs 1 and 2, which split the SV signal from a wavelength-multiplexed optical signal on the input side, while the optical pre-amplifier does not comprise WDM 4, which combines the SV signal with the wavelength-multiplexed optical signal on the output side.

Figure 26:
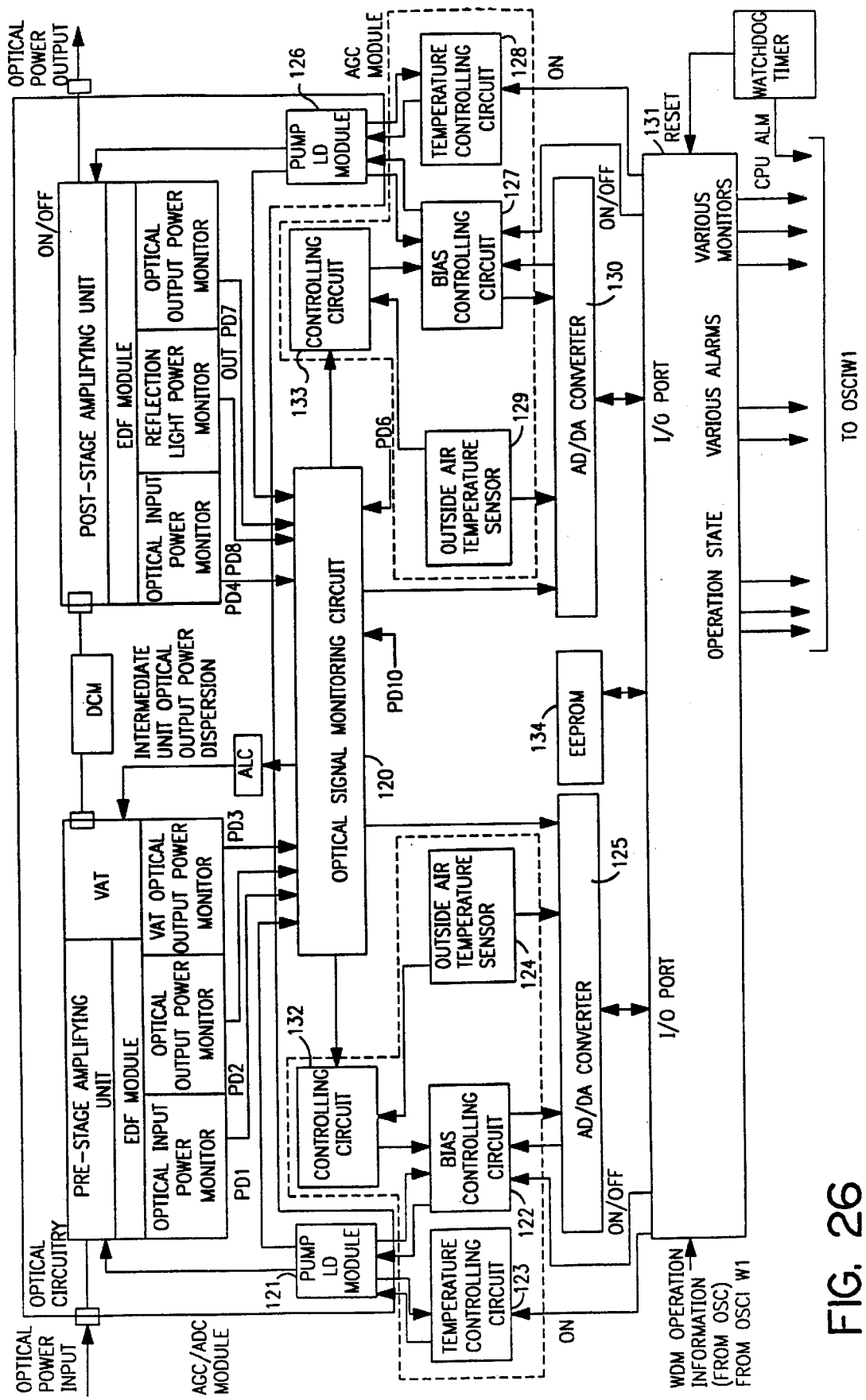
FIG. 26 is a schematic view of a controlling unit of the optical amplifier of FIG. 19 or FIG. 20.

Next, an explanation is provided regarding the wavelength multiplexing optical amplifier described in reference to FIGS. 19 and 20, particularly concerning the control circuit of optical in-line amplifier LWAW1, in reference to FIG. 26. The following monitor signals are input to an optical signal monitor circuit 120.

1) an optical input level to the pre-stage optical amplifying unit, which is detected by photodiode PD 1,
2) an optical output level from the pre-stage optical amplifying unit, which is detected by photodiode PD 2,
3) an optical output level of the variable optical attenuator VATT, which is detected by photodiode PD 3 (optical input level to dispersion compensation module DCM),
4) an optical input level to the post-stage optical amplifying unit, which is detected by photodiode PD 4 (optical output level from dispersion compensation module DCM),
5) a reflection light level from the optical connector, which is detected by photodiode PD 8,
6) an optical output level from the post-stage optical amplifying unit, which is detected by the OUT PD 7, and
7) pump light detection signals from the pump light source units BST 1 and BST 2, which are detected by photodiodes PD 6 and PD 10.

As illustrated in FIG. 26, an optical signal monitor circuit 120 inputs these monitoring results to a control circuit 132 structuring the AGC/APC module, and controls the bias voltages of respective laser diodes LD 1–LD 3 in a pump light source module 121 using a bias voltage control circuit 122, so that output powers of laser diodes LD 1–LD 3 are controlled. Furthermore, temperature control circuit 123 controls the temperatures of respective LD 1–LD 3 so that the temperatures are constant. The monitor signals of a pre-stage amplifying unit and an attenuator VAT, detected by optical signal monitor circuit 120, are input to a CPU 131 via an analog/digital conversion circuit 125. A bias voltage value and outside air temperature information are respectively input to A/D conversion circuit 125 from bias voltage control circuit 122 and an outside air temperature sensor 124. Likewise, the AGC module in the post-stage optical amplifying unit operates in a similar manner.

CPU 131 processes respective items of monitor information input from an I/O port, and outputs a behavior state, an alarm signal, monitor information, and so forth to an optical service channel interface OSCIW1 as monitor/control signals. CPU 131 analyzes the monitor/control information received from optical service channel interface OSCIW1, and outputs a signal for activating bias control circuits 122 and 127, and temperature control circuits 123 and 128 to turn pump light source modules 121 and 126 ON and OFF.

Figure 27:
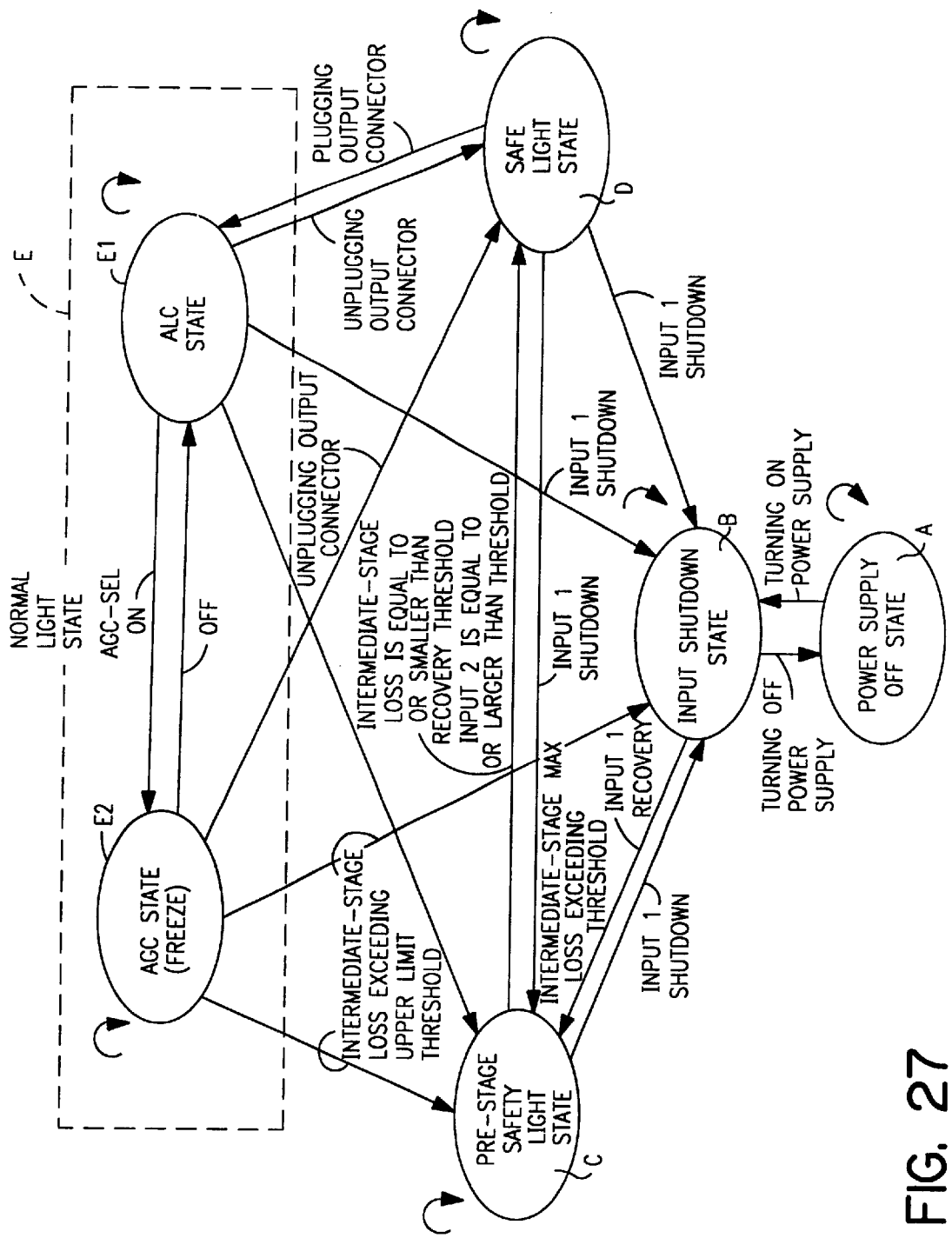
FIG. 27 is a schematic view of operations of a controlling unit of the optical amplifier.
Figure 28:
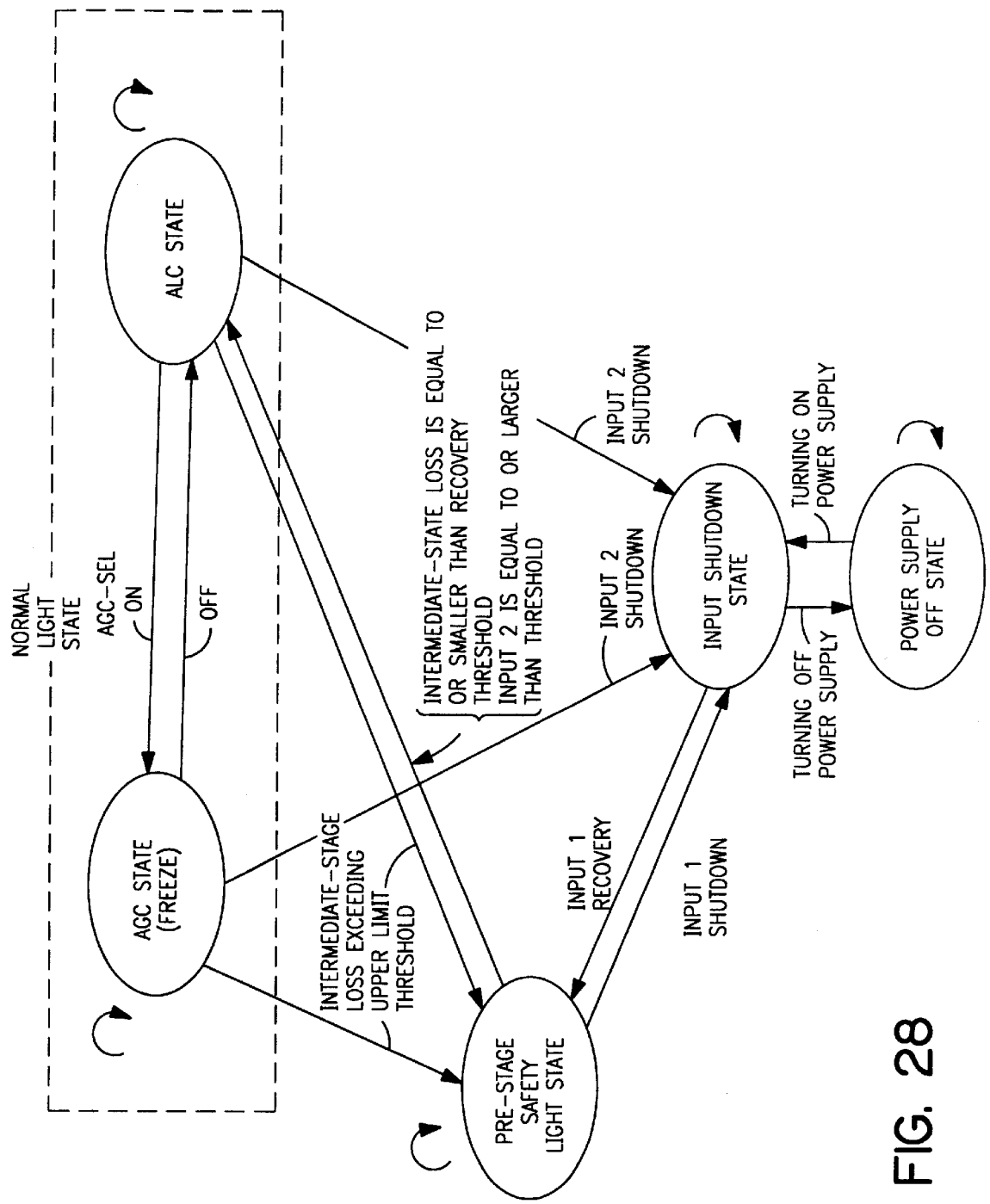
FIG. 28 is a schematic view of operations of a controlling unit of the optical amplifier.

Next, an explanation is provided regarding operations of CPU 131, which controls optical in-line amplifier LWAW1, by referring to state transition schematics illustrated in FIGS. 27 and 28.

As described above, WDM optical amplifier can cope with amplification of a wavelength-multiplexed optical signal having 32 channels. CPU 131 controls a state of WDM optical amplifier, performs various monitoring processes, and makes external communications (specifically, communication of the monitor/control information via an OSC). With the wavelength-division multiplexing transmission system illustrated in FIGS. 1A and 1B, different items of information (such as the OC-192, OC-48, and so forth) are carried on a plurality of wavelengths (channels), which are wavelength-multiplexed, and the multiplexed wavelengths are transmitted using one single-mode optical fiber. This system allows the transmission capacity to increase significantly. The optical amplifier applied to this system must amplify each wavelength with an equal gain. Furthermore, as communication demand increases, the optical amplifier must enable the number of wavelengths (channels) to be remotely increased/decreased (for example, the number of wavelengths must be decreased when the transmission capacity of each channel is increased from 2.4 Gbps to 10 Gbps), and must enable the number of channels to be increased/decreased while being used (in-service upgradability). The behavior state/transition of CPU 131, which can be applied to these capabilities, is explained in reference to FIGS. 27 and 28.

As illustrated in FIG. 27, a power supply OFF state A is a state where the power supply of the optical amplifier is turned off. In an input shutdown state B, the input of the optical amplifier is equal to or smaller than an input recovery threshold, and power is not supplied to pump light sources laser diodes LD 1–LD 3 and laser diodes LD 4–LD 6 of the pre-stage and post-stage amplifying units.

In a pre-stage safety light state C, gain of EDF module 1 of the pre-stage amplifying unit reaches a set value (AGC set voltage), but the output is a safety light level. The input level of the post-stage amplifying unit is lower than the input recovery threshold, and pump light source laser diodes LD 4–LD 6 in the post-stage amplifying unit are in a halt state due to disconnection of dispersion compensation module DCM, or improper connection of optical connectors 1 and 2. BST 1 and BST 2 are also in a halt state.

In a safety light state D, output side connector 5 of the optical amplifier is in a release state, and the optical output power is controlled to be at a level that is safe for a human body. If a Laser Safety capability is turned ON, the optical amplifier is in safety light state D. If "Laser Safety Inhibit" is received at an initial setting, the state does not make a transition to safety light state D. The state transition schematic of the safety light "OFF" (Laser Safety Inhibit) corresponds to the transition where the safety light state changes to a normal light state without detecting the plugging/unplugging of output connector 5 in the state transition schematic of the safety light "ON" (Laser Safety ON) when the safety light state changes to an ALC state E1. BST 1 and BST 2 are also in a halt state. Even in the safety light state or in the normal light state, the operation of EDF 1 and 2 is controlled in response to an instruction of the safety light "ON"/"OFF".

A communication can be actually made (normal light state) in ALC state E1. In ALC state E1, the (total) output constant control is performed using a halt variable optical attenuator based on wavelength number information and an optical amplifier number.

In an AGC state E2, the amount of attenuation of variable optical attenuator ATT is fixed, and both AGC/APC module and AGC module respectively perform control so that the gains of pre-stage EDF module 1 and post-stage EDF module 2 become constant. In ALC state E1, the behavior of variable optical attenuator ATT is controlled so that the total output of a wavelength-multiplexed optical signal at the output end becomes constant. In the meantime, in AGC state E2, the total output is fixed to an average value (this state is referred to as a freeze state). If the number of wavelengths (the number of channels) is increased/decreased at speeds lower than an AGC control speed, there is no effect on outputs of existing channels (channels continuing to providing services) because the gain is constant. This state is one of the normal light states.

In addition, the pump light source modules for expansion boosters BST 1 and BST 2 are increased/decreased in AGC state E2. The procedures for increasing the number of modules are the same as those explained in reference to FIGS. 19 and 20. The respective states and state transitions are further explained in detail below.

As illustrated in FIGS. 26 and 28, in a transition from the power supply OFF state to the input shutdown state, power is supplied to the optical amplifying unit, "Provisioning" (information for operation), and "Conditioning" (condition setting) are received from the OSC, and the initialization setting is made. Since it requires a considerable amount of time until the temperature of the pump light source LD becomes a predetermined value, this control is started at this stage.

An input shutdown state is where the input power (the output of photodiode PD 1) to the optical amplifier is equal to or lower than the input recovery threshold set by hardware, and an input shutdown signal is output from optical signal monitor circuit 120 to CPU 131. Alternatively, in the input shutdown state the bias currents are not applied to pump light sources laser diodes LD 1–LD 4 and laser diodes LD 3–LD 4 of the pre-stage and post-stage optical amplifying units.

If CPU 131 detects the input shutdown signal, CPU 131 outputs an alarm signal LOL (Loss of Light) to OSCIW1. Note that an input recovery threshold depends on the number of channels. If the number of channels is "0" as a result of reading the number of channels in the input shutdown state, CPU 31 remains in the input shutdown state. Transition from the input shutdown state to the pre-stage safety light state involves the following:

(1) Detecting that the light input from photodiode PD 1 is equal to or larger than the input recovery value;

(2) Starting to supply a bias current to the pump light sources LD 1–LD 3 in the pre-stage amplifying unit. The time constant of AGC/APC module is set so that the gain of pre-stage EDF module 1 slowly approaches the preset value.

(3) ALC module performs control so that the wavelength-multiplexed light output of variable attenuator ATT slowly becomes the safety light level by moderately decreasing the amount of attenuation of variable attenuator ATT. Because the output level (the amount of attenuation) of variable attenuator ATT is set to a level that is safe for a human body, light levels dangerous to a human body is not considered to be emitted even if dispersion compensation module DCM is not connected. In this transition, the bias current is not applied to the pump light sources LD 4–LD 6 in the post-stage amplifying unit.

In a pre-stage safety light state, although the gain of pre-stage EDF module 1 reaches the preset value (AGC setting voltage), the output level of EDF module 1 is controlled to be the safety light level by ALC module. In pre-stage safety light state, the input level to post-stage EDF module 2 is lower than the input recovery threshold because of the disconnection or improper connection of dispersion compensation module DCM, and behaviors of pump light sources LD 4–LD 6 in post-stage EDF module 2 are in a halt state.

Transition from the pre-stage safety light state to the safety light state involves:

(1) Detecting that the input level to the post-stage amplifying unit, which is detected by photodiodes PD 4, becomes equal to or higher than the input recovery threshold.

(2) Adjusting the amount of attenuation of variable attenuator ATT by using ALC module in order to compensate for a loss of dispersion compensation fiber DCF.

Specifically, the amount of attenuation of ATT is controlled to make the input level to the rear amplifier part (monitored by PD 4) equal to the reference value (dBm/ch, for example −12 dBm/ch) of the input level for the rear amplifier part. If the number of wavelengths are four, the reference value is set to −6 dBm (=−12+6 (four wavelengths)).

(3) Starting to supply a bias current to pump light sources LD 4–LD 6 in post-stage EDF module 2 using AGC module. AGC module slowly increases the gain of post-stage EDF module 2. The safety light voltage is preset so that the output level of post-stage EDF module 2 remains at the safety light level. The AGC module has two reference values, the safety light preset voltage and the AGC preset voltage, and controls the drive voltages of the pumping LDs through an analog maximum circuit.

Transition from the safety light state to the ALC state involves the following:

(1) Detecting the connection of optical connector 5 on the output side if the ratio of the output light power detected by OUT PD 7 to the reflection light power detected by photodiode PD 8 exceeds the preset value (if the reflection light power decreases).

(2) Slowly increasing AGC setting voltage to a predetermined value.

(3) Releasing the safety light setting voltage.

Transition between the ALC state and the AGC state involves the following:

(1) Receiving the signal for switching to AGC mode from the optical service channel.

(2) Fixing the amount of attenuation of variable attenuator ATT when receiving the switching signal using ALC module. The optical amplifier operates in a AGC mode (constant gain control mode).

(3) Receiving the wavelength number (channel number) information from the OSC. Checking whether the number of the pump light sources for expansion boosters BST 1 and BST 2 is increased or decreased. The connections of boosters BST 1 and BST 2 are notified by the OSC.

(4) Detecting that the signal for switching to the AGC mode is turned off based on the completion of the increase/decrease of the number of wavelengths (the number of channels) by the OSC.

(5) Updating the ALC setting voltage to a value according to the number of wavelengths (the number of channels), and outputting the voltage from the ALC module. Additionally, updating to the input and output level thresholds according to the number of wavelengths, and starting the ALC control performed by ALC module.

Transition from the ALC state to the safety light state involves the following:

(1) Detecting that optical connector 5 on the output side is disconnected if the ratio of the output light power detected by OUT PD 7 to the reflection light power detected by photodiode PD 8 becomes equal to or lower than a preset value (if the reflection light power increases).

(2) Turning on a safety light setting voltage of the AGC mode of the rear EDF 2.

(3) Decreasing a AGC setting voltage of the AGC module in post-stage EDF (turning off an AGC setting voltage).

Transition from the AGC state to the safety light state involves the following:

(1) Detecting that optical connector 5 on the output side is disconnected if the ratio of the output light power detected by OUT PD 7 to the reflection light power detected by photodiode PD 8 becomes equal to or lower than a set value (if the reflection light power increases).

(2) Turning on the safety light setting voltage of the AGC module of the rear EDF 2.

(3) Decreasing the AGC setting voltage of the AGC module in post-stage EDF 2 (turning off the AGC setting voltage).

Transition from each state to the input shutdown state involves the following:

(1) Detecting the input shutdown if the input level from photodiode PD 1 becomes equal to or lower than a threshold.

(2) Setting the AGC setting voltage of the AGC module to "0"

(3) Setting the safety light setting voltage of the ALC module to "0"

(4) Setting the AGC setting voltage of the AGC/APC module to "0"

(5) Setting the ALC setting value of the ALC module to "0"

Figure 29A:
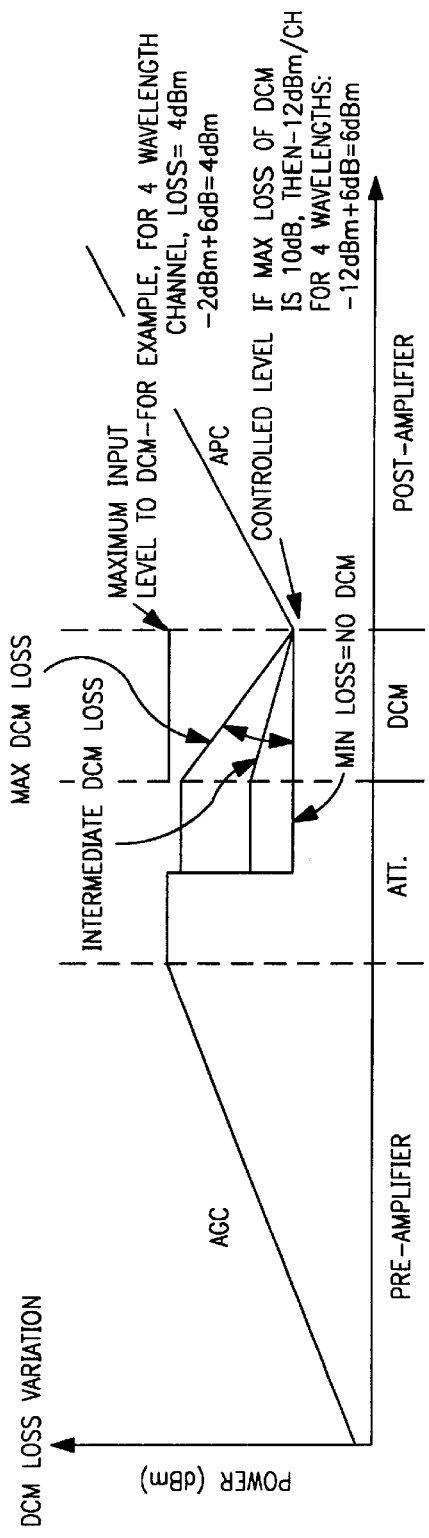
FIGS. 29A and 29B are level diagrams showing variations in DCM loss and input power, respectively.
Figure 29B:
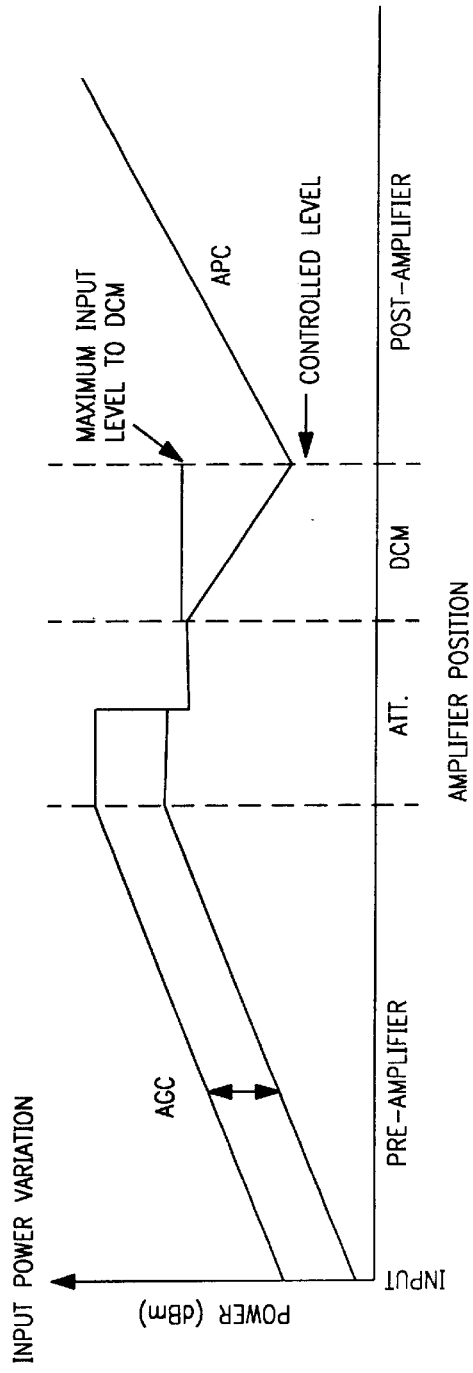

FIG. 29A is a level diagram showing variations in DCM loss. FIG. 29B is a level diagram showing variations in input power. FIGS. 29A and 29B illustrate how attenuation is used to achieve the same output power regardless of changes in dispersion compensation loss or input power level. Referring to FIG. 29A, if there is no DCM loss, more attenuation is employed. Conversely, if there is more DCM loss, less attenuation is employed. Likewise, in FIG. 29B, if the input power to the attenuator is greater, more attenuation is used to equalize the power. If the power input to the attenuator is less, less attenuation is necessary.

Next, an explanation is provided regarding the sequence for increasing/decreasing the number of channels using the optical service channel OSC in the wavelength-division multiplexing system illustrated in FIGS. 1A and 1B, by referring to FIGS. 30 through 40.

Figure 30:
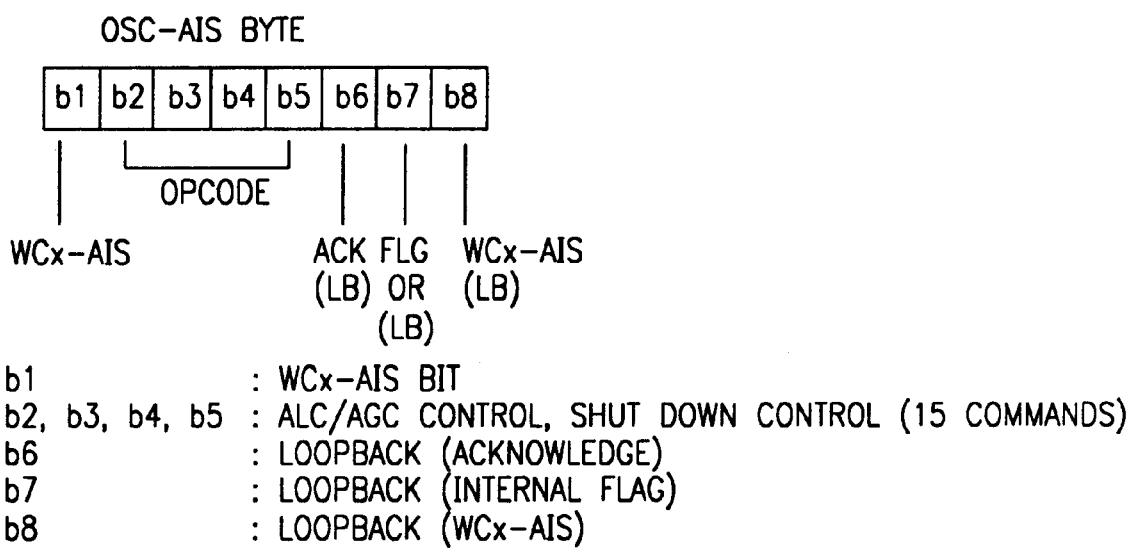
FIG. 30 is a schematic view of details of OSC monitor/control information used when a number of channels is increased/decreased.
Figure 32:
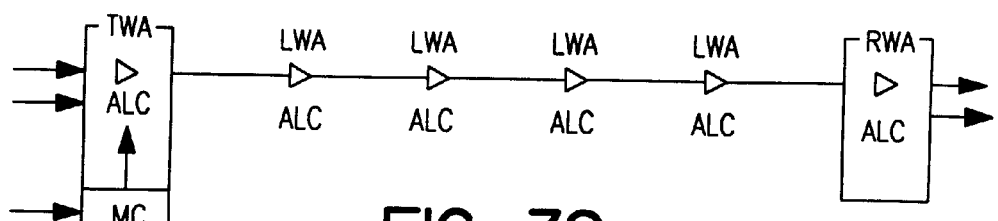
FIG. 32 is an alternate schematic view of an operational sequence of each optical amplifier when a number of channels is increased/decreased.
Figure 33:
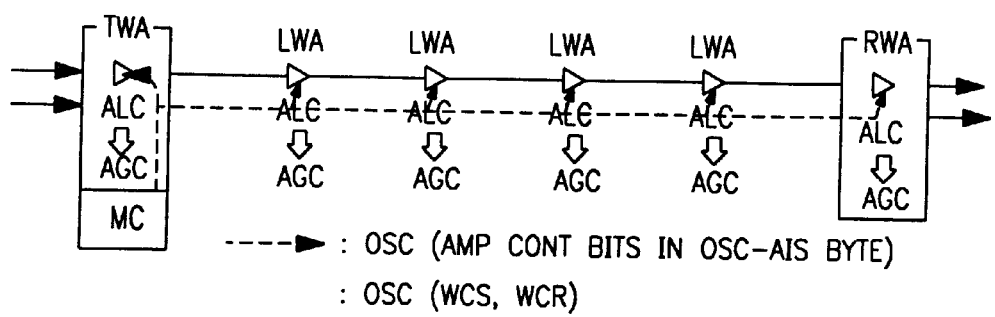
FIG. 33 is an alternate schematic view of an operational sequence of each optical amplifier when a number of channels is increased/decreased.
Figure 34:
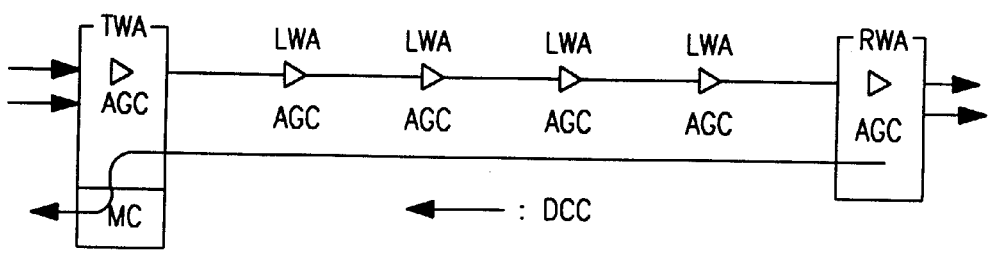
FIG. 34 is an alternate schematic view of an operational sequence of each optical amplifier when the number of channels is increased/decreased.
Figure 38:
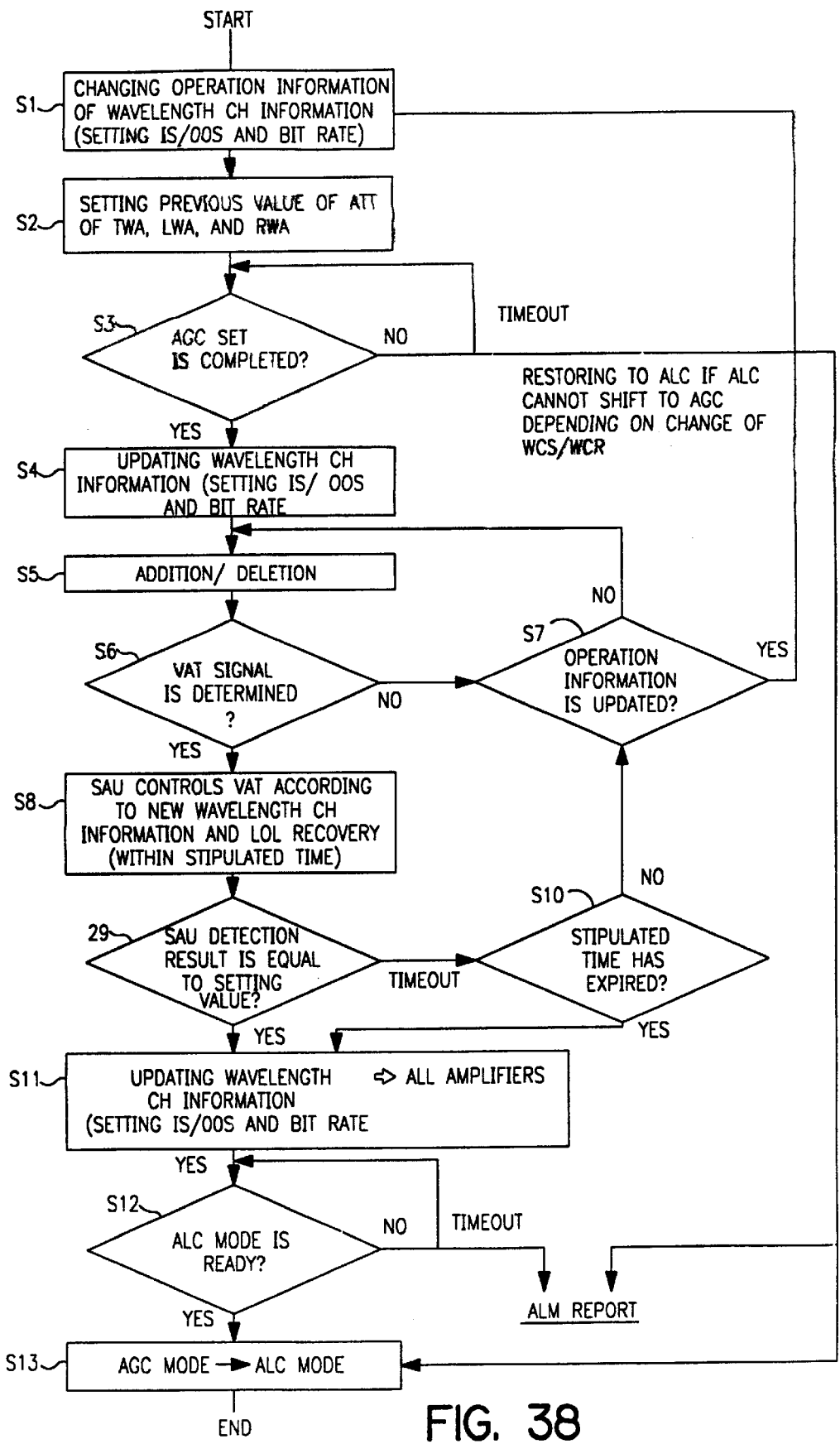
FIG. 38 is an alternate schematic view of an operational sequence of each optical amplifier when a number of channels is increased/decreased.
Figure 39A:

In the wavelength-division multiplexing system illustrated in FIGS. 1A and 1B, the increase/decrease of a channel is controlled in an on-line state (in-service state) by a DS1 frame of optical service channel OSC having a wavelength 1510 nm (shown in FIG. 11). The control signal for increasing/decreasing the number of channels is transmitted by using the OSC-AIS byte (time slot 9) of DS1 frame. The contents of the OSC-AIS byte are illustrated in FIGS. 30 and 31. In addition, the operational sequences of respective optical amplifiers (TWAA, LWAWs 1–3, and RWAB) are illustrated in FIGS. 32–37 when the number of channels is increased/decreased. The operational flowcharts are illustrated in FIGS. 38–40.

An operator first inputs the Provisioning information (use information) indicating whether the bit rates of channels 1–32 are 2.4 Gbps or 10 Gbps, and whether channels 1–32 are in an in-service ("IS") state or in an out-of-service ("OOS") state using a console of wavelength multiplexing/demultiplexing device WMUX A, and updates use information of a channel to be added/subtracted (Step S1 of FIG. 38 and FIG. 32), when the number of channels is to be increased/decreased.

The use information is transmitted to an OSC interface (OSCIA) of wavelength multiplexing/demultiplexing device WMUX A. OSC interface OSCIA transmits bit rate information (WCR) and IS/OOS information (WCS) of each channel to optical repeaters 1–3, OSCIWs 1–3, and the OSCIB in an opposing wavelength multiplexing/demultiplexing device WMUX B using the WCR and WSC bytes in multi-frame byte of the time slot 23 in the OSC, and notifies changes of the WCR and WCS bytes using a command "c" of the OSC-AIS byte.

The operator then inputs a command for changing the mode of each optical amplifiers (TWAA, LWAWs 1–3, and RWAB) from the ALC mode to the AGC mode via the console. This command is transmitted to both the OSC interface OSCIA and the CPU of the TWAA. The optical post-amplifier TWAA changes the mode from the ALC mode to the AGC mode. OSC interface OSCIA sets bits b2 through b5 to be predetermined patterns in the OSC-AIS byte in DS1 frame of the OSC, and transmits the bits to the optical service channel interfaces OSCIWs 1–3 and the OSCIB in the respective optical amplifiers (LWAWs 1–3 and RWAB) (see FIG. 33 and S2 of FIGS. 38 through 40).

The optical service channel interfaces OSCIW 1–3 and OSCIB notifies the CPUs in the respective optical amplifiers of the contents of bits b2 through b5 in the OSC-AIS byte. If the CPUs detect the transition command from the ALC mode to the AGC mode, CPUs control the transition from the ALC mode to the AGC mode. When optical in-line amplifiers LWAW 1–3 and the optical pre-amplifier RWAB have made a transition to the AGC mode in respective optical repeaters 1–3 and wavelength multiplexing/demultiplexing device WMUX B, notification of the completion of the mode transition is transmitted to WMUX A using the DCC bytes in time slots 5 and 6 of the OSC (see FIG. 34 and S3 of FIGS. 38 through 40).

An MCA unit determines whether it is necessary to increase/decrease the pump light sources for expansion boosters BST 1 and 2 in the respective optical amplifiers when the number of channels is increased/decreased. If "YES", the MCA unit instructs the respective optical repeaters 1–3 and wavelength multiplexing/demultiplexing device WMUX B to determine whether booster BST 1 or 2 is connected using a command "d" of the OSC-AIS byte. Additionally, the MCA unit instructs the CPU of optical post-amplifier TWAA to verify the connection state of the pump light sources for expansion boosters BST 1 and 2 of the optical post-amplifier TWAA of its own device (WMUX A). For example, if the number of channels is between 1 and 8, only the pump light power originating from the internal pump light sources LD 1–6 is used. If the number of channels is between 9 and 16, the pump light power must be increased by operating the pump light source for expansion booster BST 1 in addition to internal pump light sources laser diodes LD 1–LD-6. Alternatively, if the number of channels is between 17 and 32, both of boosters BSTs 1 and 2 must be operated. As illustrated in 54 of FIGS. 38–40, the connection verification information of boosters BST 1 and 2 of optical in-line amplifiers LWAW 1–3 in respective optical repeaters 1–3 are transmitted using the DCC bytes of the OSC, and verified by the managing device MCA in wavelength multiplexing/demultiplexing device WMUX A (see S4 of FIGS. 38–40).

Figure 35:
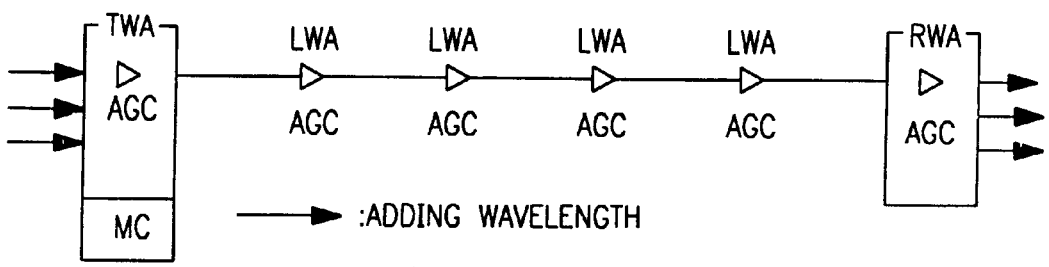
FIG. 35 is an alternate schematic view of an operational sequence of each optical amplifier when a number of channels is increased/decreased.

Next, as illustrated in FIG. 35 and S5 of FIGS. 38–40, a channel is actually added/subtracted. Then, the CPUs of spectrum analyzer SAUA and SAUB in wavelength multiplexing/demultiplexing devices WMUX A and WMUX B update the setting value based on the new channel information. The CPUs maximize the amounts of attenuation of optical variable attenuators VATA 1–32 and VATBs 1–32, any of which corresponds to the channel to be added/subtracted, and verifies that this channel is in the input shutdown state using the SAUA. As illustrated in 56–59 of FIGS. 38–40, after the verification, the amounts of attenuation of optical variable attenuators VATA 1–32 and VATBs 1–32 of wavelength multiplexing/demultiplexing devices WMUX A and WMUX B are adjusted by the CPUs of spectrum analyzers SAUA and SAUB and optical variable attenuators VATA and VATB, and are set to optimum values.

The MCA unit transmits the command for instructing the update of the wavelength (channel) information to respective optical repeaters 1–3 and wavelength multiplexing/demultiplexing device WMUX B. This command is transmitted as a command "g" of the OSC-AIS byte in the OSC by the OSCIA. Optical repeaters 1–3 and wavelength multiplexing/demultiplexing device WMUX B, in addition to wavelength multiplexing/demultiplexing device WMUX A, update the channel information using the WCR and WCS bytes information. In addition, as illustrated in S11 of FIGS. 38–40, the respective thresholds and setting values, which are used by the CPU of the optical amplifier and are explained in reference to FIGS. 26–28, are changed based on the updated channel information.

As illustrated in S12 of FIGS. 38–40, respective optical repeaters 1–3 and wavelength multiplexer/demultiplexer WMUX B notifies the MCA unit of the preparation confirmation of the transition to the ALC mode using the DCC byte of the OSC.

Figure 36:
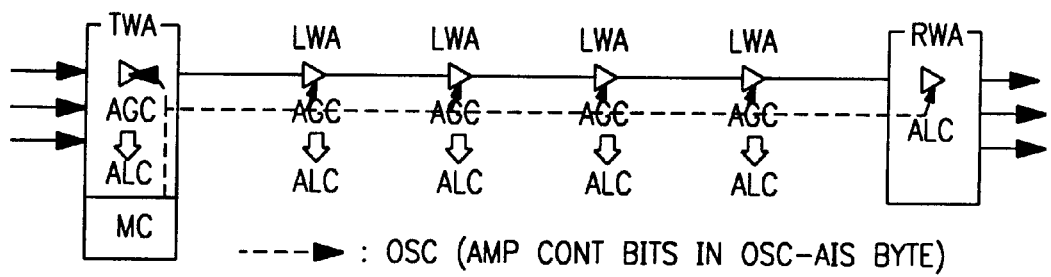
FIG. 36 is an alternate schematic an operational sequence of each optical amplifier when a number of channels is increased/decreased.
Figure 37:
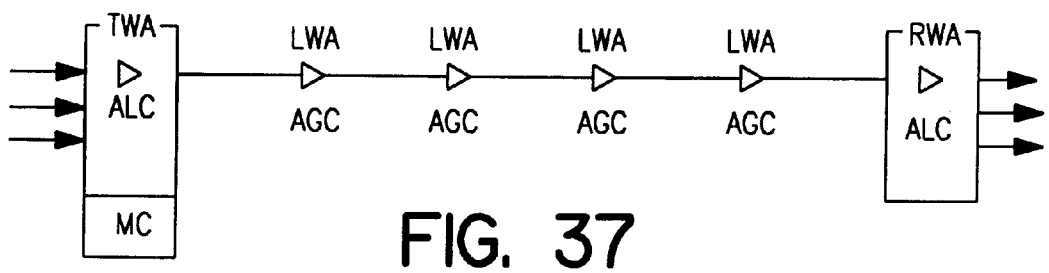
FIG. 37 is an alternate schematic view of an operational sequence of each optical amplifier when the number of channels is increased/decreased.

Next, the managing device MAC instructs all optical amplifiers of the transition from the AGC mode to the ALC mode. The notification of the transition from the AGC mode to the ALC mode is made using a command "h" of the OSC-AIS byte of the OSC. When the CPU of each of the optical amplifiers receives the command "h" from the OSC, the CPU performs control operations to make a transition from the AGC mode to the ALC mode. As illustrated in FIG. 36 and S13 of FIGS. 38–40, upon completion of the transition to the ALC mode, respective optical repeaters 1–3 and wavelength multiplexing/demultiplexing device WMUX B notify the MCA that the transition to the ALC mode is completed, that is, the respective optical amplifiers operate in a normal light state, by using the DCCs of the OSC. If respective optical repeaters 1–3 detect a fault of optical service channel OSC (monitor/control optical signal shutdown (Loss of Light), an unlinked monitor/control channel (Loss Of Facility), and a reception error using the parity check bit, a flag is set in the b1 bit of the OSC-AIS byte. The error detection is then notified to a downstream side.

As described above in detail, the present invention provides an optical amplifier of a wavelength-division multiplexing optical communication system which overcomes the above-mentioned problems, and can control the optical amplifier on-line (while in service) by using an optical service channel.

The above explanation is provided using a wavelength-multiplexed optical signal as an example. However, the optical amplifier according to the present invention can be applied to a single wave optical signal as a matter of course.

While the invention has been described in connection with the preferred embodiments and examples, it will be understood that modifications within the principle outlined above will be evident to those skilled in the art without departing from the spirit and scope of the invention. Thus, the invention is not limited to the preferred embodiments and examples, but is intended to encompass such modifications.

What is claimed is:

1. An optical amplifier, comprising:

a pre-stage optical amplifying unit, including a rare-earth element doped optical fiber and a first gain equalizer to compensate for a wavelength-dependent gain characteristic of the pre-stage optical amplifying unit, to transmit a wavelength-multiplexed light signal having a plurality of different wavelengths; and a post-stage optical amplifying unit positioned on an output side of the pre-stage optical amplifying unit, including a rare-earth element doped optical fiber and a second gain equalizer to compensate for a wavelength-dependent gain characteristic of the post-stage optical amplifying unit wherein an optical service channel interface, which communicates on a wavelength outside of a gain band width of the rare-earth element doped fibers, is arranged in parallel to each amplifying unit.

2. An optical amplifier according to claim 1, wherein a detachable optical coupler is provided between said pre-stage optical amplifying unit and said post-stage optical amplifying unit for releasable connection thereof.

3. An optical amplifier according to claim 1, further comprising:

a dispersion compensator positioned on an input side of the post-stage optical amplifying unit, to compensate for dispersion in the optical signal amplified by the pre-stage optical amplifying unit, and for outputting a corresponding signal; and a rare-earth element doped optical fiber positioned on an output side of the post-stage optical amplifying unit.

4. An optical amplifier according to claim 3, further comprising a variable attenuator positioned between the pre-stage optical amplifying unit and the dispersion compensator.

5. An optical amplifier according to claim 3, further comprising:

connectors provided upstream and downstream from the rare-earth element doped optical fiber positioned on the output side of the post-stage optical amplifying unit;

a first booster having a connector attachable to the downstream connector, to provide backward pumping light to the rare-earth element doped optical fiber positioned on the output side of the post-stage optical amplifying unit; and a second booster having a connector attachable to the upstream connector, to provide forward pumping light to the rare-earth element doped optical fiber positioned on the output side of the post-stage optical amplifying unit.

6. An optical amplifier according to claim 5, wherein each of the first and second boosters have laser diodes and sensor mechanisms, the sensor mechanisms determining whether the respective boosters are connected and decreasing the power output from the respective laser diodes if the boosters are not connected.

* * * * *